United States Patent [19]

Cizmic et al.

[11] 4,086,659

[45] Apr. 25, 1978

[54] CONTROL SYSTEM FOR DISK DRIVE

[75] Inventors: Stipe Cizmic, San Mateo; Wayne L. Edwards, Jr., Mountain View; David L. Griffith, Pleasanton; Martin O. Halfhill, San Jose; James O. Jacques, Tracy; Leonard R. Shenfield, Santa Clara; Ronald W. Votaw, Morgan, all of Calif.

[73] Assignee: Xerox Corporation, Stamford, Conn.

[21] Appl. No.: 773,102

[22] Filed: Feb. 28, 1977

[51] Int. Cl.² .................. G11B 17/00; G06F 13/08
[52] U.S. Cl. ........................... 364/900; 360/78; 360/98
[58] Field of Search ............... 364/900, 200; 360/78, 360/98, 106

[56] References Cited

U.S. PATENT DOCUMENTS

| | | | |
|---|---|---|---|
| 3,699,555 | 10/1972 | DuVall | 360/78 |
| 3,829,844 | 8/1974 | Zonneveld et al. | 364/900 |
| 3,953,889 | 4/1976 | Scieszinski et al. | 360/98 X |
| 4,012,778 | 3/1977 | Johnson | 360/78 |

*Primary Examiner*—Mark E. Nusbaum
*Attorney, Agent, or Firm*—James J. Ralabate; Terry J. Anderson; Barry Paul Smith

[57] ABSTRACT

A disk drive comprises a housing having a door through which a cartridge including a recording disk therein may be inserted. A spindle drive assembly is mounted in the housing and is responsive to a first set of instructions for rotating the recording disk of a disk cartridge loaded into the housing through the door and onto the spindle drive assembly. An actuator is also mounted in the housing and is capable of controlled reciprocal movements relative to the axis of rotation of the spindle drive assembly. A head carriage assembly is mounted in the housing to the actuator and includes at least one electromagnetic read/write head thereon for reading data from the writing data onto tracks of the recording disk of a cartridge loaded onto the spindle drive assembly. Servo control apparatus is mounted in the housing and is responsive to a second set of instructions for controlling the speed and direction of the reciprocal movements of the actuator. Additionally, read/write apparatus is mounted in the housing and is responsive to a third set of instructions for controlling the reading and writing of data by the electromagnetic head. Further, programmed data processing means is mounted in the housing and is connected to the spindle drive assembly, the servo control system and the read/write apparatus for generating the first, second and third sets of instructions under program control.

18 Claims, 86 Drawing Figures

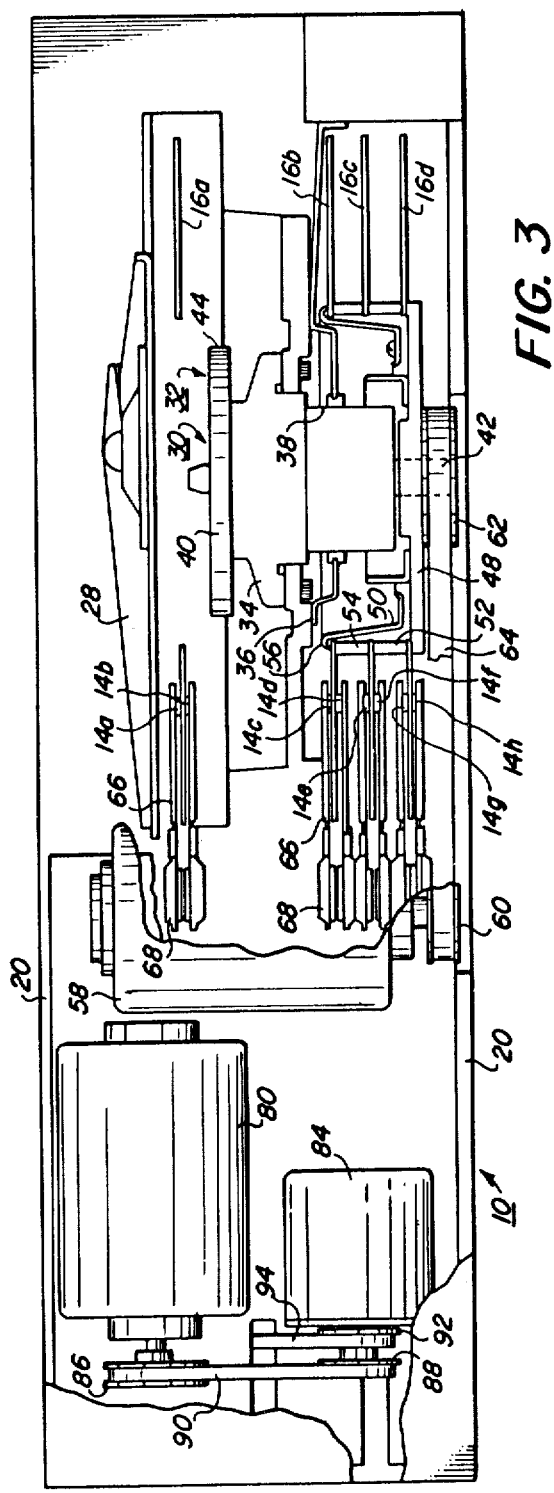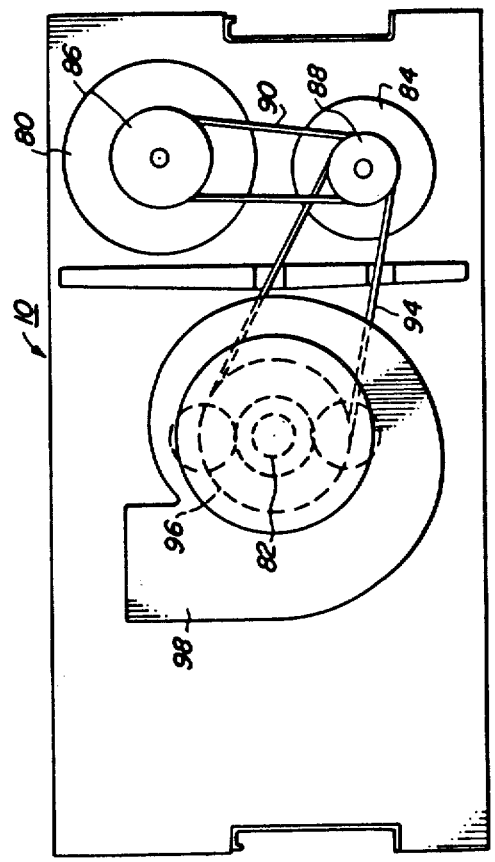

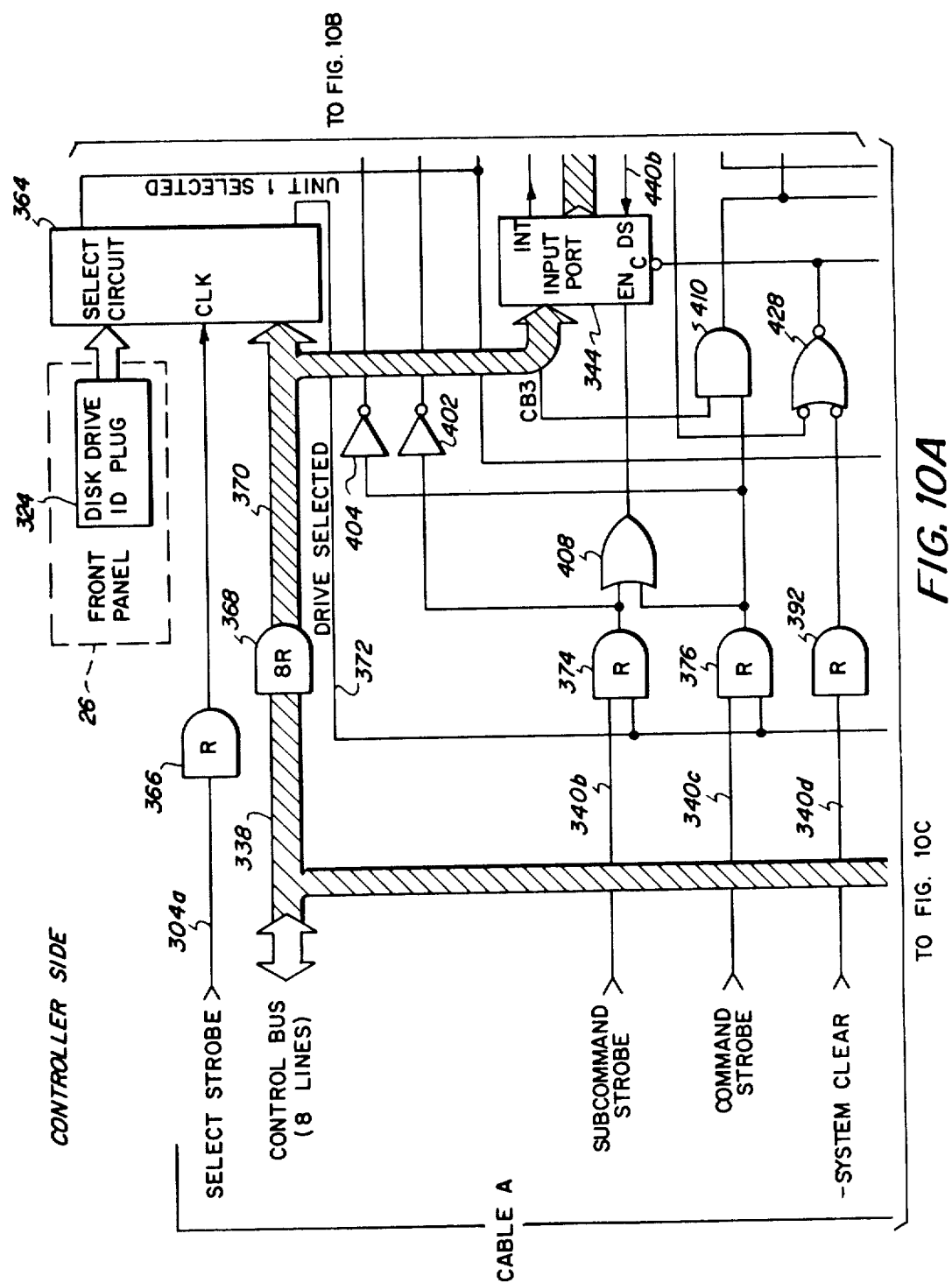

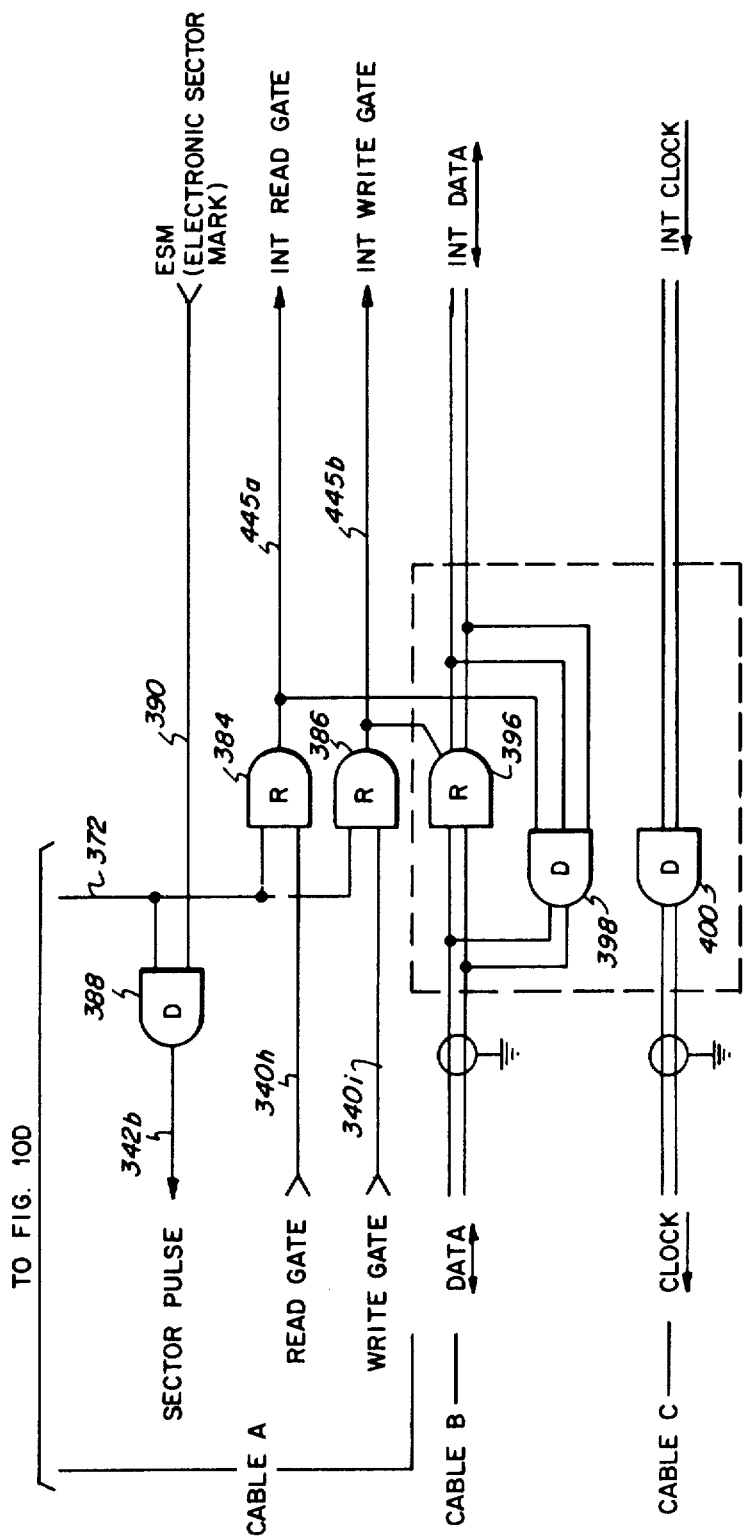

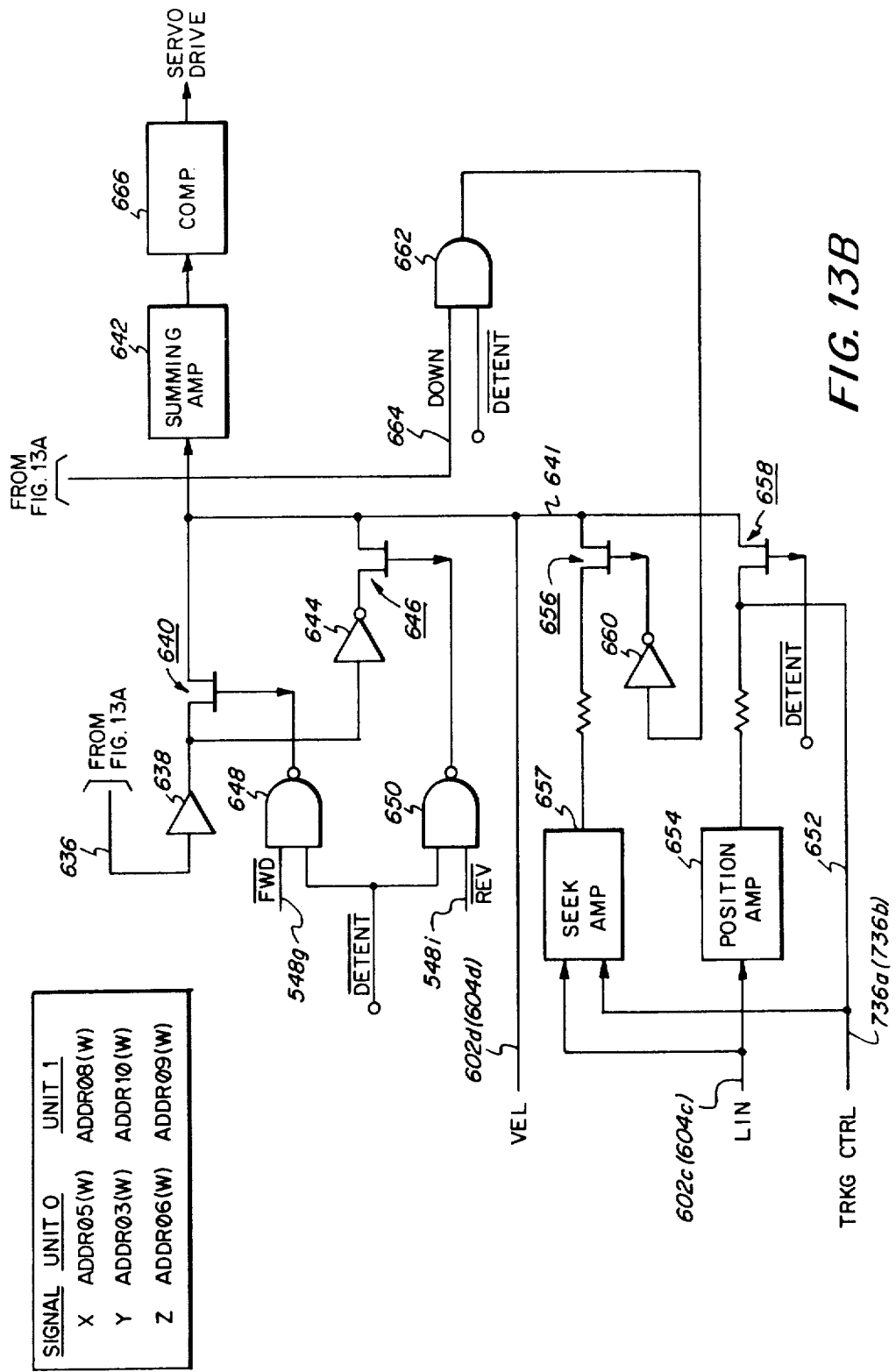

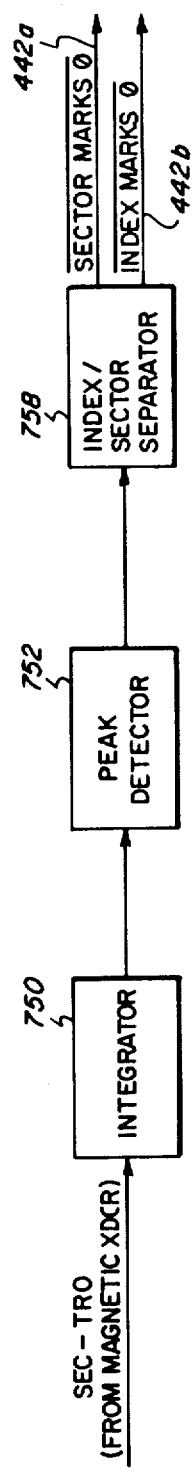
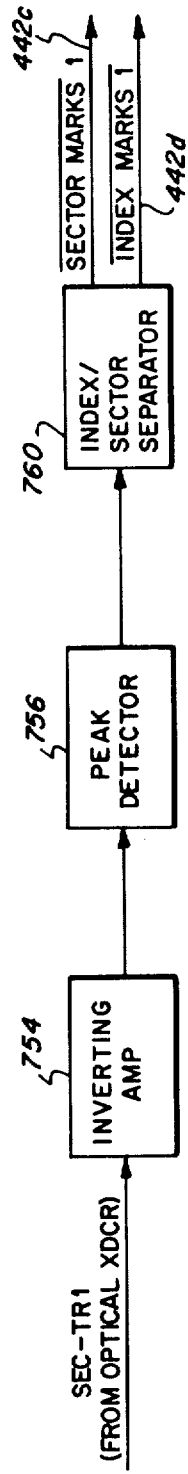
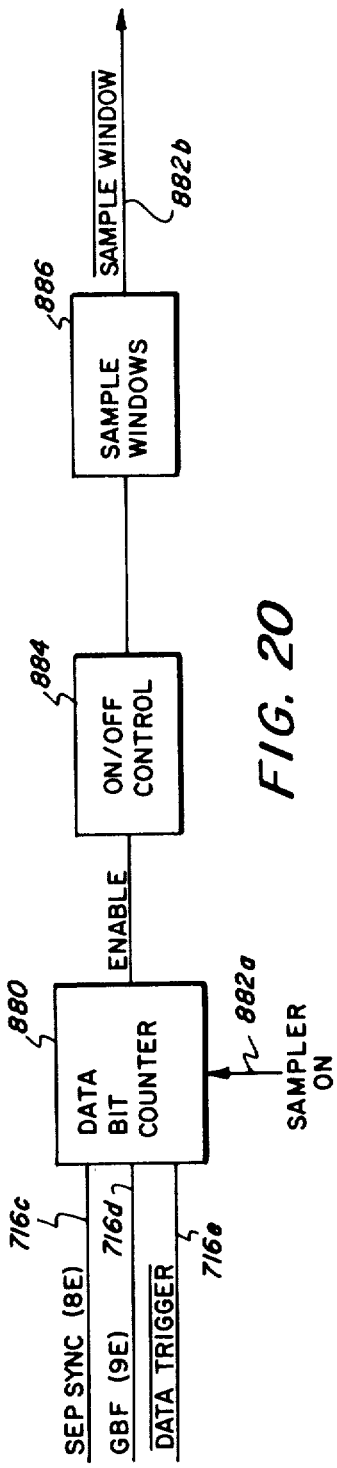
FIG. 18
FIG. 19
FIG. 20

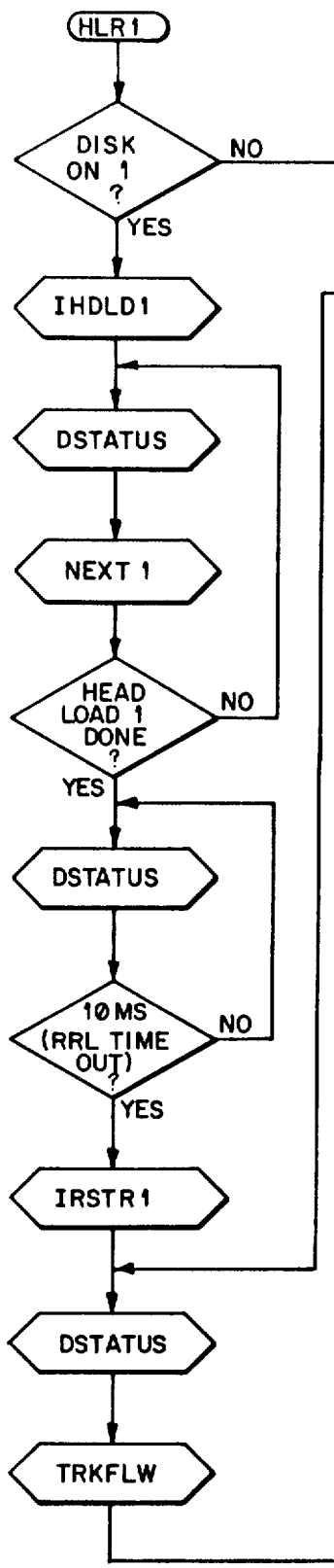
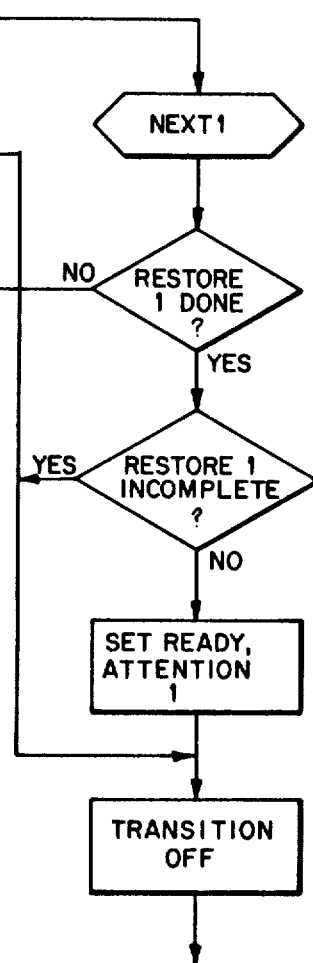
FIG. 28
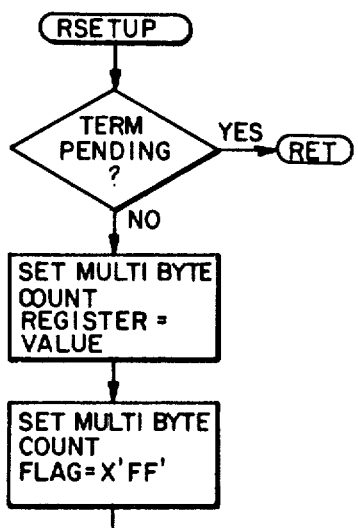
FIG. 29
FIG. 30
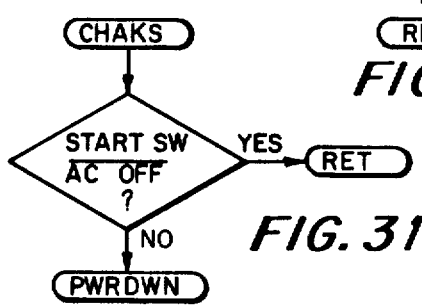
FIG. 31

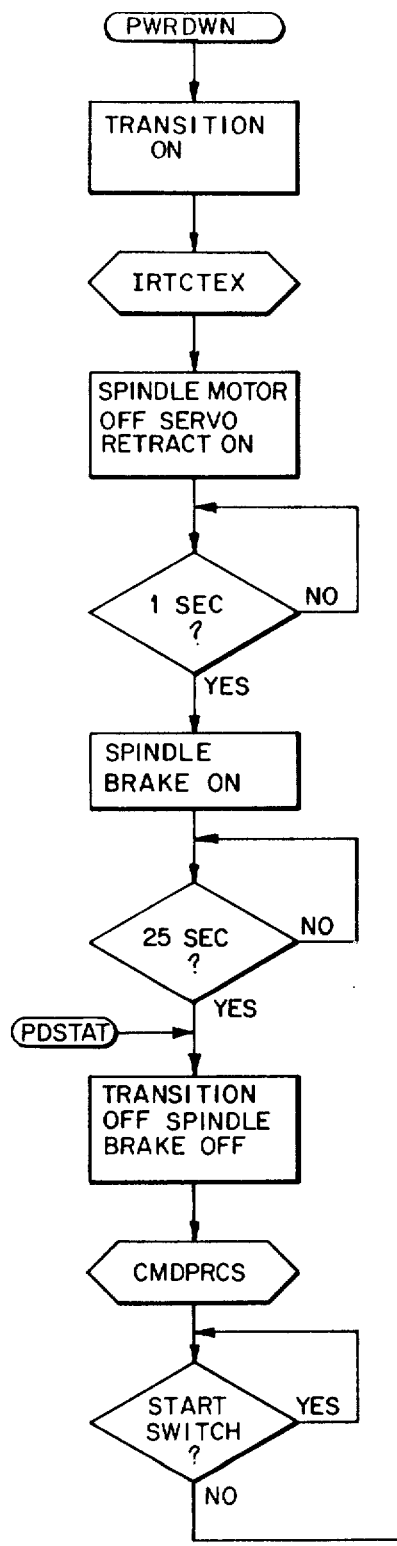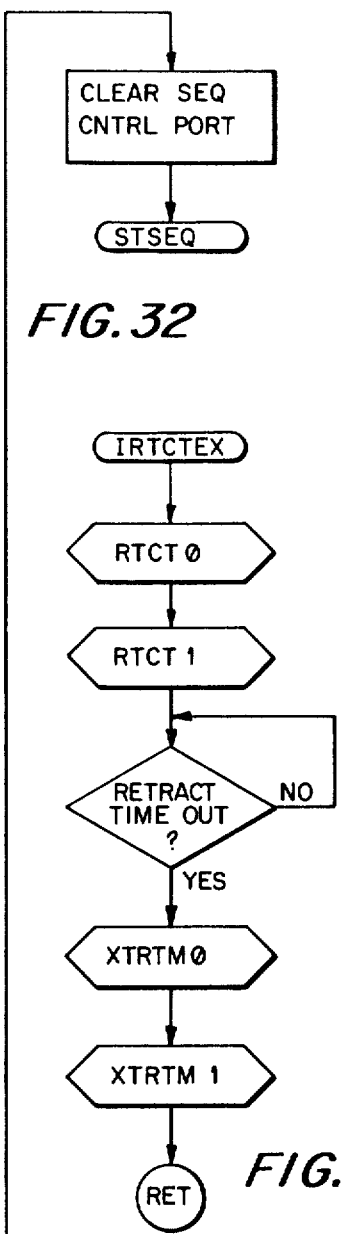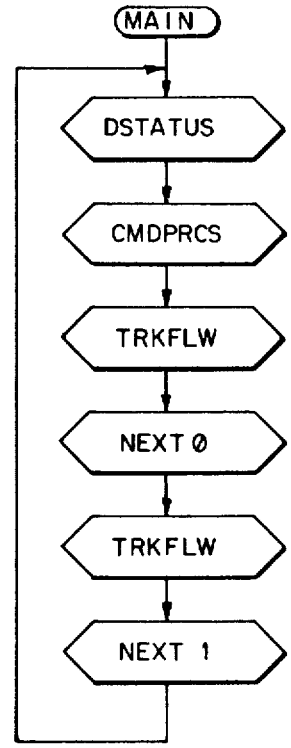
FIG. 32
FIG. 33
FIG. 34

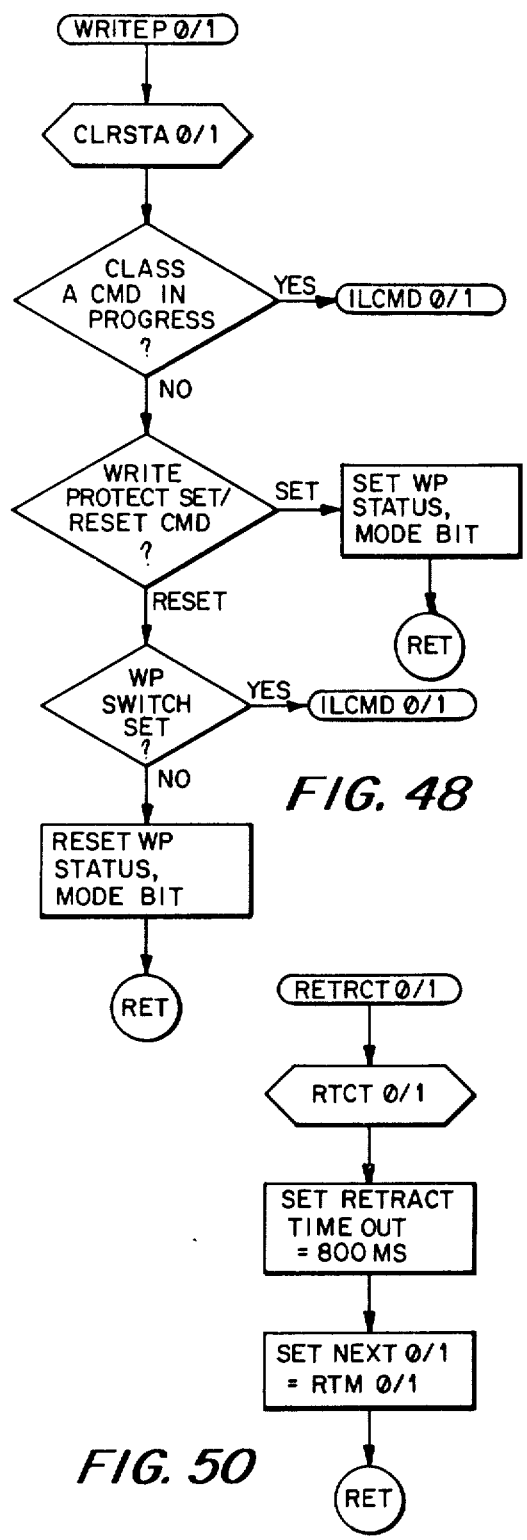
FIG. 48
FIG. 50
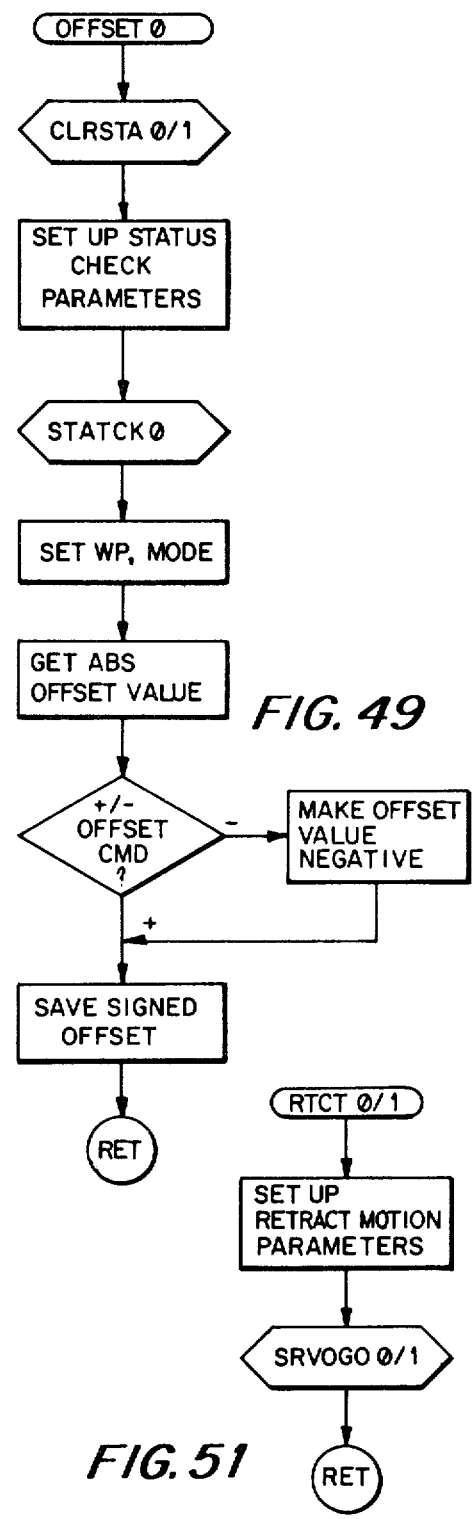
FIG. 49
FIG. 51

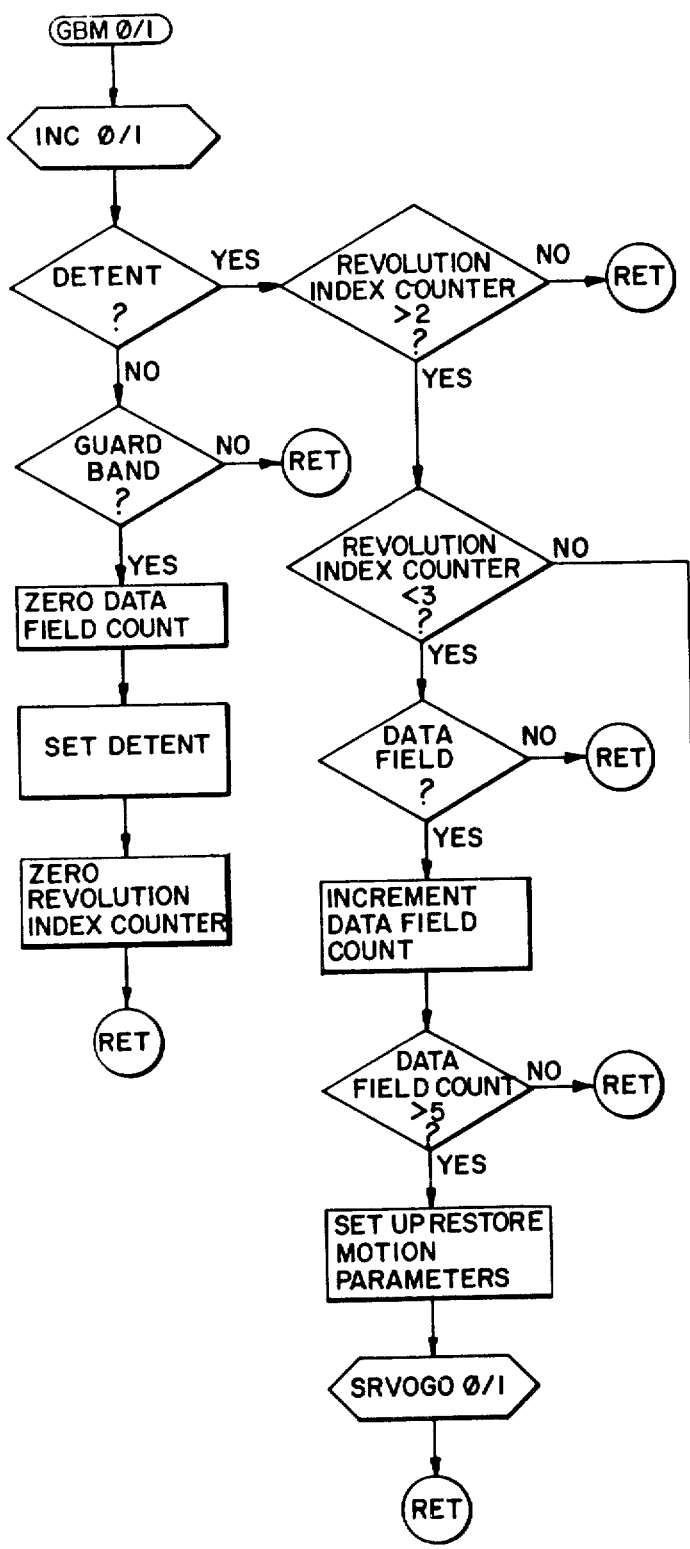
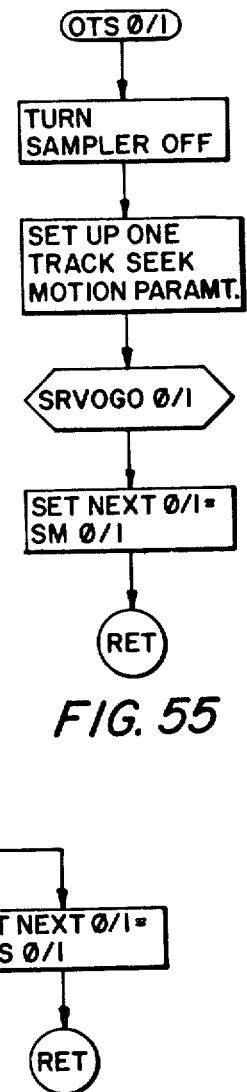
FIG. 55
FIG. 54

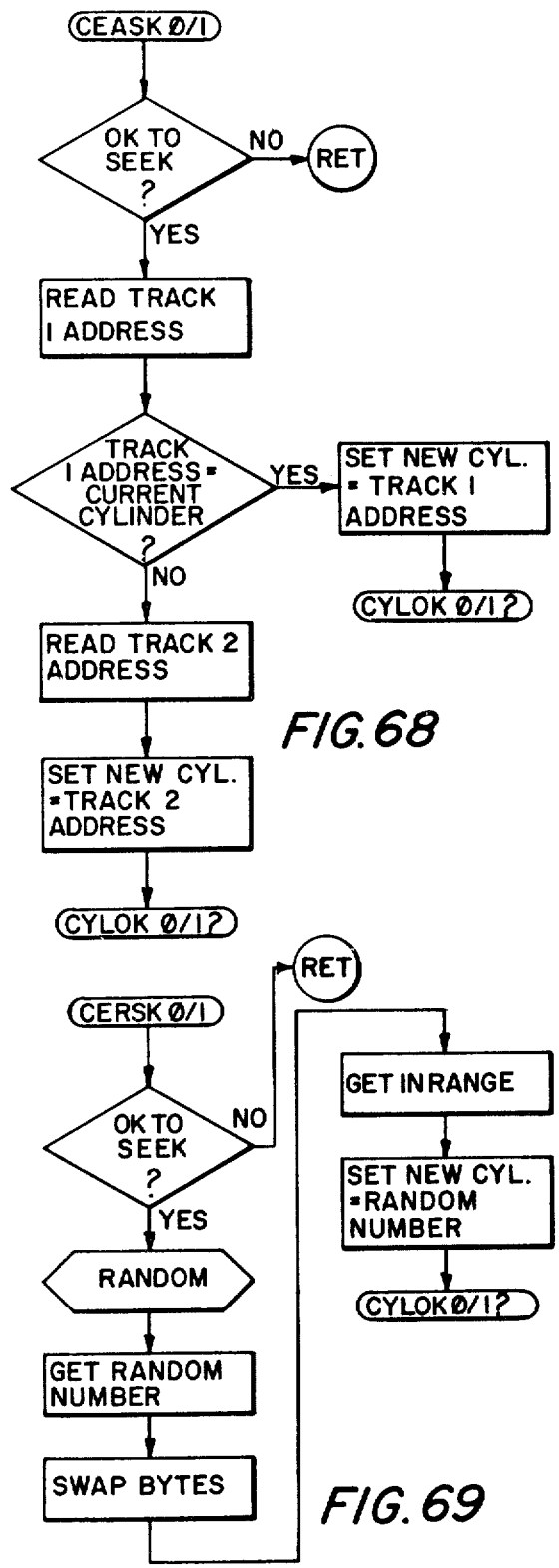
FIG. 68
FIG. 69
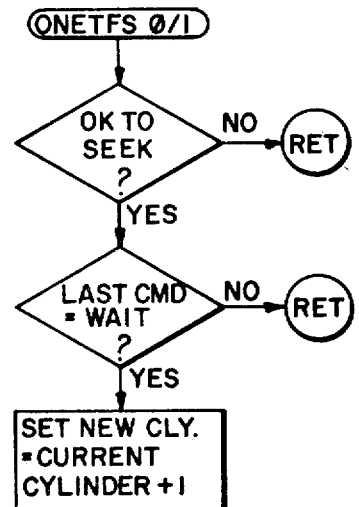
FIG. 70
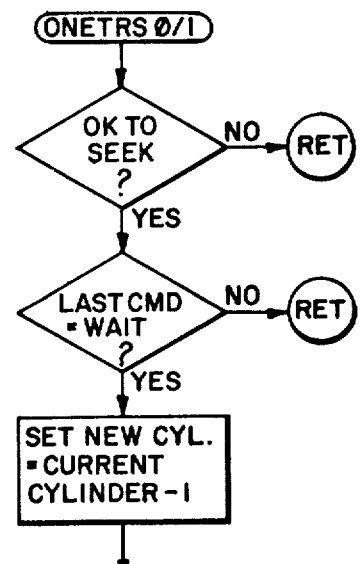
FIG. 71

CONTROL SYSTEM FOR DISK DRIVE

CROSS-REFERENCE TO RELATED APPLICATIONS

This application is related to the following copending applications filed concurrently herewith:

(1) U.S. application Ser. No. 772,698 filed in the names of Stipe Cizmic et al and entitled RESTORE METHOD AND APPARATUS FOR DISK DRIVE.

(2) U.S. application Ser. No. 772,691 filed in the name of Leonard R. Shenfield and entitled TIME-SLICING METHOD AND APPARATUS FOR DISK DRIVE.

(3) U.S. application Ser. No. 773,922 filed in the names of Stipe Cizmic et al and entitled SELF-DIAGNOSTIC METHOD AND APPARATUS FOR DISK DRIVE.

(4) U.S. application Ser. No. 772,692 filed in the names of Robert J. Black et al and entitled VELOCITY CONTROL APPARATUS FOR DISK DRIVE.

BACKGROUND OF THE INVENTION

This invention relates to disk drives and, more particularly, to control systems for disk drives.

Up until now, the intelligence required for controlling the various operations carried out by a disk drive, e.g. track seeking, head restore, head selection, write current selection, etc., have been accomplished by either complex hardwired logic in the drive or by "intelligent" disk drive host controllers located remote from the drive itself.

Although programmed data processors, particularly microprocessors, are starting to replace the hard-wired control systems utilized in many different types of systems, e.g. computer output printers, there has still not been an effective and efficient programmed data processor dedicated expressely for servicing and controlling the disk drive itself and being located in and as part of the disk drive.

It would be desirable, therefore, to provide a disk drive which includes within its own housing a programmed data processing system expressely dedicated to controlling the various operations of the disk drive.

SUMMARY OF THE INVENTION

In accordance with the present invention, a disk drive is provided comprising a housing having a door through which a cartridge including a recording disk therein may be inserted; a spindle drive assembly mounted in said housing and responsive to a first set of instructions for rotating the recording disk of a disk cartridge loaded into said housing through said door and onto said spindle drive assembly; an actuator mounted in said housing and capable of controlled reciprocal movements relative to the axis of rotation of said spindle drive assembly; a head carriage assembly mounted in said housing to said actuator and including at least one electromagnetic read/write head thereon for reading data from and writing data onto tracks of the recording disk of a cartridge loaded onto said spindle drive assembly; servo control apparatus mounted in said housing and responsive to a second set of instructions for controlling the speed and direction of the reciprocal movements of said actuator; read/write apparatus mounted in said housing and responsive to a third set of instructions for controlling the reading and writing of data by said electromagnetic head; and programmed data processing means mounted in said housing and connected to said spindle drive assembly, said servo control apparatus and said read/write apparatus for generating said first, second and third sets of instructions under program control.

In accordance with the preferred embodiment, the programmed data processing means includes a microprocessor and associated read-only memories (ROMS) which contain the micro-coded program instructions and random-access-memories (RAMS) which store various signals required during servicing and control of the drive.

These and other aspects and advantages of the present invention will be more completely described below with reference to the accompanying drawings.

BRIEF DESCRIPTION OF THE DRAWINGS

FIGS. 2–6 are various electrical and sectional views of the interior of the disk drive of FIG. 1;

FIGS. 10A–10F are a schematic diagram of the interface depicted in FIG. 9;

FIGS. 13A, 13B are a schematic block diagram of the servo control system depicted in FIG. 9;

FIGS. 17A, 17B, 18–20 are schematic block diagrams of the tracking circuits depicted in FIG. 9;

FIGS. 24, 25, 26A, 26B, 27A, 27B, 28–65 depict in flow chart form the programmed control of the disk drive of FIGS. 1–6 as connected to the external controller shown in FIG. 9; and FIGS. 66–76 depict in flow chart form the programmed diagnostics that may be executed by disk drive of FIGS. 1–6 as connected to the external exerciser of FIG. 23.

DESCRIPTION OF THE PREFERRED EMBODIMENT

I. Disk Drive

Figure 1:
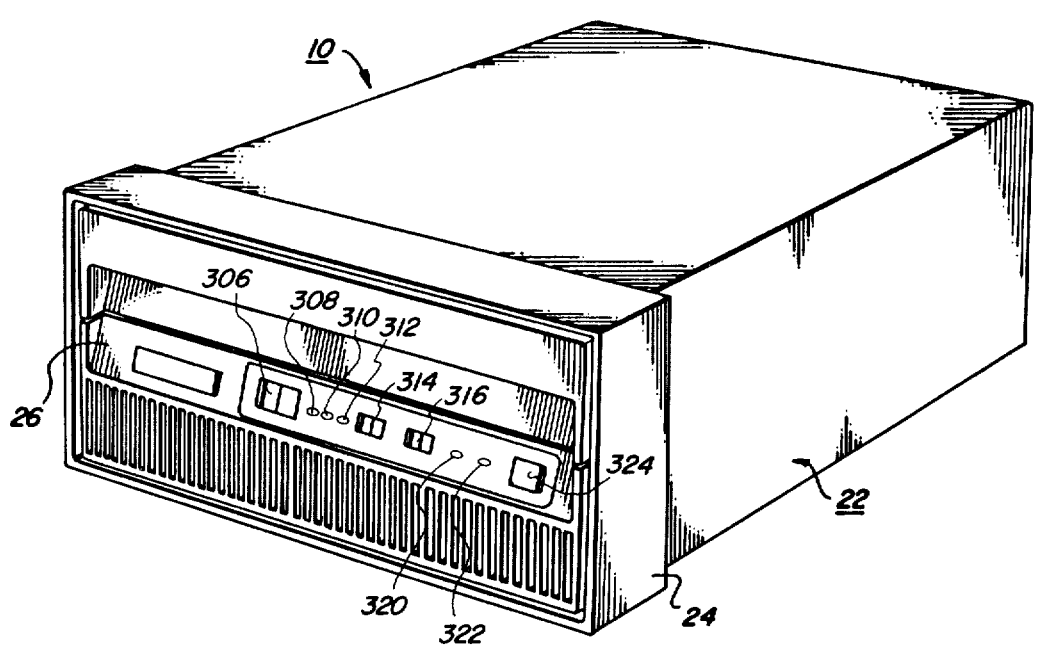
FIG. 1 is a front perspective view of a disk drive incorporating the principles of the present invention therein.

A disk drive 10 incorporating the control system of the present invention therein is shown in FIGS. 1–6. The disk drive 10 includes a main support frame or casting 20 (FIGS. 2 & 3) about which a housing cover 22 (FIG. 1) is mounted by suitable mounting means (not shown). The housing cover 22 includes a front portion 24 in which a control and display panel 26 is mounted. A presently preferred control and display panel 26 and the switches and lights included thereon will be described in more detail below. The front portion 24 is hinged by suitable means (not shown) about its inward most lower edge so that it may be swung open. In this manner, a disk cartridge 28 including a disk 16a therein may be inserted into the disk drive 10 and loaded about a drive spindle 30 for rotating the disk 16a about the axis of the spindle 30. The disk drive 10 may alternatively be of the top loading variety.

The drive spindle 30 forms part of a spindle assembly 32 which includes a housing 34 fixedly mounted by suitable mounting means (not shown) to a forward platform portion 36 of the support frame 20. The housing 34 extends through an opening 38 in the platform portion 36 and the spindle 30 has upper and lower portions 40 and 42 which respectively extend from the upper and lower ends of the housing 34. The upper portion 40 of the spindle 30 is preferably in the form of a circular disk having a permanently magnetized side peripheral surface 44. The surface 44 is adapted to attract an upper hub (not shown) fabricated of an appropriate magnetically attractable material and mounting in the cartridge 28 through the central opening of the disk 16a. The resultant magnetic field is made strong enough so that the resultant force holding the upper hub against the upper portion 40 of the spindle 30 is sufficient to prevent slippage therebetween during normal acceleration and deceleration of the disk 16a.

The lower portion 42 of the spindle 30 is preferably in the form of a cylindrical shaft having a lower hub 42 fixedly connected about its periphery by suitable connecting means (not shown). The hub 48 extends sufficiently in a radial direction so that inner-most portion of the lower surface of a disk 16d is supported thereby (see FIG. 3). The disk 16d constitutes the lowest disk in a stacked array of three coaxially aligned disks 16b – 16d which are permanently mounted in the disk drive 10. This is to be distinguished from the disk 16a which is included in the cartridge 28 which is removable from the disk drive. The specific manner in which the cartridge 28 may be inserted and removed from the disk drive 10 does not form part of the present invention and so will not be described in detail herein. It should be noted, however, that any suitable well known cartridge loading apparatus may be employed. It should be further noted that any one or more of the disks 16a – 16d may be deleted from the drive 10, if desired. In fact, one model of the drive may not contain any fixed disks therein, if such is desired.

Referring specifically to FIG. 3, the non-removable disks 16b – 16d are permanently mounted within the disk drive 10 for simultaneous coaxial rotation upon rotation of spindle 30. This is accomplished by means of a clamping ring 50 and two annular spacers 52 and 54. Specifically, the spacer 52 is disposed between the upper surface of the disk 16d and the lower surface of the disk 16c at the inner-most portions of such disks, and the spacer 54 is disposed between the upper surface of the disk 16c and lower surface of the disk 16b at the inner-most portions of each. The clamp 50 is bolted at one end of the lower hub 48 and has an annular lip 56 at its other end which is forced down upon the upper surface of the disk 16b thereby applying a clamping force to retain the spacers 52 and 54 in tight fitting relationship. The clamping force is made sufficient great so that a rotation of the hub 48 will cause a corresponding rotation of each of the disks 16b – 16d.

Figure 9:
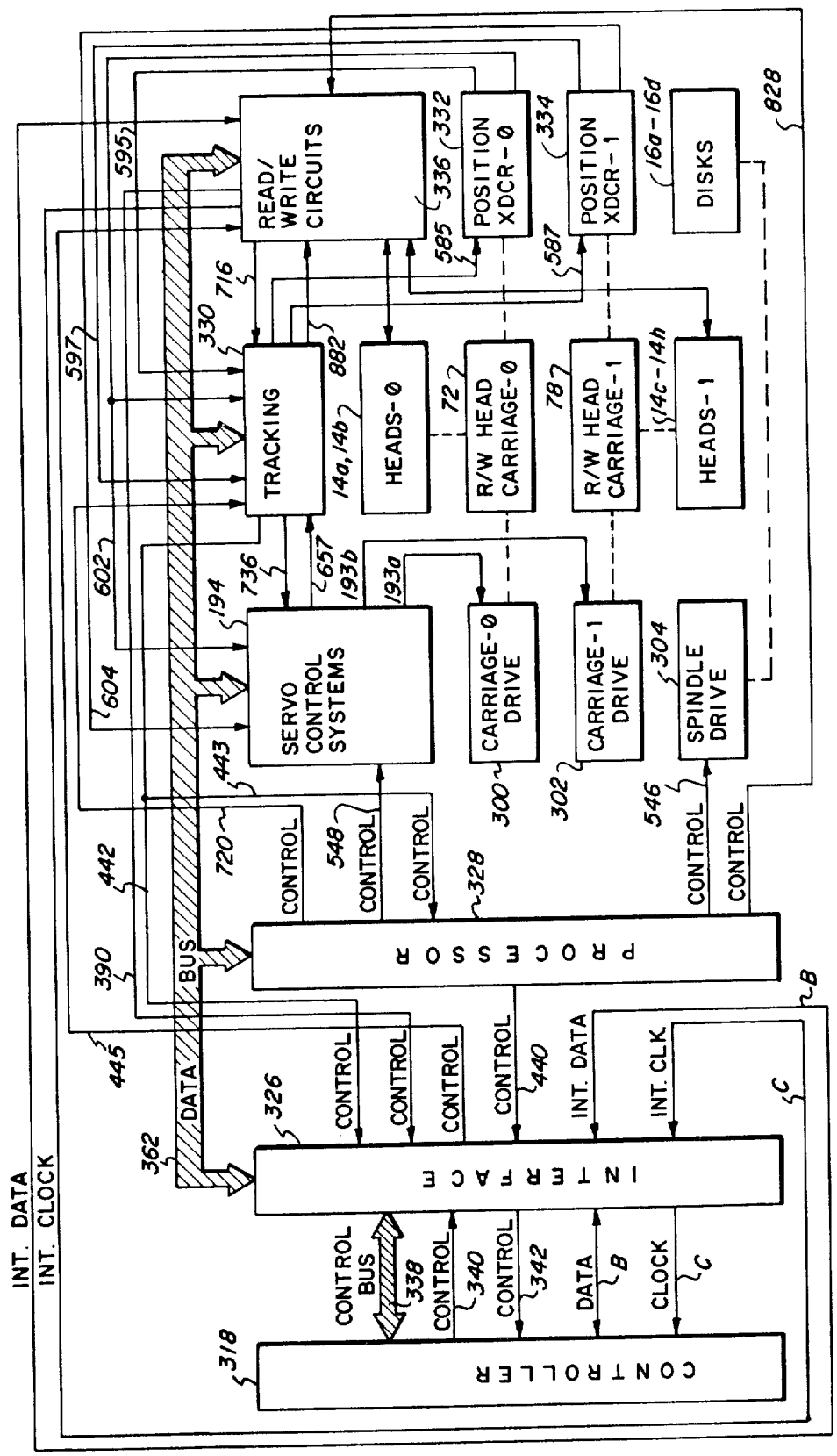
FIG. 9 is a block diagram representation of the control driver employed in the disk drive of FIGS. 1–6.
Figure 10B:
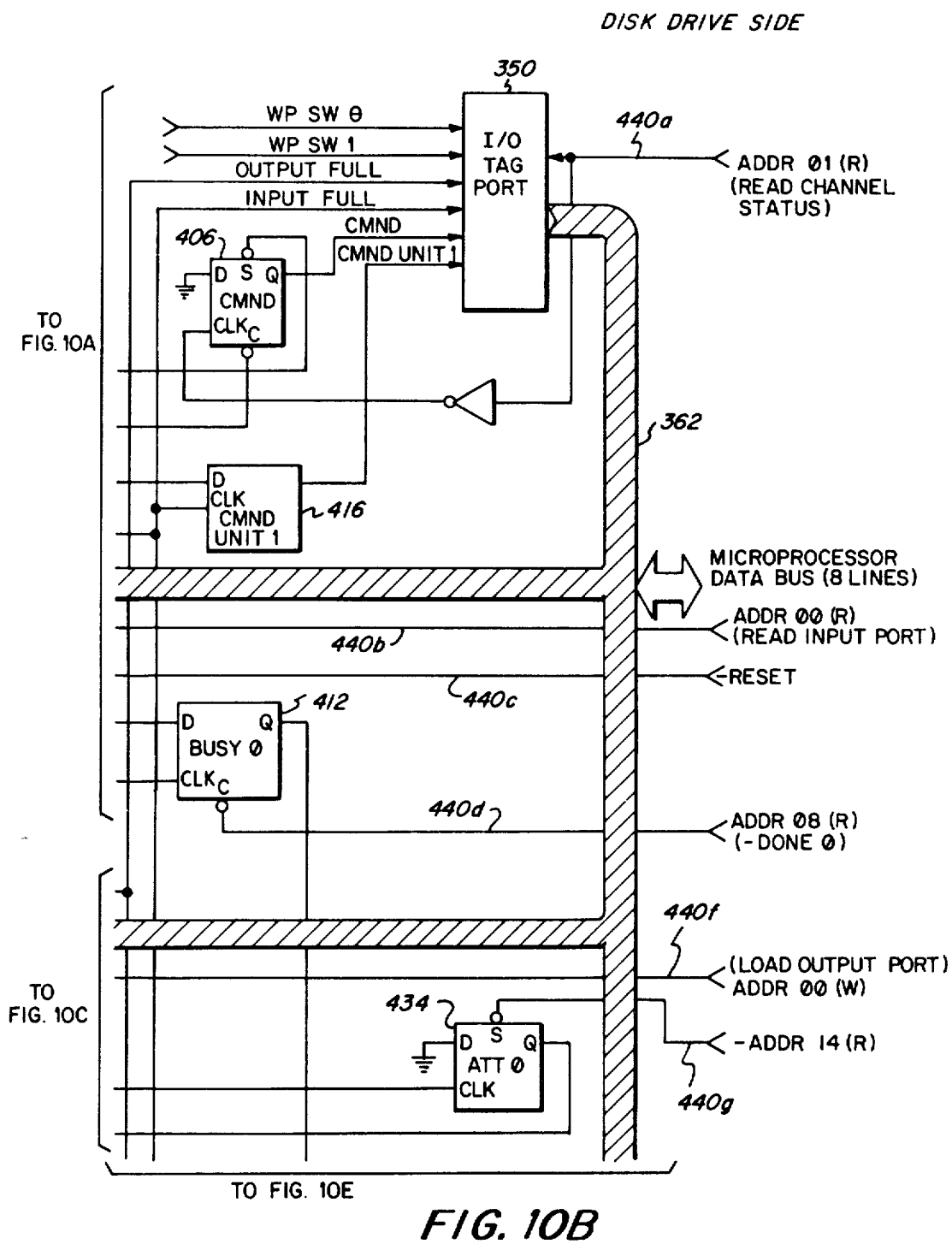
Figure 10C:
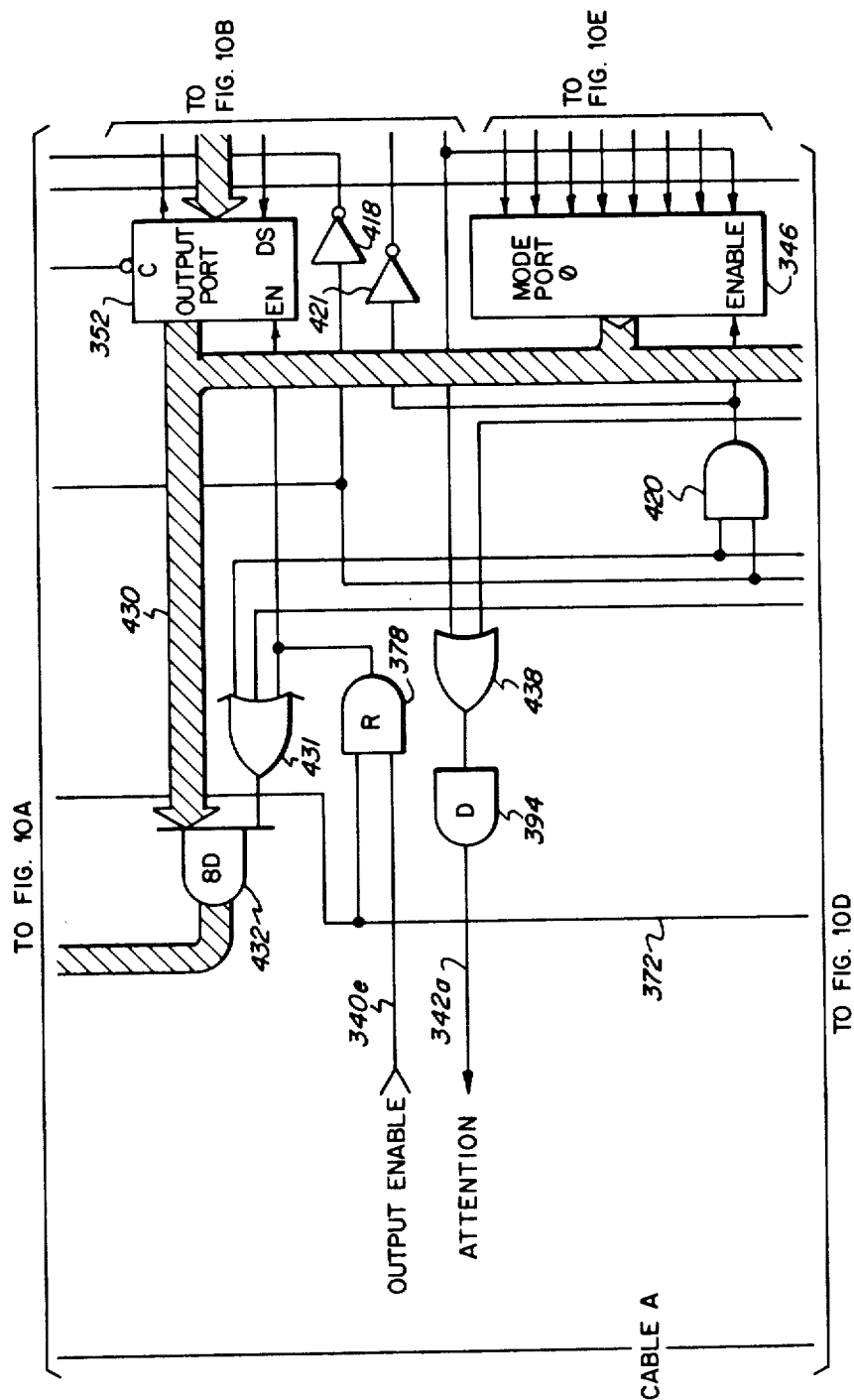
Figure 10D:
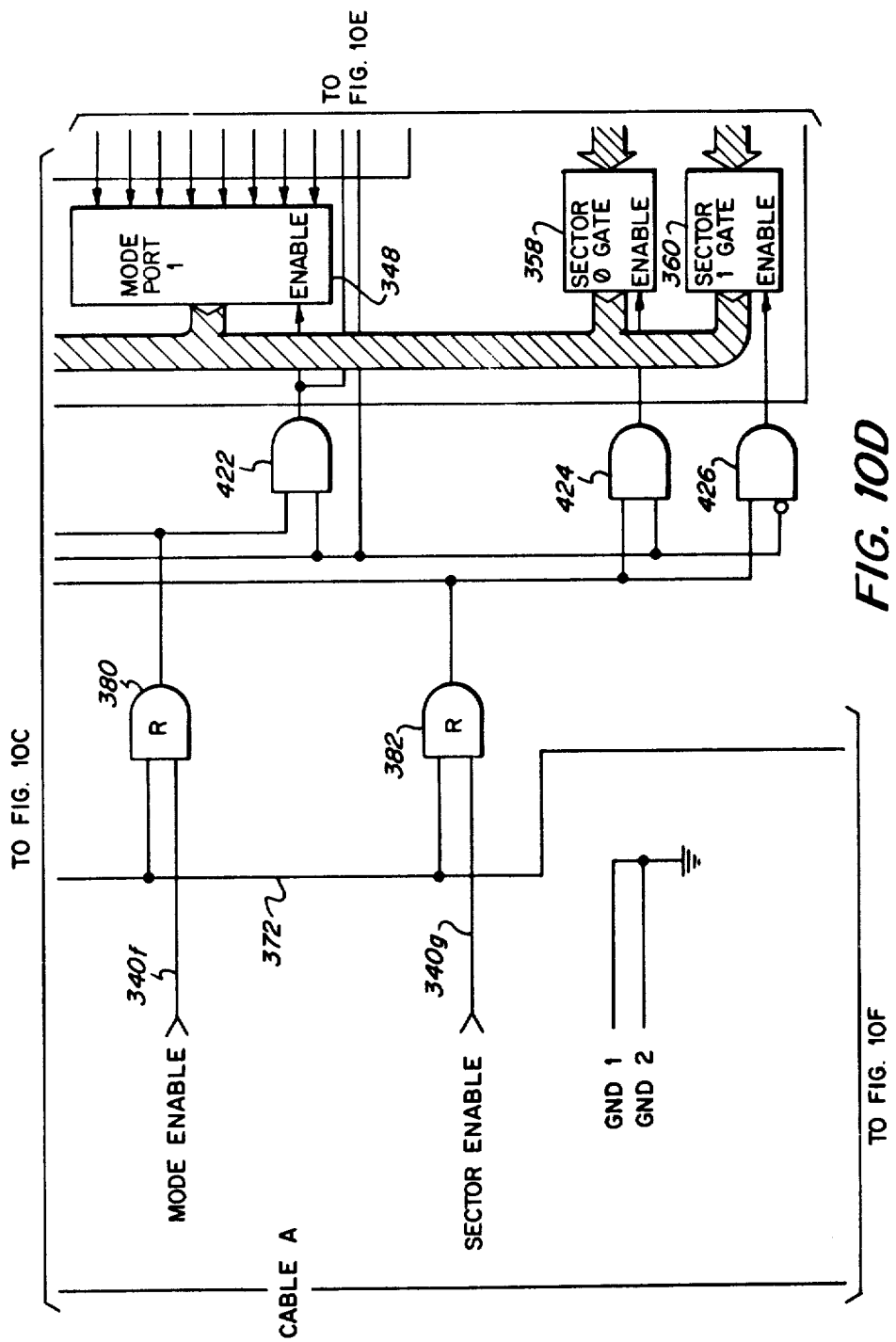
Figure 10E:
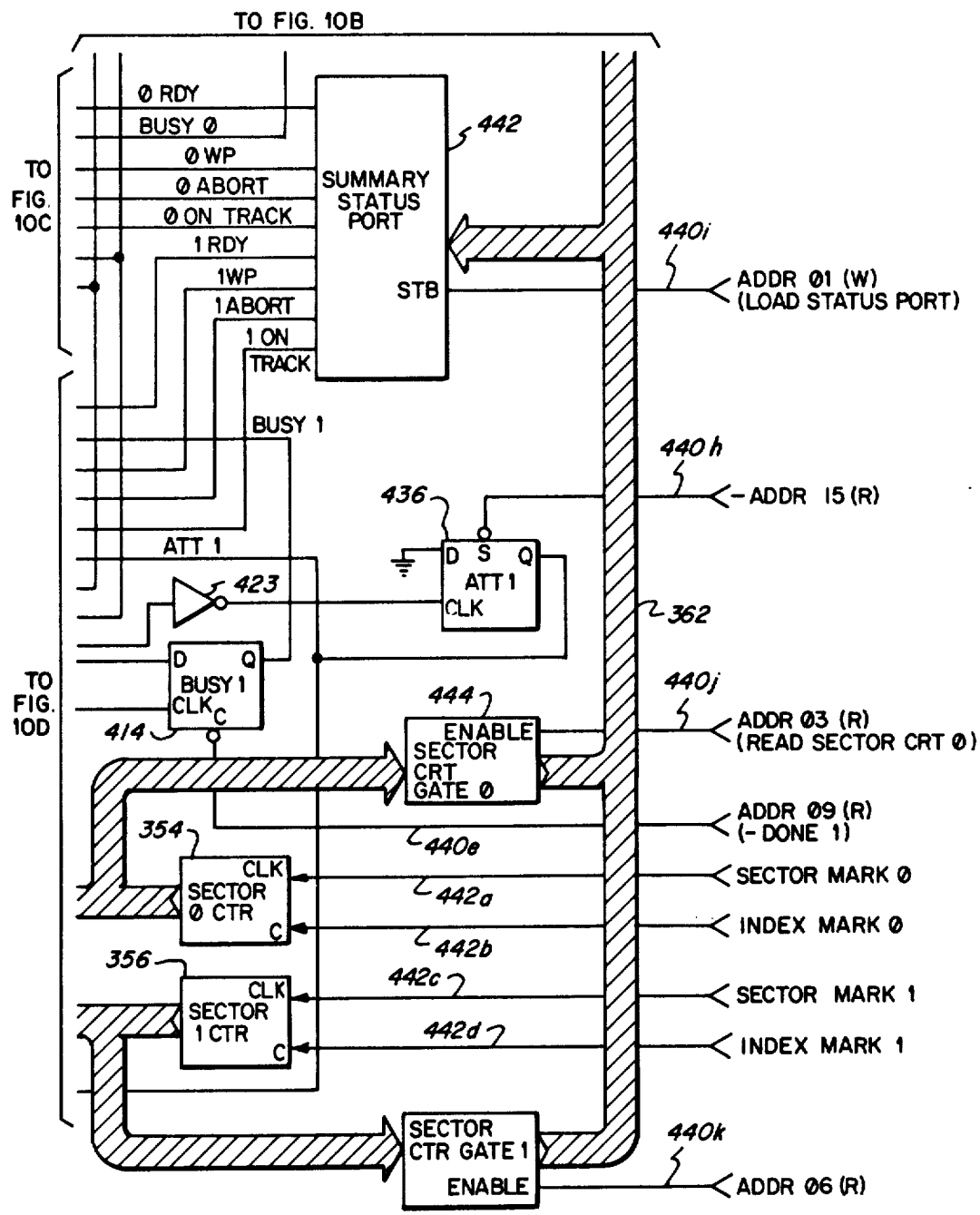

The spindle 30 is rotated to cause simultaneous rotation of the disks 16b – 16d, as well as the disk 16a should the cartridge 28 be loaded into the disk drive 10, by means of a disk drive motor 58, a first pulley 60 mounted to the drive shaft of the motor 58, a second pulley 62 mounted to the lower shaft portion 42 of the spindle 30 and a drive belt 64 stretched between and about the pulleys 60 and 62. The elements 58, 60, 62 and 64 shall hereinafter be referred to as a spindle drive 304 (FIG. 9). As the motor shaft is rotated by operation of the motor 58, the rotary action of such drive shaft will be transferred to the lower shaft portion 42 of the spindle 30, thereby causing the spindle 30 to rotate.

As best shown in FIG. 3, each of the disks 16a – 16d has associated therewith a pair of electromagnetic read/write heads disposed upon either side of the disk. Thus, heads 14a and 14b are disposed on either side of disk 16a, heads 14c and 14d on either side of disk 16b, heads 14e and 14f on either side of disk 16c, and heads 14g and 14h on either side of disk 16d. Each head 14a – 14h is supported on an arm 66 which is, in turn, connected to an arm mounting piece 68. The arms 66 and mounting pieces 68 are identical for each head.

The two mounting pieces 68 associated with the heads 14a and 14b are connected to a common receiver plate 70 (FIGS. 2 and 5) which is, in turn, mounted by suitable means (not shown) to an upper carriage 72 forming part of the linear actuator 12 which will be described in more detail below in connection with FIGS. 5 and 6. The six mounting pieces 68 associated with the six heads 14c – 14h are connected to a common receiver plate (not shown) similar to the plate 70 which is, in turn, mounted by suitable means (not shown) to a lower carriage 78 also forming part of the linear actuator 12. As shall become clear below, the carriages 72 and 78 are independently movable in parallel linear directions so that the heads 14a and 14b may be positioned independently of the heads 14c – 14h. It may thus be said that there are two independent drive units in the disk drive 10, i.e. one with carriage 72, heads 14a and 14b and disk 16a, and the other with carriage 78, heads 14c – 14h and disks 16b – 16d. For purposes of furture discussion, these two independent units shall be respectively designated as unit 0 and unit 1.

Figure 2:
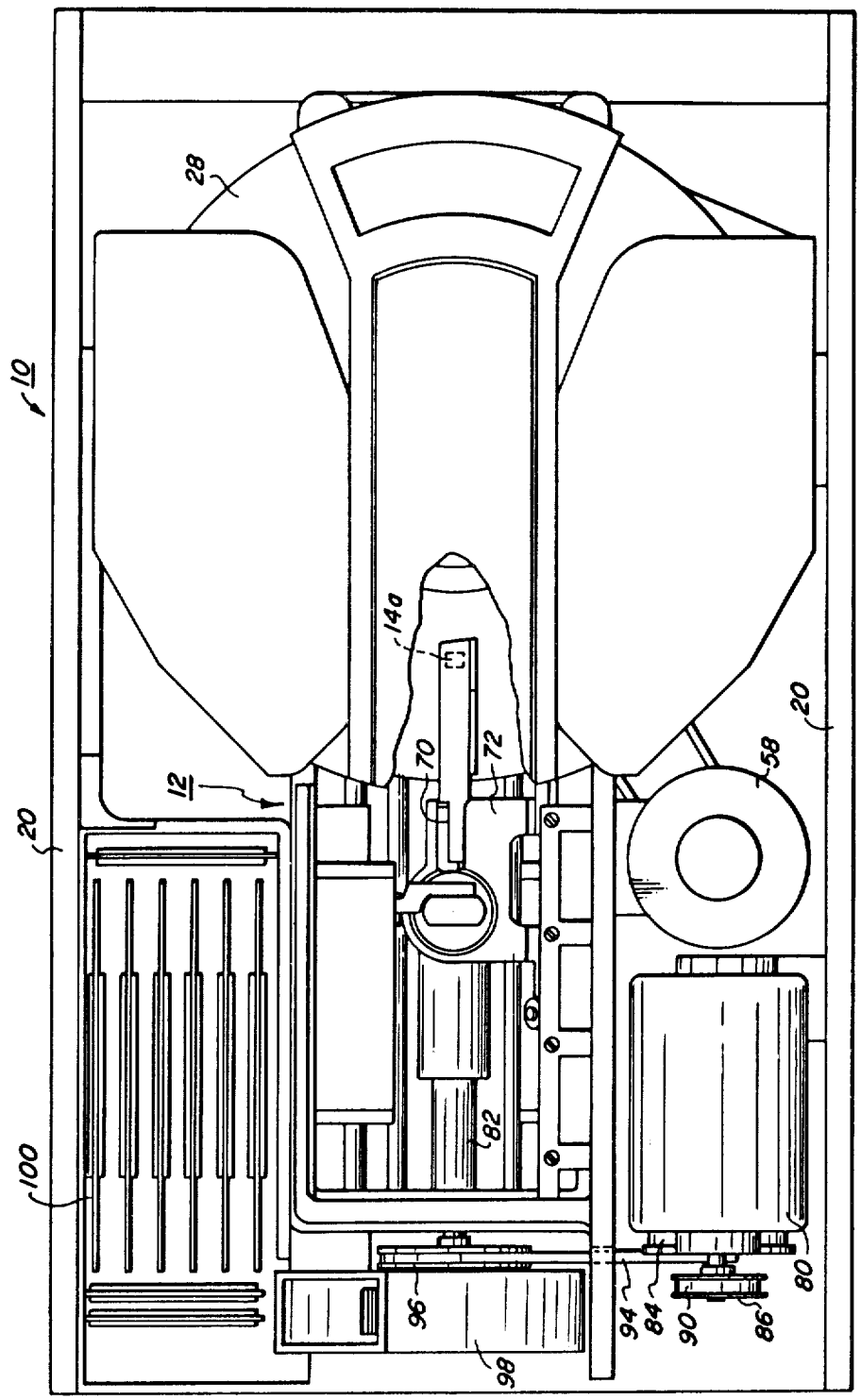

Referring now particularly to FIGS. 2 – 4, a motor 80 is included for rotating a drive shaft 82 forming part of the linear actuator 12 and for rotating the drive shaft of an alternator 84. As will be described in more detail below in connection with FIG. 8, the motor 80 and alternator 84 together form part of a preferred power supply for the disk drive 10. The motor 80 and alternator 84 each have a pulley 86 and 88, respectively, connected to their drive shafts. A drive belt 90 is stretched about and between the pulleys 86 and 88 so that energization of the motor 80 will cause a corresponding energization of the alternator 84. A second pulley 92 (FIG. 3) is connected to the drive shaft of the alternator 84 and it is coupled by means of a drive belt 94 to a pulley 96 connected to the drive shaft 82 of the linear actuator 12. Thus, energization of the motor 80 and thus alternator 84 will cause a corresponding rotation of the drive shaft 82. If desired, pulley 92 and belt 94 could be deleted with pulley 96 reoriented and driven along with pulley 86 and 88 by a single drive belt (not shown). Also connected to the drive shaft 82 of the linear actuator 12, and thus driven by energization of the motor 80, is a fan 98. As is conventional, the fan serves to cool the disk drive 10 during operation by convective cooling. Appropriate ducts (not shown) are included in the overall configuration of the disk drive to assist in such convective cooling.

As shown in FIG. 2, the various electrical and electronic circuits for the disk drive 10 are preferably constituted on a plurality of printed circuit (PC) boards 100 removably mounted to a platform (not shown) suitably connected to the support frame 20. The specific nature of these circuits will be described in detail below in connection with FIGS. 7-20.

Figure 5:
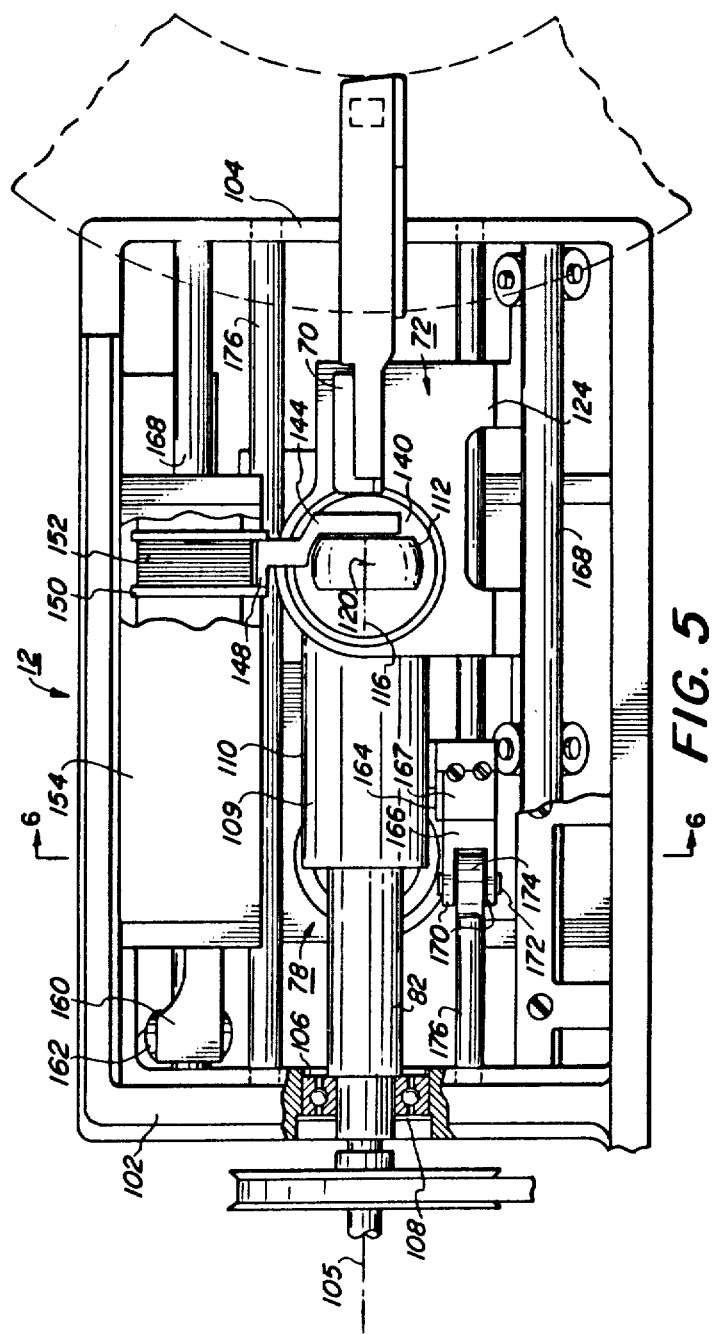
Figure 6:
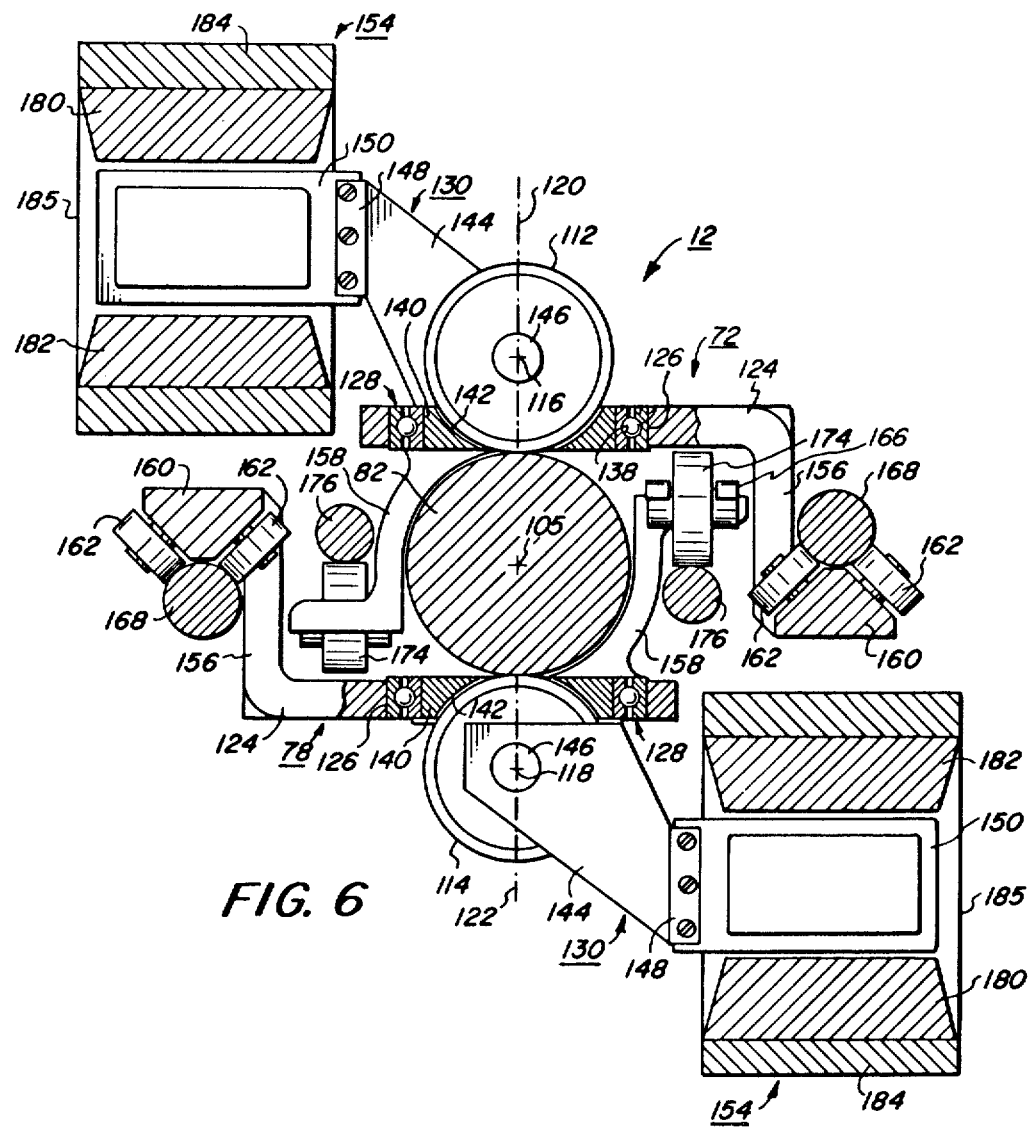

Reference is now had to FIGS. 5 and 6 for a more detailed description of the linear actuator 12. In general terms, the linear actuator 12 is adapted to move each of the carriages 72 and 78 relative to the support frame 20 along a linear path parallel to the axis of rotation of the drive shaft 82. The drive shaft 82 is rotatably mounted to the support frame with its axis of rotation 105 parallel to a desired direction of linear movement for the heads 14a – 14h. More specifically, the support frame 20 has two walls 102 and 104 which are parallel to one another and perpendicular to such desired direction. The walls 102 and 104 have circular openings formed therein with aligned centers. The opening in wall 102 passes completely through the wall, unlike the opening in wall 104. A pair of bearing members 106 are mounted in the openings for receipt of the drive shaft 82 with the axis 105 of the drive shaft intersecting the centers of the openings. The bearing members 106 may be of any suitable type capable of enabling the free rotation of the drive shaft about its axis while restraining movement of the drive shaft in directions perpendicular to such axis. A spring member (not shown) and a snap ring 108 are respectively mounted in the openings in walls 104 and 102 for preventing axial movement of the drive shaft 83 during linear movement of one or both carriages. Specifically, the spring member is disposed between the bearing 106 in wall 104 and such wall and biases the inner ring of the bearing, and thus the drive shaft 82, against the snap ring 108 with a sufficient level of force to prevent such axial movement.

The drive shaft 82 includes an intermediate portion 109 having an outer cylindrical surface 110 which is adapted to be foreceably and frictionally engaged by a pair of follower rollers 112 and 114. These rollers are respectively mounted to the carriages 72 and 78 in a manner whereby each roller is rotatable about its axis and pivotable about a second axis perpendicular to its axis. For purposes of future explanation, the axis of rotation of each roller 112 and 114 shall be referred to as its "first axis." Each carriage 72 and 78 is mounted to the support frame 20 with the carriage being movable relative to the support frame along a path parallel to the axis 105 of the drive shaft 82 and with the follower roller 112 or 114 mounted thereto being a frictional engagement with the cylindrical surface 110 of the drive shaft 82 whereby such roller is caused to rotate about its first axis by rotation of the dirve shaft 82.

Referring specifically to FIG. 6, the first axis of the rollers 112 and 114 are respectively defined by their longitudinal axis 116 and 118, whereas the second axis of the rollers are respectively defined by axis 120 and 122 which are respectively perpendicular to axis 116 and 118 and which respectively intersect the centers of the rollers 112 and 114. Thus, with these rollers having their first axis 116 and 118 parallel to the axis 105 of the drive shaft 82, as shown in FIG. 6, the rollers will be caused to rotate about such axis in the opposite direction to the rotation of the drive shaft 82. In addition, if a roller is pivoted about its second axis so that its first axis becomes oblique to the axis 105 of the drive shaft 82, the roller will, in addition to being rotated about its first axis by rotation of the drive shaft 82, be moved linearly in a direction parallel to the axis of the drive shaft. Looking at FIG. 5, if the roller 112 is pivoted clockwise, for example, from the position shown so that its axis 116 is oblique to the axis 105 of the drive shaft, a counter clockwise rotation of the drive shaft (see FIG. 6) would result in movement of the roller toward the left.

As best shown in FIG. 6, each carriage 72 and 78 has a substantially flat platform portion 124, each of which includes a circular opening 126 formed therein. The means for mounting each follower roller 112 and 114 to its respective carriage then includes a bearing 128 mounted to the carriage within the respective opening 126, and a support member 130 connected to the follower roller for enabling the rotation of the roller about its axis. As will be discussed in more detail below, each support member 130 includes a portion 140 mounted in the respective opening 126 against the bearing 128 in order that the respective follower roller may be pivoted about its second axis.

Still referring to FIGS. 5 and 6, each support member 130 includes a circular platform portion 140 which is fitted in the opening 126 in the respective carriage platform portion 124 against the inner ring 134 of the respective bearing 128. The platform portion 140 is then rotatable about its axis relative to the outer ring of the bearing 128 and thus the respective carriage 72 or 78 in which such bearing is mounted. Each platform portion 140 has an opening 142 formed therein through which a respective follower roller is disposed in order to contact the cylindrical surface 110 of the drive shaft 82 when the platform portion 124 is mounted closely adjacent such cylindrical surface in a manner to be described below.

Each support member 130 further includes an arm 144 integral with and projecting from the platform portion 140 thereof. Bolted to each arm 144 is a shaft 146 about which a respective one of the follower rollers 112 and 114 is rotatable. In this respect, the follower rollers 112 and 114 are each preferably of a type having a built-in bearing suitable to allow rotation of the roller about the respective shaft 146 and sufficient to constrain any other movement of the roller relative to such shaft, e.g. along the axis of the shaft 146. Each shaft 146 is bolted to its respective arm 144 at a location such that the respective follower roller will be received in the opening 142 in the platform portion 140 and will project through the opposite side of the respective platform portion 124.

Each arm 144 has a vertically oriented plate 148 at the outer end thereof. Each plate 148 has mounted thereto a bobbin 150 about which is wound a coil 152. Each coil forms part of a magnetic assembly 154 which will be described in more detail below. At this point, however, it should be noted that when current is made to flow in one direction through the coil 152, it will cause the respective support member 130 to rotate within the opening 126 about its axis thereby causing the respective follower roller 112 or 114 to pivot about its second axis 120 or 122, respectively. In this regard, it will be noted that the axis of rotation of each platform portion 140 is coincident with and defines the second axis of the respective follower roller.

Still referring to FIGS. 5 and 6, the means for mounting each carriage 72 and 78 to the support frame 20 will now be described. As alluded to above, the mounting is such that the carriage, and thus entire head-carriage assembly, is movable along a linear path parallel to the axis 105 of the drive shaft 82, and the respective follower roller 112 or 114 is in frictional and forceable engagement with the cylindrical surface 110 of the drive shaft whereby the roller is caused to rotate about its first axis 116 or 118, respectively, by rotation of the drive shaft 82 when such first axis is parallel to the axis 105 of the drive shaft 82, and is additionally caused to move along such linear path during rotation of the drive shaft when such first axis is oblique to the axis 105. It should be apparent that the greater the angle between the first axis of the follower roller and the axis 105, the faster the linear movement of the respective head-carriage assembly. Also, the faster the follower roller is pivoted about its second axis, the greater the acceleration or deceleration of the head-carriage assembly, as the case may be.

The means for mounting each carriage 72 and 82 to the support frame 20 is identical and so like reference numbers will be used for identical parts. Each carriage 72 and 78 includes first and second flange portions 156 and 158 integral with the respective platform portion 124 and extending in a direction away from the respective follower roller 112 or 114 mounted thereto. Each flange portion 156 includes a pair of support bars 160 mounted at either end thereof. Each bar 160 is preferably generally triangular in cross-section, as best shown in FIG. 6, and has a pair of guide rollers 162 rotatably mounted to the sloped sides thereof. There are thus four guide rollers 162 mounted to each carriage 72 and 78 and forming a part of the overall head-carriage assembly including such carriage. The guide rollers 162 of each head-carriage assembly are adapted to frictionally and forceably engage a guide rail 168 fixedly mounted by suitable means to the side walls 102 and 104 of the support frame 20 with the axis of the rail 168 being parallel to the axis 105 of the drive shaft 82.

Each flange portion 158 terminates in a generally horizontal support pad 164 having a leaf spring 166 mounted to the underside thereof by a mounting plate 167. Each leaf spring 166 extends outwardly from its support pad 164 in a direction opposite the location of the disks 16a -16d, i.e. toward the back wall 102 of the support frame 20. The spring has a pair of angled flange portions 170 adapted to engage the shaft 172 of a load roller 174 included in each head-carriage assembly. In this respect, the shaft 172 extends from either side of the roller 174.

Each spring 166 is adapted to forceably bias its respective load roller 174 against a load rail 176. There are thus two load rails 176, one associated with each carriage 72 and 78 and thus with each head-carriage assembly. Each load rail 176 is fixedly mounted suitable means to the side walls 102 and 104 of the support frame 20 and extends in a direction parallel to the axis of the drive shaft 82 and the guide rail 168. Preferably, the rails 168 and 176 each extends a distance substantially coextensive with the drive shaft 82 as mounted between the frame walls 102 and 104.

In accordance with the preferred embodiment, the drive shaft 82 is continuously rotated regardless of whether or not a particular carriage or both carriages may be at an "inactive" position, i.e. with heads retracted. Rotation is desirably continuous in order to keep the alternator 84 and fan 98 operating continuously.

The magnetic assemblies 154 will now be discussed with reference to FIGS. 5 and 6. It will be recalled that each assembly 154 constitutes part of a means for selectively and controllably pivoting the respective follower roller 112 or 114 about its second axis 120 or 122, respectively, during the rotation of the drive shaft 82 in order to control the movement of the follower roller and thus the respective carriage and head-carriage assembly along a linear path parallel to the axis 105 of the drive shaft 82.

Each magnetic assembly includes a pair of elongate permanent magnets 180 and 182 which are mounted to a housing 184 in spaced apart relation. Positioned in the space between the magnets 180 and 182 is the associated coil wound bobbin 150. The bobbin 150 is capable of traversing the elongate space between the magnets during linear movement of the respective carriage and is also capable of movement along an arcurate path relative to the second axis 120 or 122 of the associated follower roller 112 or 114, respectively, in order to pivot the roller about such axis. In this respect, the clearance between each bobbin 150 and the adjacent side wall 185 of the housing 184 is made large enough to allow such arcurate movement unobstructed. The magnetic field established between the magnets 180 and 182 is such that the bobbin will move in one direction along the above referenced arcurate path during energization of the coil 152 in one direction and will move in the opposite direction upon energization of the coil 152 in the other direction. In this manner, the direction of linear movement of each head-carriage assembly can be controlled. The specific manner in which current is applied to the coils 152 will be discussed in more detail below in connection with FIG. 7.

Further included in each magnetic assembly 154 are a pair of limit stops (not shown). One stop is mounted to the housing 184 between the magnets adjacent the rearward end of the path of travel of the bobbin 150, i.e. at that portion of such path of travel furthest from the location of the disks 16a – 16d in the disk drive 10. Correspondingly, the other stop is mounted to the housing 184 between the magnets adjacent the forward end of the bobbin's path of travel. The two stops, of course, act to define rearward and forward limits to the path of travel of the bobbin 150 and thus the respective head-carriage assembly during energization of the coil 152 wound on such bobbin. Appropriate emergency stops (not shown) may be provided at appropriate locations in the disk drive in the event the control current to the coil 152 ceases during movement of the respective head-carriage assembly.

Figure 7:
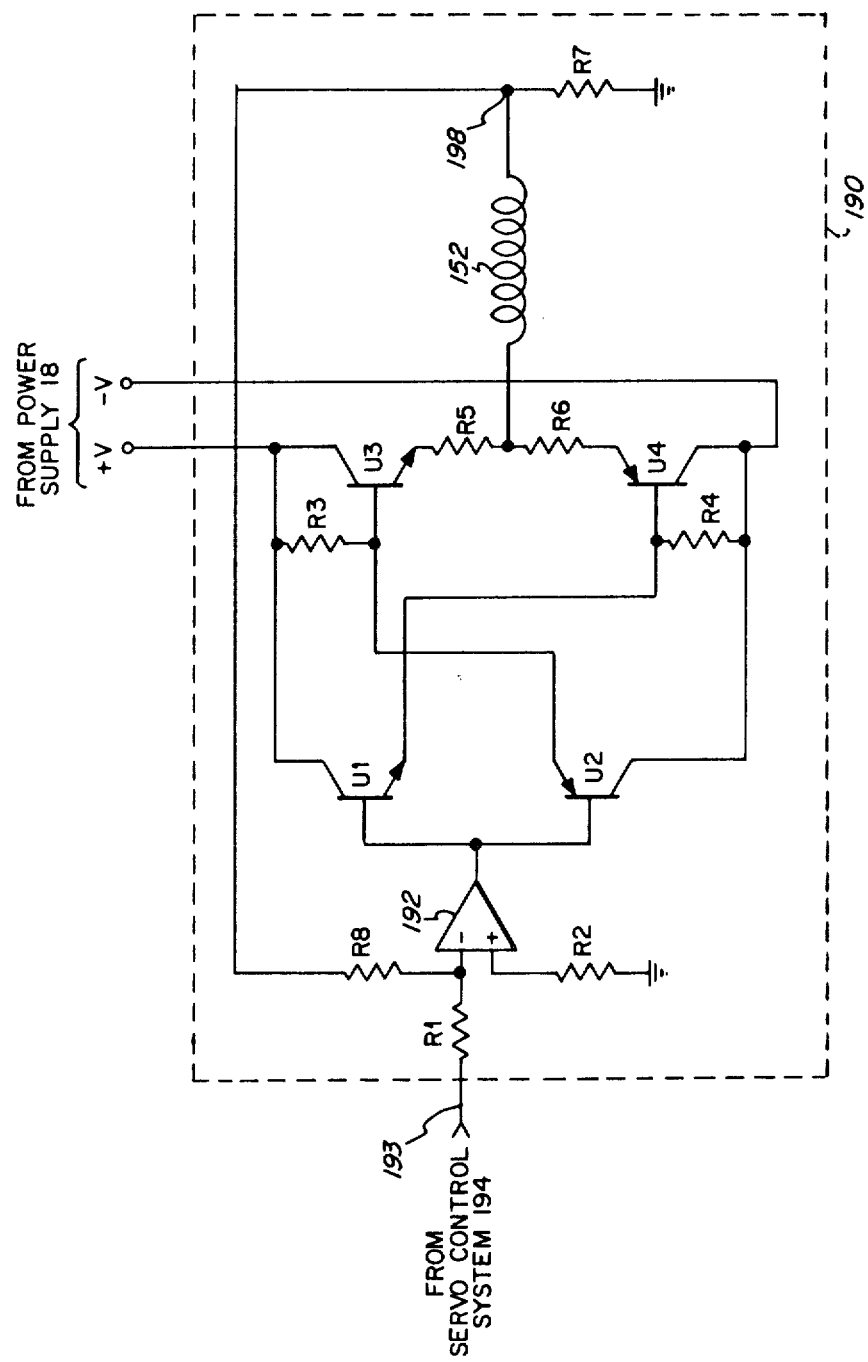
FIG. 7 is a schematic diagram of the coil driver circuits employed in the disk drive of FIGS. 1–6.

Reference is now had to FIG. 7 wherein an exemplary driver circuit 190 for energizing the coil 152 in each magnetic assembly 154 is shown. The driver circuit includes an operational amplifier 192 having its negative input coupled through a resistor R1 to a control output line 193 of a servo control system (FIG. 9) and its positive input coupled to ground through a resistor R2. The servo control system 194 and the nature of the control signal applied on line 193 will be described in more detail below. At this point, it should be noted that each circuit 190 is included in the forms part of a carriage drive associated with each unit 0 and 1 of the disk drive 10. Referring to FIG. 9, a carriage drive for unit 0, i.e. carriage —0 drive 300, includes a circuit 190 wherein the control input thereto from the servo control system 194 for unit 0 is applied ona line 193a. Correspondingly, a carriage −1 drive 302 includes a circuit 190 which receives its control input from the servo control system 194 for unit 1 on line 193b.

Figure 8:
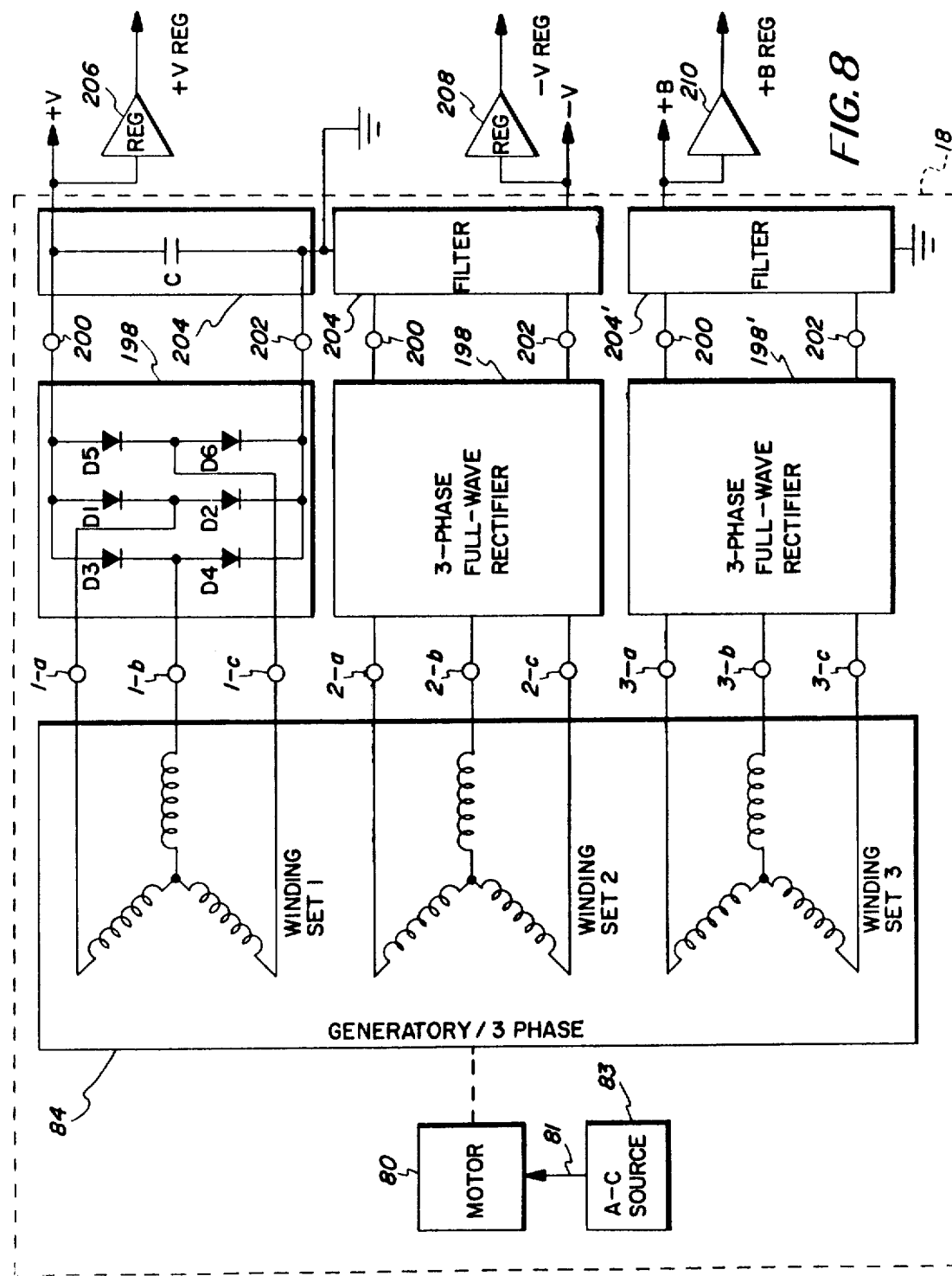
FIG. 8 is a schematic diagram of the d-c power supply employed in the disk drive of FIGS. 1–6.

Referring again to FIG. 7, the output of the amplifier 192 is coupled to the base electrode of an NPN transistor U1 and to the base electrode of a PNP transistor U2. The collector electrode of the transistor U1 is coupled to a source of positive d-c voltage (+V) as supplied by a preferred d-c power supply 18 (FIG. 8). Voltage +V is also supplied to the collector electrode of another NPN transistor U3. The power supply also generates a negative d-c voltage (−V) which is coupled to the collector electrode of the transistor U2 and to the collector electrode of another PNP transistor U4.

The emitter electrode of the transistor U1 is coupled to the base electrode of the transistor U4 and the emitter electrode of the transistor U3. Additionally, a resistor R3 is coupled between the base and collector electrodes of the transistor U3 and a resistor R4 is coupled between the base and collector electrodes of the transistor U3 and U4 are coupled together through a pair of resistors R5 and R6. The coil 152 is then coupled at one end to the junction of the resistors R5 and R5 and at the other end to a terminal 198 which is coupled to ground through a resistor R7 and is also coupled in feedback relation through a resistor R8 to the negative input of the operational amplifier 192.

In operation, a positive control signal received at the negative input to the amplifier 192 will be inverted and applied to both transistors U1 and U2. The negative signal will cause only the transistor U2 to turn on, thereby turning on transistor U3 and causing a current flow from right to left through the coil 152 as shown in FIG. 9. The current flow will continue to increase until the current flowing through resistor R1 equals that flowing through resistor R8. At this point, the output of the amplifier 192 will go positive, thereby turning off transistors U2 and U3. This point corresponds to the associated follower roller 112 or 114 being pivoted a desired amount in order to attain a desired velocity for the particular distance remaining to be traveled by the associated head-carriage assembly. The current flow through the coil 152 will start to decay thereby resulting in transistors U2 and U3 turning on again after a short peiod. The resulting pulsing action will continue as the head-carriage assembly is moved toward its desired stopping position, except that the control signal will be progressively slower movement of the head-carriage assembly. This is continued until the desired stopping position is reached, at which point the control signal will be zero.

When it is desired to move the head-carriage assembly in the opposite direction, a negative control signal will be applied to the negative input of the amplifier 192 resulting in a positive output thereof which turns on transistor U1 and U4 thereby causing a current flow through the coil 152 from left to right as viewed in FIG. 9. This will be continued until the desired pivotal position of the respective follower roller is reached, which corresponds to the current flow through resistor R1 equaling that through resistor R8. The same pulsing operation will then take place as described above until the head-carriage assembly reaches its desired stopping position.

It must be pointed out that any suitable coil driver circuit capable of controlling the direction and level of current flow through each coil 152 may be used. The one shown in FIG. 7 is merely exemplary. Further, it must be understood that the resultant magnetic field established in each magnetic assembly 154 by the current flowing in the coil 152 in relation to the permanent magnets 180 and 182 determines the direction of pivotal movement of the respective follower roller; and the pivoting force defined by that resultant magnetic field considered in relation to the torque necessary to pivot the follower roller determines the speed with which the follower roller can be pivoted to a desired pivotal position, such speed directly determining the acceleration of the assembly up to a velocity defined by such a desired pivotal position.

Reference is now had to FIG. 8 which discloses a preferred power supply 18 for the disk drive 10. As shown in FIG. 8, the power supply includes the drive motor 80 which is driven at a predetermined rate of speed when energized by a suitable a-c voltage as applied along a transmission line 81 from an a-c voltage as applied along a transmission line 81 fram an a-c source 83. As will be recalled, energization of the motor 80 will cause the alternator 84 to be correspondingly driven and the drive shaft 82 correspondingly rotated. The alternator 84 also forms part of the power supply 18 and preferably includes three sets of 3-phase windings, as schematically shown. Alternators of this type are well known in the art.

As shown in FIG. 8, winding set 1 of the alternator 84 is capable of generating an a-c voltage at an output terminal 1a having a peak amplitude equal to the d-c voltage V plus the voltage drop across either of a pair of matched diodes D1 and D2 included in a 3-phase full-wave rectifier circuit 198. The output terminal 1-2 is coupled to the cathode of diode D1 and the anode of diode D2. The same a-c voltage as developed at the terminal 1a is also developed at additional output terminals 1b and 1c, but are mutually phase-displaced from one another by 120°. The terminal 1b is coupled to the cathode of a diode D3 and the anode of a diode D4, and the terminal 1c is coupled to the cathode of a diode D5 and the anode of a diode D6. All six diodes D1 – D6 are matched.

As is conventional, the anodes of the diodes D1, D3 and D5 are each coupled to one output terminal 200 of the rectifier 198 and the cathodes of the diodes D2, D4 and D6 are each coupled to another output terminal 202. In this manner, the positive d-c voltage +V is developed at the terminal 200 having a ripple frequency six times that of the frequency of each a-c signal developed at terminals 1a, 1b and 1c. For example, and preferably, these a-c signals have a frequency of 67 Hz so that the ripple component of +V at the terminal 200 will be at 400 Hz. Similarly, the negative d-c voltage −V is developed at the terminal 202 having the same ripple frequency.

The signals at terminals 200 and 202 are coupled to either side of a filter capacitor C included in a filter 204, wherein the side coupled to terminal 202 is grounded and the output of the filter is taken solely from the terminal 200 side of the capacitor C. The capacitor C, of course, smooths out the ripple component of the d-c voltage +V. In view of the fact that the ripple frequency is so high, the capacitor C may be relatively small, e.g. 100 mf, thereby reducing the cost and size of the power supply. If desired, the developed d-c voltage +V may also be fed through a suitable voltage regulator 206.

In a similar manner to that described above, the negative d-c voltage −V may be developed from the second winding set of the alternator 84. The same a-c voltages are developed at terminals 2a, 2b and 2c as terminals 1a, 1b and 1c, and an identical 3-phase full-wave rectifier 198 is employed which is coupled to an identical filter 204. The only difference is that the output of the filter is taken from the terminal 202 side of the capacitor C, since the terminal 200 side is grounded. The developed d-c voltage −V may also be fed through a suitable voltage regulator 208, if desired.

It will be recalled that the d-c voltages +V and −V are utilized in the coil driver circuits 190 depicted in FIG. 7. Aside from this circuit and other special circuits in the disk drive 10, the main control logic, of which a portion is included in the servo control systems 194 (FIG. 9), might require a different, usually lower level d-c voltage, e.g. +B. The power supply 18 is capable of generating this voltage in addition to the voltages +V and −V. This is accomplished by the third winding set of the alternator 84 in a manner similar to that described above for the generation of voltages +V and −V. In this case, however, the a-c voltages developed at each of the terminals 3a, 3b and 3c will have a peak amplitude equal to the desired d-c level of voltage +B, plus the voltage drop across each diode included in the respective full-wave rectifier 198. It is preferred that the frequency of these a-c voltages be the same as that for the a-c signals developed at the output terminals of the first second winding sets so that a relatively small filter capacitor may be employed in the respective filter 204'. As before, the developed voltage +B can be regulated by a suitable regulator 210.

II. CONTROL SYSTEM

In describing the control system employed in the disk drive 10, it would first be helpful to review the nature of the switches and indicator lights included on the control and display panel 26 shown in FIG. 1. A START/STOP switch 306 is included in order to provide a means for the operator to start and stop the disk drive 10. The removable cartridge 28 (FIGS. 2 and 3) may be inserted or removed when the switch 306 is in the STOP position and a TRANSITION indicator light 308, to be described below, is extinguished. Switching to the START position will cause the control system to bring the disk drive up to normal operating speed in about 30 seconds. When the switch is again moved to the STOP position, the disk drive decelerates to a stop in about 30 seconds, after which the TRANSITION light goes out and the cartridge 28 may be interchanged.

The TRANSITION indicator light 308 will be illuminated if the disk drive 10 is in a transition stage. More specifically, the light 308 will be on just after the START/STOP switch 306 is moved to the START position and will extinguish when one of the other indicator lights included on the panel 26 and to be described below comes on. The TRANSITION light 308 will again come on when the switch 306 is moved to the STOP position and will extinguish when the drive spindle 30 has stopped rotating.

The display panel 26 also includes a pair of READY indicator lights 310 and 312. READY light 310 is associated with the upper unit −∅ and READY light 312 is associated with the lower unit −1. When the READY lights are lit, this indicates to the operator that the drive spindle 30 is up to proper speed, that the heads 14a − 14h are in position over track on their respective disk surfaces, and that no other conditions exist that would prevent a track seek, read or write operation from being carried out. The lights 310 and 312 will be extinguished when the START/STOP switch 306 is set to the STOP position. If the drive 10 is operated without the removable cartridge 28 in place, only the READY indicator light 312 can come on.

The panel 26 further includes a pair of WRITE PROTECT switches 314 and 316. Switch 314 is associated with the upper unit −∅ and switch 316 with the lower unit −1. When either switch 314 and 316 is in the ON position, the respective disk surfaces will always be protected from writing. With the switch in the OFF position, writing may be allowed unless a WRITE PROTECT command is issued by a host controller 318 (FIG. 9) for the disk drive 10. Such a command and the manner in which it is handled by the drive will be discussed in more detail below.

The display panel 26 additionally includes a CARTRIDGE MISSING indicator light 320 which, when lit, indicates that a cartridge 28 has not been loaded into the drive. A FAULT indicator light 322 is also included on the panel 26. When lit, it indicates that, due to some abnormal condition, the disk drive 10 is not operating properly. If a fault condition occurs which effects only one of the two units ∅ and 1, its READY light will extinguish and the other unit will continue to operate normally. The nature of the fault conditions which will cause the FAULT indicator light 322 to be lit will be described later.

The control and display panel 26 lastly includes a receptacle for an "ID plug" 324. Selection of one particular disk drive in a system where multiple drives are used is determined by the ID plug 324 which provides a unique logic address. A particular drive is selected, therefore, by issuing the appropriate address. The specific manner in which a plurality of "daisy-chained" drives can be selected will be described in more detail below.

Reference is now had to FIG. 9 where the control system of the disk drive 10 will be described in more detail. Generally speaking, the control system is operative to control the carriage −∅ drive 300 for controlling linear movement of the head carriage 72 and thus heads 14a and 14b, the carriage −1 drive 302 for controlling linear movement of the head carriage 78 and thus heads 14c − 14h, the spindle drive 302 for controlling rotation of the disks 16a − 16d, and the heads 14a − 14h for controlling the reading and writing of data to and from the respective surfaces of the disks 16a − 16d.

The control system communicates with the controller 318 by means of an interface 326 and, in terms of its basic components, includes a processor 328, a pair of servo control systems 194 (one for each unit of the drive), tracking circuits 330, position transducer circuits 332 and 334 for units ∅ and 1, respectively, and read/write circuits 336. The interrelationship of these various components will be described in detail below. At this point, however, it should be noted that the interface 326 receives input data and instructions from a host controller 318 and forwards data and instructions to the processor 328 and to the read/write circuits 336. The interface 326 also receives data and instructions from the processor 328. The processor 328, in addition, forwards data and instructions to the servo control systems 194, the tracking circuits 330 and the read/write circuits 336, and receives data from the servo control system 194, tracking circuits 370 and read/write circuts 336. Further, the processor 328 applies instructions to the carriage −0 drive 300, the carriage −1 drive 302 and the spindle drive 304. The various data and control busses and control lines depicted in FIG. 9 will be described in more detail below when describing each of the components of the control system.

As shown in FIG. 9, a host controller 318 is provided for applying various command signals to the disk drive, as received by the interface thereof, and for applying read data to the drive for writing on a selected track or "cylinder" of a selected disk surface. From the standpoint of the controller 318, the disk drive 10 appears much like two independent drives, i.e. unit −0 and unit −1 as defined above. The host controller 318 may comprise any suitable disk drive controller.

Generally speaking, the controller 318 can initiate a "seek" operation to the heads of a selected unit by issuing a "cylinder" command to such unit. By seek operation it is meant moving the heads of the selected unit to a desired track location on the respective disk surfaces. The terms "track" and "cylinder" are hereinafter to be deemed synonymous. Upon completion of a seek operation, the controller 318 issues a "head" command to select the desired head of the selected unit. As will become clear below, the selected head reads servo information prerecorded within each of a plurality of sectors defined on the disk surface to achieve precise head alignment over the center of the desired track.

III. INTERFACE

The disk drive 10 may be connected to the controller 318 in either a radial or daisy chain configuration. The drive uses three cables (A, B and C) shown in FIG. 10. Cable A is preferably a 26-conductor flat ribbon cable which includes an 8-line control bus 338. The cable also includes 8 input control lines (shown generally as a single line 340 in FIG. 9), and two output control lines (shown generally as a single line 342 in FIG. 9). The first and twenty-sixth lines are grounded and the remaining lines are unused. Cables B and C are preferably both twin coax type cables and respectively carry read/write data and clock information.

The general definition of the signals that may be carried on the control cable A shall now be described with reference to FIG. 10 as follows:

(1) SELECT STROBE — This signal is applied on a line 340a and, when high, strobes a disk unit select code from the control bus 338 into the drive in a manner to be described below.

(2) CONTROL BUS — The control bus 338 transfers disk unit select codes, command and sub-command codes, and information bytes from the controller 318 to the disk drive. Additionally, it transfers status and sector counter bytes from the drive 10 to the controller 318. The nature of each of these codes and bytes will be described below.

(3) SUBCOMMAND STROBE — This signal is applied on a line 340b and, when high, strobes an 8-bit sub-command signal applied on the control bus 338 into an input port 344. It also causes the input port 344 to raise an INPUT FULL signal that is applied from the input port to one input of an 8-bit mode port −0, designated 346 and associated with unit 0, to one input of an 8-bit mode port −1, and to one input of an I/O tag port 350. The specific nature and purpose of these ports will be described in more detail below.

(4) COMMAND STROBE — This signal is applied on a line 340c and, when high, strobes an 8-bit command signal applied on the control bus 338 into the input port 344. It also causes the input port to raise the INPUT FULL signal.

(5) SYSTEM CLEAR — This signal is applied on a line 340d and, when low, clears the input port 344 and an output port 352 in a manner to be described below.

(6) OUTPUT ENABLE — This signal is applied on a line 340e and, when high, gates the output port onto the control bus 338 for application to the controller 318. In addition, it causes the output port 352 to reset an OUTPUT FULL signal applied from the output port 352 to another input of each of the mode ports 346 and 348, as well as the I/O tag port 350.

(7) ATTENTION — The signal is applied on a line 342a and is raised any time an important change of status occurs in either unit of the drive. It is reset at the trailing edge of a MODE ENABLE signal to be described below.

(8) MODE ENABLE — This signal is applied on a line 340f and, when high, gates the mode port of the selected unit onto the control bus 338 for transmittal to the controller 318.

(9) SECTOR ENABLE — This signal is applied on a line 340g and, when high, applies the contents of a sector counter associated with the selected unit onto the control bus. A sector counter 354 and sector counter gate 358 is associated with the unit 0, and a sector counter 356 and sector counter gate 360 with the unit 1. The function and purpose of these components will be described in detail below.

(10) SECTOR PULSE — This signal is applied on a line 342b and, when high, is used to indicate the beginning of a sector for timing the start of a read or write operation.

(11) READ GATE — This signal is applied on a line 340h and is used to control the beginning and end of data reading.

(12) WRITE GATE — This signal is applied on a line 340i and is used to control the beginning and end of data writing.

Before describing the interface 326 in more detail from a hardware standpoint, it would be helpful first to understand the nature of the information transmitted on the control bus 338 from the host controller 318. The information consists of 8-bit bytes called commands and sub-commands. They are defined as follows:

COMMANDS (1) RESTORE — This is the general reset command for the selected unit and causes the head carriage assembly of such unit to be moved to a position with the heads thereof over track "0."

(2) CYLINDER — This command indicates that the following two bytes applied on the control bus 338 represent the new cylinder (track) address, of which the least significant byte is sent first.

(3) HEAD — This command indicates that the following byte applied on the control bus 338 is the head select byte, i.e. the particular head in the selected unit desired for reading or writing.

(4) STATUS REQUEST (A, B, C OR D) — After execution of any one of these four commands, the processor 328 applies a corresponding status byte A, B, C or D onto a data bus 362 and then loads this byte into the output port 352 by issuing an appropriate load command in a manner to be described below. The specific nature of the various status bytes A, B, C and D will be described in more detail below.

(5) RESET WRITE PROTECT — This command causes the selected unit to be taken out of a write protect mode only if the write protect switch for that unit (i.e. switch 314 or 316 — FIG. 1) is not on. If the switch is on, the command will abort with an illegal command status, as will be made clear below.

(6) SET WRITE PROTECT — This command puts the selected unit into a write protect mode.

(7) TRACK OFFSET — There are seven of these commands, six of which cause the selected unit to offset its heads in or out from track center by a predetermined fraction of a track width (e.g. 100uin). The seventh command is "on-track." Track offset is used for data recovery only and, as will be seen, when a TRACK OFFSET command is received, the drive 10 automatically sets write protect to eliminate any possibility of offset writing.

(8) WRAPAROUND TEST — This command initiates a diagnostic test that checks the control bus 338 and the various receivers and drivers (to be described below). This command is followed by one byte of wrap data from the controller. The processor 328 will cause this byte to be immediately shifted from the input port 344 to the output port 352 for transfer back to the controller 318. The controller may verify the test result by comparing data sent with data received.

Sub-Commands (9) UNIT SELECT CODE — This sub-command is comprised of five bits of data, wherein the four most significant bits identify the disk drive to be selected, and the least significant bit identifies the particular unit (∮ or 1) to be selected.

(10) CYLINDER ADDRESS LS — This sub-command is the first byte of data transmitted on the control bus 338 following a CYLINDER command and represents the eight least significant bits of the 16-bit track address.

(11) CYLINDER ADDRESS MS — This sub-command is the second byte of data transmitted following a CYLINDER command and represents the eight most significant bits of the track address.

(12) HEAD ADDRESS — This sub-command follows the HEAD command and identifies the particular head in the selected unit to be activated for reading or writing.

(13) WRAP DATA — This sub-command follows the WRAPAROUND TEST command and represents the test byte to be received by the drive 10 and immediately returned to the controller 318.

Still referring to FIG. 10, the specific circuits forming part of the interface 326 will now be described. The interface 326 includes a select circuit 364 having a clock input connected to the SELECT STROBE line 340a through a receiver 366. The select circuit 364 also includes a first set of four inputs adapted to receive the 4-bit ID plug address from the address plug 324. A second set of five inputs are included in the circuit 364 for receiving the 5-bit UNIT SELECT CODE sub-command from the controller 318, as applied along respective lines of the 8-bit control bus 338, through a respective five receivers 368 in a bank of eight receivers 368, and along respective lines of an 8-bit transfer bus 370. The transfer bus 370 is also connected to the inputs of the input port 344.

As indicated above, the UNIT SELECT CODE is loaded into the select circuit 364 when the controller 318 raises the SELECT STROBE on line 340a. The select circuit 364 includes conventional comparison circuitry for comparing the four most significant bits of the UNIT SELECT CODE with the 4-bit ID plug address. If the signals match, a DRIVE SELECTED signal is raised at the output of the circuit 364. The circuitry 364 also includes conventional sampling circuitry for sampling the state of the least significant fifth bit of the UNIT SELECT CODE. If this bit is a binary "1," then a UNIT-1 SELECTED signal at another output of the circuit 364 will be raised. If the fifth bit is a binary "0," then the UNIT-1 SELECTED signal will remain low.

The DRIVE SELECTED signal is applied on a line 372 to one input of each of a plurality of receivers 374, 376, 378, 380, 382, 384 and 386, and to one input of a driver 388. When the DRIVE SELECTED signal goes high, each of these receivers and drivers will be enabled to gate through a signal received at its second input.

More specifically, the second input of the receiver 374 is connected to the control line 340b for receiving a SUBCOMMAND STROBE signal, the second input of the receiver 376 is connected to the line 340c for receiving a COMMAND STROBE signal, the second input of the receiver 378 is connected to the line 340e for receiving an OUTPUT ENABLE signal, the second input of the receiver 380 is connected to the line 340f for receiving a MODE ENABLE signal, the second input of the receiver 382 is connected to the line 340g for receiving a SECTOR ENABLE signal, the second input of the receiver 384 is connected to the line 340h for receiving the READ GATE signal, the second input of the receiver 386 is connected to the line 340i for receiving the WRITE GATE signal, and the second input of the driver is connected to a line 390 for receiving an ESM (Electronic Sector Mark) signal from the read/write circuits 336. When this signal is received, the driver 388 raises the SECTOR PULSE signal on line 342b. The specific manner in which the ESM signal is generated will be described in more detail below.

Another receiver 392 is provided for directly receiving and transmitting a SYSTEM CLEAR signal, whereas another driver 394 is provided for directly receiving and transmitting an ATTENTION signal on line 342a. A further receiver 396 is provided in circuit with cable B for receiving data to be written from the controller 318 and applying such data along the cable B to the read/write circuits 336. Additionally, a driver 398 is provided in circuit with cable B for receiving read data from the read/write circuits 336 and forwarding it to the controller 318. A driver 400 is also included in circuit with cable C for receiving clock information from the read/write circuits 336 and forwarding it to the controller 318.

If the select circuit 364 determines that the UNIT SELECT CODE has selected the subject drive and unit 1 thereof, the UNIT 1 SELECTED signal will be raised as discussed above. This signal is applied to the data input of a "command unit 1" flip-flop 416, through an inverter 418 to the data input of a "busy-∮" flip-flop 412, to one input of an AND-gate 420, to an inverted-input of an AND-gate 422, to the data input of a "busy-1" flip-flop 414, to one input of an AND-gate 424 and to an inverted-input of an AND-gate 426. The purpose of these flip-flops and gates will be described in more detail below.

A COMMAND STROBE signal gated through the receiver 376 is applied through an inverter 404 to the set input of a command flip-flop 406. When set, the flip-flop will apply a high level COMMAND signal to one of six active inputs of the I/O tag port 350. The COMMAND STROBE signal is also applied from the output of the receiver 376 through an OR-gate 408 to the enable input of the input port 344 so that an 8-bit command signal on the transfer bus 370 will be loaded into the input port 344. The input port 344 will, in turn, generate an INPUT FULL signal that is applied to an input of the I/O TAG port 350, to the clock input of the command flip-flop 416 for raising a COMMAND UNIT 1 output line if the UNIT 1 SELECTED signal applied at the data input was high. The COMMAND UNIT 1 signal is applied to another input of the I/O tag port 350. The INPUT FULL signal is also applied to one input of the mode port 346 and to one input of the mode port 348.

A COMMAND STROBE received by the receiver 376 is also applied to one input of an AND-gate 410, another input of which is connected to one line of the transfer bus 370. The output of the gate 410 is applied to the clock input of each of a pair of "busy" flip-flops 412 and 414. Accordingly, if a command is present on the transfer bus 370 when a COMMAND strobe is received, the output of the AND-gate 410 will go high, clocking the two BUSY flip-flops 412 and 414. If unit 1 was selected (i.e. UNIT 1 SELECT signal is high), then only the output of the flip-flop 414 will be high, whereas if unit ∅ was selected (UNIT 1 SELECT signal is low), then only the output of flip-flop 412 will be high. The output of flip-flop 412 is applied to an input of the mode port 346 and the output of flip-flop 414 is applied to an input of the mode port 348.

If a SUBCOMMAND strobe is received by the receiver 374, indicating a subcommand has been applied on the control bus 338, the input port 344 gets enabled through OR-gate 408 causing the subcommand to be loaded into the input port 344. The input port in turn raises the INPUT FULL signal for application to the components described above. The SUBCOMMAND STROBE signal is also applied from the receiver 374 through an inverter 402 to the reset terminal of the COMMAND flip-flop 406 for resetting same, thereby removing the COMMAND signal. The low COMMAND signal applied to the I/O tag port 350 indicates that the information loaded into the input port 344 is a sub-command and not a command.

A SYSTEM CLEAR signal received by the receiver 392 is applied through an inverted-input NOR-gate 428 to "reset" inputs of the input port 344 and output port 352 for resetting same.

An OUTPUT ENABLE signal received by the receiver 378 is applied to an enable input of the output port 352 for loading the port and applying the contents thereof onto a transfer bus 430. Additionally, the OUTPUT ENABLE signal is applied through an OR-gate 431 to an enable input of each of a bank of eight drivers 432 so that the contents of the output port applied onto the transfer bus 430 will forwarded onto the control bus 338 for application to the controller 318.

A MODE ENABLE signal received by the receiver 380 is applied to a second input of each of the AND-gates 420 and 422 discussed above. It will be recalled that only one of these gates is enabled, dependent upon the state of the UNIT 1 SELECTED signal applied at a first input of each. If the UNIT 1 SELECTED signal is true, then the MODE ENABLE signal will be gated through gate 422 to an enable input of the mode port 348 in order to enable same to apply the contents thereof onto the transfer bus 430. At the same time, the MODE ENABLE signal is applied from the output of the gate 422 through an inverter 423 to the clock input of an ATTENTION-1 flip-flop 436 to be described in more detail below. The MODE ENABLE signal is also applied from the receiver 380 to another input of the OR-gate 431 in order to enable the drivers 432 to apply the contents of the mode port 348 onto the control bus 338. If the UNIT 1 SELECTED signal is low, the contents of the mode port 346 will be applied onto the control bus 338 in a similar manner. Further, the MODE ENABLE signal developed at the output of the gate 420 is applied through an inverter 421 to the clock input of an ATTENTION-∅ flip-flop 434 also to be described below.

A SECTOR ENABLE signal received by the receiver 382 is applied to a second input of each of the AND-gates 424 and 426, it being recalled that the UNIT 1 SELECTED signal is applied to the first input of each gate. If the UNIT 1 SELECTED signal is true, then the SECTOR ENABLE signal will be gated through the gate 426 to enable the sector-1 gate 360 in order to apply the contents thereof, i.e. the sector count for unit 1, onto the transfer bus 430. At the same time, the SECTOR ENABLE signal is applied from the output of receiver 382 to another input of the OR-gate 431 in order to enable the drivers 432 thereby applying the sector count byte onto the control bus 338 for transmittal to the controller 318. If the UNIT 1 SELECTED signal is false, then the contents of the sector-∅ gate 358, i.e. the sector count for unit ∅ will be applied onto the control bus 338.

The interface 326 further includes an ATTENTION-0 flip-flop 434 and an ATTENTION-1 flip-flop 436, as alluded to above. When each of these flip-flops is set in a manner to be described below, a respective ATTENTION signal, i.e. ATTENTION-∅ or ATTENTION-1, will be applied from its output to a respective input of an OR-gate 438, and then through such gate to the attention driver 394 for raising the ATTENTION signal on line 342a. These flip-flops 434 and 436 are each reset by the MODE ENABLE signals applied at their respective inputs from the inverters 421 and 423, respectively.

Up until now, the interface 326 has been described primarily with respect to the various signals coming from and being applied to the controller 318 along the cable A. Referring to FIG. 9, the interface 326 also transfers data to and receives data from the processor 328 via the data bus 362, as well as receiving various control signals from the processor on lines 440, control signals from the read/write circuits 336 on lines 390, and control signals from the tracking circuits 330 on lines 442. Additionally, the interface 326 applies various control signals to the read/write circuits 336 on lines 445.

With particular respect to these lines of communication, reference is again had to FIG. 10. Thus the I/O tag port 350 has an input adapted to receive a read channel status command in the form of an ADDR ∅1(R) control signal which is in reality two signals, i.e. ADDR ∅1 and I/O RD that are ANDed in the port 350. Hereafter, the designation ADDR XX (R) shall be deemed to include ADDR XX-AND-I/O RD, whereas the designation ADDR XX (W) shall be deemed to include ADDR XX-AND-I/O WR. The ADDR ∅1 signal is one of 16 address signals (ADDR ∅∅ – ADDR 15) that, along with the signals I/O RD and I/O WR, are generated by the processor 328 in a manner to be described below.

The input port 344 has an input adapted to receive a read input port command in the form of an ADDR ∅ (R) control signal applied on a line 440b from the processor 328. When an ADDR ∅ (R) control signal is received, the input signals to input port will be loaded therein and applied onto the data bus 362 for transmittal to the processor 328. The processor can also generate a RESET control signal on a line 440c for application to a second input of the inverted-input NOR-gate 428 in order to reset the input port 344 and the output port 352.

A clear busy-∅ command in the form of an ADDR 08 (R) control signal is applied on a line 440d from the processor 328 to the reset input of the BUSY-∅ flip-flop 412 for resetting same. Correspondingly, an ADDR 09 (R) control signal is applied on a line 440e to the reset input of the BUSY-1 flip-flop 414 for resetting same.

A load output port command in the form of an ADDR ∅∅(W) control signal is applied from the processor 328 on a line 440f to a load input of the output port 352 in order for the byte currently on the data bus 362 to be loaded into the output port 352. When this occurs, an OUTPUT FULL signal is generated at an output of the output port 352 for application to an input of each of the I/O tag, mode-∅ and mode-1 ports.

A set attention ∅ command in the form of an ADDR 14(R) control signal is applied on a line 440g from the processor 328 to a set input of the attention-∅ flip-flop 434 for setting same. Correspondingly, a set attention 1 command in the form of an ADDR 15 (R) control signal is applied on a line 440h to the set input of the attention flip-flop 436 for setting same. When either flip-flop 434 or 436 is set, an ATTENTION signal will be developed on line 342a for transmission to the controller 318.

A load status port command in the form of an ADDR 01(W) control signal is applied on a line 440i from the processor 328 to a summary status port 442 in order for a summary status byte on the data bus 362 to be loaded into the port 442 and transmitted to various inputs of the mode port 346 and mode port 348. The summary status byte contains the following bits of information, which may each either be true or false:

(1) ∅ READY — this signal when true indicates that unit ∅ is ready to be operated. The signal is forwarded to a first input of the mode port 346. As will be described in more detail below, ∅ READY will be true when all the bits of a STATUS B byte (to be described) for unit ∅ are false.

(2) ∅ WP — this signal when true indicates that unit ∅ is set up for write protect and is forwarded to a fourth input of the mode port 346.

(3) ∅ ABORT — this signal when true indicates that at least one of the bits of a STATUS A byte (to be described) for unit ∅ is true. The ∅ ABORT signal is forwarded to a third input of the MODE port 346.

(4) ∅ ON TRACK — this signal when true indicates that the read/write heads 14a and 14b for unit ∅ are tracking within 350uin of track center. The ∅ ON TRACK signal is forwarded to a fifth input of the mode port 346.

(5) 1 READY — this signal when true indicates that unit 1 is ready to be operated (all of the bits of the STATUS B byte for unit 1 are falst) and is applied to a first input of the mode port 348.

(6) 1 WP — this signal when true indicates that unit 1 is set up for write protect and is forwarded to a fourth input of the mode port 348.

(7) 1 ABORT — this signal when true indicates that at least one of the bits of a STATUS A byte for unit 1 is true. The 1 ABORT signal is applied to a third input of the mode port 348.

(8) 1 ON TRACK — this signal when true indicates that the read/write heads 14c - 14h for unit 1 are tracking within 350uin of track center. The 1 ON TRACK signal is forwarded to a fifth input of the mode port 348.

The second, sixth, seventh and eighth inputs of the mode port 346 are respectively adapted to receive the BUSY ∅ INPUT FULL, OUTPUT FULL and ATTENTION-∅ signals described above, and the second, sixth, seventh and eithth inputs of the mode port 348 are respectively adapted to received the BUSY-1, INPUT FULL, OUTPUT FULL and ATTENTION-1 signals.

Before describing the nature of the various status bytes (A, B, C and D) that can be applied on the data bus 362 and loaded into the output port 352 for application along the control bus 330 to the controller 318, the remaining control signals from the processor 328 to the interface 326 will be described.

A read sector counter-∅ command in the form of an ADDR 03 (R) control signal is applied on a line 440j to an enable input of a sector counter-∅ gate 444. The gate 444 is enabled to apply the sector count from the sector-∅ counter 354 onto the data bus 362. Similarly, a read sector counter-1 command in the form of an ADDR 06 (R) signal is applied on a line 440k in order to transfer the sector count for unit 1 from the sector-1 counter 356 onto the data bus 362.

As alluded to above, the sector mark ∅ signal pulses are applied from the tracking circuits 330 on a line 442a to a clock input of the sector-∅ counter 354. Similarly, the index mark-∅ signal pulses, sector mark-1 and index mark-1 signal pulses are applied from the tracking circuits 330 on respective lines 442b, 442c and 442d to the reset input of the sector -∅ counter, the clock input of the sector-1 counter and the reset input of the sector-1 counter, respectively.

The four different status bytes that can be applied on the data bus by the processor 328 will now be described with reference to the following status format table.

TABLE I

| STATUS BYTE | STATUS FORMAT | |
|---|---|---|
| | BIT | MEANING |
| STATUS A | 0 | ILLEGAL COMMAND |
| (Abort Status) | 1 | ILLEGAL CYLINDER ADDRESS |
| | 2 | ILLEGAL HEAD ADDRESS |
| | 3 | SEEK INCOMPLETE |
| | 4–7 | UNUSED |
| STATUS B | 0 | POWER GOING DOWN |
| (Not Ready) | 1 | NOT OPERATING SPEED |
| | 2 | NO CARTRIDGE (Unit φ) or NO FIXED DISK (Unit 1) |
| | 3 | READ/WRITE FAULT |
| | 4 | RESTORE INCOMPLETE |
| | 5 | ILLEGALLY SECTORED CARTRIDGE |
| | 6–7 | UNUSED |
| STATUS C | 0 | DC WRITE CURRENT FAULT |
| (Read/Write Status) | 1 | WRITE ACTIVITY FAULT |
| | 2 | WRITE DATA RECORDING FAULT |
| | 3 | MULTIHEAD FAULT |
| | 4–7 | UNUSED |
| STATUS D | 0–3 | MODEL NO. |
| | 4 | WRITE PROTECT MODE |
| | 5 | WRITE PROTECT SWITCH ON |
| | 6 | POWER CAME UP |

TABLE I-continued

| STATUS BYTE | STATUS FORMAT BIT | MEANING |
|---|---|---|
| | 7 | UNUSED |

Referring now more particularly to the active bits of the STATUS A byte, an ILLEGAL COMMAND signal will be generated by the processor 328 for the selected unit if the processor receives any one of the following:

(1) A nonSTATUS REQUEST command signal when the selected unit has no cartridge (unit 0) or disk (unit 1);

(2) A RESTORE command signal while the other unit is restoring;

(3) A HEAD command signal while the other unit is restoring;

(4) A nonSTATUS REQUEST command signal while the selected unit is already executing a command. However, an error will not be reported if a new command is received while waiting for a subcommand. The processor 328 will simply clear the previous command and execute the new command;

(5) An undefined command.

The processor 328 will cause the ILLEGAL COMMAND bit (bit 0) of the STATUS A byte to go false upon receipt of a non STATUS REQUEST command signal. The ILLEGAL CYLINDER ADDRESS bit (bit 1) will go true when the processor 328 receives a cylinder address greater than 429. That is because only 430 tracks, i.e. tracks 0—429, are used for data storage and retrieval, as will be described in more detail below. Bit 1 will go false upon receipt of a non STATUS REQUEST command.

The ILLEGAL HEAD ADDRESS bit (bit 2) of the STATUS A byte will go true when the processor 328 receives a nonexistant head address, and will go false upon receipt of a non STATUS REQUEST command. Lastly, the SEEK INCOMPLETE bit (bit 3) will go true whenever the processor 328 determines that a seek operation (i.e. moving the head to a desired track location) continues for more than a predetermined time period, e.g. 150ms. This bit will also go false upon receipt of a non STATUS REQUEST command.

Referring now to the active bits of the STATUS B byte, the POWER GOING DOWN bit (bit 0) will go true when the drive 10 loses AC power. When this occurs, the drive will maintain proper operation for 150ms and then retract the heads. If the drive regains power in less than 150ms, this bit will be reset, the READY indicator lights 310 and 312 will be turned on, and the drive will resume normal operation.

The NOT OPERATING SPEED bit (bit 1) goes true when the disk drive 10 fails to reach operating speed, or drops below operating speed. The bit remains false at normal operating speed. The NO CARTRIDGE or NO FIXED DISK bit (bit 2) goes true if the upper unit has been selected and no cartridge 28 has been installed, or if the lower unit has been selected and there is no fixed disk therein (in view of the particular model of drive 10 used).

The READ/WRITE FAULT bit (bit 3) of the STATUS B byte will be true when the processor detects any one of a DC WRITE CURRENT FAULT, a WRITE ACTIVITY FAULT, a WRITE DATA RECORDING FAULT, or a MULTIHEAD FAULT. When the READ/WRITE FAULT bit is true, the cause of the fault can be determined from the STATUS C byte, as will be explained below.

The RESTORE INCOMPLETE bit (bit 4) will be true if a restore operation (to be described below) fails to be completed within the normally required period of time. The ILLEGALLY SECTORED CARTRIDGE bit (bit 5) will be true if the number of sectors on the disk 16a of an installed cartridge 28 differs from the number of sectors for which the disk drive is set up. The specific manner of sectoring the disks 16 in drive 10 will be described below in connection with FIG. 21.

Referring now to the STATUS C byte, the DC WRITE CURRENT FAULT bit (bit 0) will be true if either dc write current is absent during a write activity or dc write current is present without write activity. The WRITE ACTIVITY FAULT bit (bit 1) will be true if write transitions occur when the WRITE GATE signals were alluded to above and will be described in more detail below in connection with FIGS. 14 - 16 and 21. The WRITE DATA RECORDING FAULT bit (bit 2) will be true if write data current does not reflect the data being written. The MULTIHEAD FAULT bit (bit 3) will be true if two or more heads are selected simultaneously.

Referring to the STATUS D byte, the MODEL NO. bits (bits 0–3) identify the model number of the disk drive. The WRITE PROTECT MODE bit (bit 4) goes true when the controller 318 sends a SET WRITE PROTECT command signal on the control bus 330. This bit will go false when the controller 318 sends a RESET WRITE PROTECT command signal, providing the write protect switch for the selected drive, i.e. switch 314 or switch 316 (FIG. 1) is off. It will be recalled that if switch 314 is on, a true WP SW φ signal will be applied to the first input of the I/O tag port 350, and if switch 316 is on, a true WP SW1 signal will be applied to the second input of the I/O tag port 350. Further, if the write protect switch for the selected unit is on, the WRITE PROTECT SWITCH ON bit (bit 5) of the STATUS D byte will be true.

The POWER CAME UP bit (bit 6) will be true each time the disk drive 10 is powered up by setting the START/STOP switch 306 (FIG. 1) to START. This bit will reset when it is sampled by a STATUS REQUEST D command. When true, this bit indicates that a start/stop cycle has occurred, during which a cartridge 28 change may have occurred.

Reference is now again had to the ATTENTION signal that may be generated on control line 342a for application to the controller 318. The attention line 342a is a non-selected line that will go high, i.e. the ATTENTION signal is present (true), when either unit 0 or unit 1 of the drive 10 has an important change in statis to report to the controller 318. The status changes for which an ATTENTION signal will be generated are: (1) unit becomes ready, (2) unit becomes not ready, or (3) unit becomes not busy. If any of these occurs, the processor will set the appropriate ATTENTION flipflop 434 or 436 by raising the ADDR 14(R) signal or ADDR 15(R) signal in the manner described above. To reiterate, the ADDR 14(R) control signal is, in reality, the signals ADDR 14-AND-I/O RD, whereas the ADDR 15(R) control signal is comprised of the signals ADDR 15-AND-I/O RD.

One method by which the controller 318 can detect status changes within the drive 10 is to simply monitor the ATTENTION control line 342a. Upon receipt of a true ATTENTION signal on that line, the controller 318 can begin checking the MODE byte of each unit. When the unit generating ATTENTION is located, the controller 318 initiates appropriate action.

Figure 21:
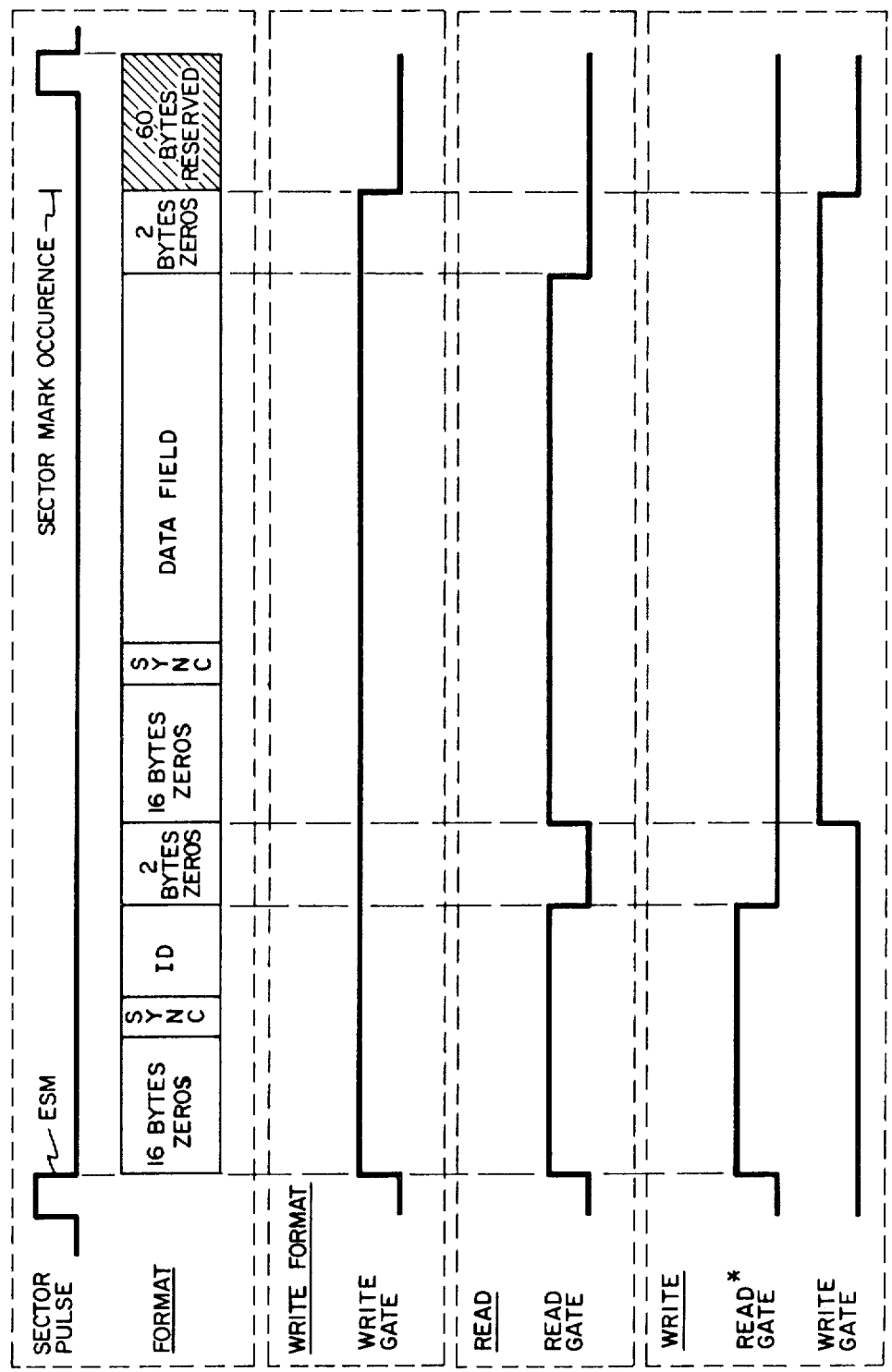
FIG. 21 depicts the waveforms for various signals utilized in the control system depicted in FIG. 9.

Reference is now had to FIG. 21 wherein the manner of sectoring will be described. An exemplary sector format is defined between successive electronic sector marks (ESM), as defined at the trailing edges of successive sector pulses. The manner of generating these pulses will be described in detail below. The exemplary format includes sixteen bytes of zeros following an ESM. A Sync byte then occurs, as is conventional. A preferred Sync byte is "eight-easy" (8E), although such is not required. The Sync byte may then be followed by an ID byte or bytes which is itself followed by two bytes of zeros as a guardband. Another 16 bytes of zeros are then generated followed by another Sync byte and then the data field. After the data field, another 2-byte guardband is recorded. This completes the so-called "hard sector" field.

In accordance with the preferred embodiment, after the last-described 2-byte guardband, the mechanical sector mark will be detected and either the SECTOR MARK 0 or the SECTOR MARK 1 signal will be generated, dependent upon the unit selected. These latter signals, as well as INDEX MARK 0 and INDEX MARK 1 were alluded to above. The specific manner in which they may be generated will be described in more detail below in connection with FIGS. 18 and 19.

Still referring to FIG. 21, at the termination of the hard sector defined above, i.e. at the second guard-band of two bytes of zeros, sixty bytes are reserved for the prerecording of clock synchronigation and track following servo data. The nature of this data and purpose thereof will be described in more detail below. At this time, it should be noted that although this data will be read and used internally by the drive, the drive will be inhibited from writing any data into this 60-byte block.

FIG. 21 shows three exemplary types of read/write operations, i.e. (1) write format, (2) read and (3) write. During a write format operation, the WRITE GATE signal will be held high during the entire hard sector area available to the controller 318. During a read operation, the READ GATE signal is first raised to allow sending the Sync byte and ID code. At the end of the ID code, the READ GATE signal goes false to re-sync the clock in a manner to be described below, and is then raised again for the second Sync byte and the data field. During a write operation, the READ GATE signal is first raised to allow reading the Sync byte and ID code. Then, the READ GATE goes false and the WRITE GATE is raised two bytes later. The WRITE GATE signal will go false at the end of the hard sector area.

Specific details and operation of the read/write circuits will be described in detail below with reference to FIGS. 14 - 16.

IV. PROCESSOR

Figure 11:
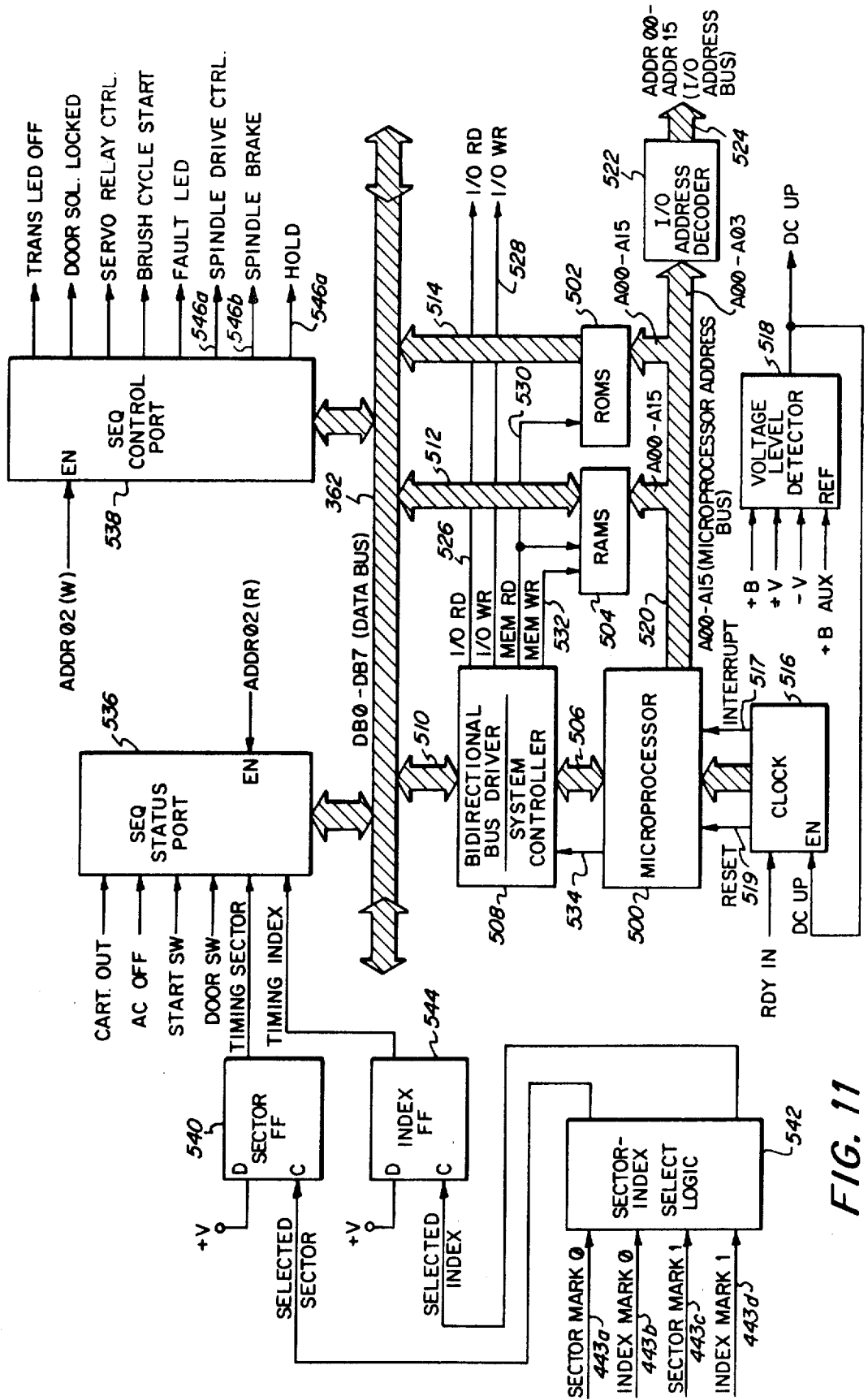
FIG. 11 is a schematic block diagram of the processor depicted in FIG. 9.

Reference is now had to FIG. 11 where the processor 328 is depicted in FIG. 9 will be described. As shown, the processor is a programmed data processor comprised primarily of a microprocess 500 and associated read-onyl-memories (ROMS) 502 and random-access-memories (RAMS) 504. The programs for the microprocessor 500 are stored in the ROMS 502. Additionally, various "look-up" tables are stored in the ROMS 502. As will be seen, one such table is a head table that is used in connection with the read/write circuits 336. The RAMS 504 are used for storing status information, return addresses, as well as actual and desired track position information relative to seek and restore operations.

Data in the form of 8-bit words or "bytes" may be transferred from the microprocessor 500 to a location in the RAMS 504 along an 8-bit transfer bus 506, through a bidirectional bus driver/system controller device 508, along another transfer bus 510, then onto the main data bus 362 for transmittal to yet another transfer bus 512 connected to the RAMS 504. Data to be transferred from a RAM location to the microprocessor 500 would follow the reverse course. Data accessed from the ROMS 502 can be transferred to the microprocessor 500 along a transfer bus 514, onto the data bus 362 and then along the transfer bus 510, through the bidirectional bus driver 508 and along the transfer bus 506. Data applied onto the data bus from other sources, such as from the I/O tag port 350 or input port 344 (FIG. 10), will be directed to the microprocessor 500 directly.

A clock 516 for the microprocessor 500 is enabled by a DC UP signal applied at its input from the output of a voltage level detector 518. This detector 518 is connected to the power supply 18 (FIG. 8) for receiving various of the d-c voltages generated thereby and for detecting when these voltages are at the desired operating level. When this condition has been detected, the DC UPsignal will go true, enabling the clock 516. The program counter for the processor 328 is desirably integral with and included in the microprocessor unit 500. The clock 516 also generates a RESET signal on a line 519 and INTERRUPT signals on a line 517 for application to the miveoprocessor 500.

Any suitable microprocessor 500, bidirectioned bus driver/System Controller 508 and associated ROMS 502 and RAMS 504 may be employed in accordance with the present invention. Presently preferred such devices include a model 8080 microprocessor, model 8228 bidirectional bus driver/system controller, model 8708 ROMS and model 9112 RAMS, all manufactured by the Intel Corporation of Santa Clara, California.

Returning to FIG. 11, the microprocessor 500 is capable of generating a 16-bit address on 16 address lines A00-A15 for accessing respective memory locations in the ROMS 502 and RAMS 504 along a microprocessor address bus 520. The entire 16-bit address is desirably used in addressing locations in both the ROMS 502 and RAMS 504. However, the least significant four bits A00-A03 are applied as inputs to a conventional 4 bit-to-16 bit I/O address decoder 522. In response to any particular 4-bit input code on lines A00-A03, the decoder 522 will raise one of 16 I/O address lines ADDR00 ADDR15 on a 16-bit I/O address bus 524. Certain of these I/O address signals were discussed previously in connection with FIG. 10.

It will be recalled that the various control line inputs to the ports thus far discussed have been designated by an I/O address followed by (R) or (W). For example, the control line 440b in FIG. 10 was described as applying an ADDR00(R) to the input port 344 for enabling same to apply its contents onto the data bus 362. In actuality, this control line is really two lines, i.e. ADDR00 from the I/O address decoder 522 and I/O RD. Each port receiving an I/O address signal also receives either an I/O.RD signal or an I/O WR signal, depending upon whether the port provides some input to or receives some output from the processor 328.

The I/O RD and I/O WR signals are generated on respective control output lines 526 and 528 of the bidirectional bus driver/system controller 508. The device 508 also includes two further output control lines 530–532 on which MEM RD AND MEM WR signals may be generated. The MEM RD line is connected to enable inputs of the ROMS 502 and the RAMS 504 for enabling data stored therein to be loaded onto the transfer bus 524 or transfer bus 512, respectively. The MEM WR line 532 is coupled to another enable input of the RAMS 504 for enabling same to load into an addressed memory location data applied thereto on the transfer bus 512.

The bidirectional bus driver/system controller 508 is itslef controlled, as far as which, if any, of the control signals I/O RD, I/O WR, MEM RD, MEM WR it should generate at any clock cycle, and as far as whether data in the device 508 is to be unloaded onto the transfer bus 506 for application to the microprocessor 506 or onto the transfer bus 506 for application onto the data bus 328. Such control of the device 508 is provided from the microprocessor 500 on suitable control lines 534 (only one shown).

Various of the ports which provide data to or receive data from the processor 328 via the data bus 362 have been described above in connection with FIG. 10. Two other ports are shown in FIG. 11. These are a sequence status port 536 and a sequence control port 538.

The sequence status port 536 is an input port which is enabled by an ADDR$2 (R) signal, i.e. the signals ADDR$2 and I/O RD as internally "ANDed" in the port. When thus enabled, the signals present at respective inputs of the port 536 will be loaded in and applied onto the data bus 362 for transmittal to a respective storage location in the RAMS 504. This location would have been properly addressed by a respective address signal on lines A00–A15.

The sequence status port 536 has six active inputs (bits $-5). A first input (bit $) is adapted to receive a CARTRIDGE OUT signal which will be true when no cartridge 28 has been inserted into unit $ of the drive 10. A suitable sensor (not shown) capable of detecting the non-presence of a cartridge 28 is provided in the drive. this sensor generates the CARTRIDGE OUT signal whenever, following start of the drive 10, a cartridge 28 is not loaded therein.

A second input (bit 1) of the sequence status port 536 is adapted to receive an AC OFF signal. This signal is generated by a suitable voltage detector circuit (not shown) connected to the a-c power source whenever an a-c power failure has occurred. A third input (bit 2) of the port 536 is adapted to receive a START SWITCH signal. This latter signal is generated by the START/STOP switch 306 (FIG. 1) when such switch has been pushed to the START position. A fourth input (bit 3) of the port 536 is adapted to receive a DOOR SWITCH signal. This signal is generated by a suitable switch (not shown) mounted on the drive 10 whenever the front door 24 is closed.

A fifth input (bit 4) of the sequence status port 536 is adapted to receive a TIMING SECTOR signal. This signal is used for various "time-out" operations carried out by the program in a manner to be described below. The TIMING SECTOR signal is generated by a sector flip-flop 540 when such flip-flop is set. The flip-flop 540 will be set upon receipt of a SELECTED SECTOR signal at its clock input (its data input being tied high). The SELECTED SECTOR signal will be either the SECTOR MARK $ signal or the SECTOR MARK 1 signal. These latter signals are applied as inputs to a sector-index select logic circuit 542 which selects a particular one dependent upon the model of the drive being used. If the drive has no fixed disks, i.e. unit 1 is not to be used, then the SECTOR MARK $ signals will clock the flip-flop 540. If the drive has at least one fixed disk, then the SECTOR MARK 1 signals are applied to the logic circuit 542 along respective lines 443a and 443b from the tracking circuits 330. One SECTOR MARK $ signal pulse occurs during each sector of a removable disk for unit $, whereas one SECTOR MARK 1 signal pulse is generated during each sector of a fixed disk for unit 1. The specific manner in which these signals is generated will be described in more detail below in connection with FIGS. 18 and 19.

The sixth and last active input (bit 5) of the sequence status port 536 is adapted to receive a TIMING INDEX signal. This signal is also used for various "time-out" operations carried out by the program. The TIMING INDEX signal is generated by an index flip-flop 544 when such flip-flop is set. The flip-flop 544 will be set upon receipt of a SELECTED INDEX signal at its clock input (its data input also being tied high). The SELECTED INDEX signal is generated by the select logic 542 and will either be INDEX MARK $ or INDEX MARK 1 in accordance with the selection scheme outlined above. The INDEX MARK $ and INDEX MARK 1 signals are applied to the logic circuit 542 along respective lines 443b and 443d from the tracking circuits 330. One INDEX MARK $ signal pulse occurs during each complete revolution of a cartridge disk, whereas one INDEX MARK 1 signal pulse occurs during each complete revolution of a fixed disk. Again, the specific manner in which these signals is generated will be described below with reference to FIGS. 18 and 19.

Referring now to the sequence control port 538, it is enabled by an ADDR$2 (W) signal (i.e. concurrence of ADDR$2 and I/O WR) to load therein the sequence control byte on the data bus 362 in order to make available the 8 bits thereof on respective outputs of the port. A first output (bit $) represents a Transition LED OFF signal which will be true when it is desired to turn off the TRANSITION light 308 on the front panel 26 of the drive 10. In this respect, the TRANSITION LED OFF signal would be applied to appropriate circuitry (not shown) controlling the state of the TRANSITION light 308.

A second output (bit 1) of the sequence control port 538 represents a DOOR SOLENOID LOCKED signal which will be true when it is desired to lock the front door 24 by activating a door solenoid lock (not shown). In this respect, the DOOR SOLENOID LOCKED signal will be sent to the solenoid lock. A third output (bit 2) of the port 538 represents a SERVO RELAY CONTROL signal which will be true when it is desired to switch from a head retracted mode to a head positioning by servo control mode, such modes to be described in more detail below.

A fourth output (bit 3) of the port 538 represents a BRUSH CYCLE START signal which will be true when it is desired to pulse a disk brush motor (not shown) in order to start it. The fourth output would thus be coupled to the brush motor control circuits (not shown). A fifth output (bit 4) of the port 538 represents a FAULT LED signal which will be true when it is desired to turn on the FAULT indicator light 322 on the panel 26. The FAULT LED signal would thus be connected to an appropriate control circuit (not shown) for light 322.

A fifth output (bit 4) of the sequence control port 538 represents a SPINDLE DRIVE CONTROL signal which will be true when it is desired to turn on the spindle motor 58. Thus, the bit 4 output is coupled on a line 546a to the spindle drive 304 (FIG. 9) which includes the motor 58. The sixth output (bit 5) of the port 538 represents a SPINDLE BRAKE signal which will be true when it is desired to turn on a spindle brake circuit (not shown) included in the spindle drive 304. Consequently, the bit 5 output is coupled on a line 546b to the spindle drive 304.

The eighth and last output (bit 7) of the port 538 represents a HOLD signal which is true when it is desired to disable the servo "motor" from turning off. There are in reality two servo "motors," one for each unit of the drive and respectively defined by the electromagnetic assemblies 154 (FIG. 6). The HOLD signal is thus applied to the servo control system 194 on a line 548a (FIG. 9).

V. POSITION TRANSDUCER APPARATUS

Figure 12A:
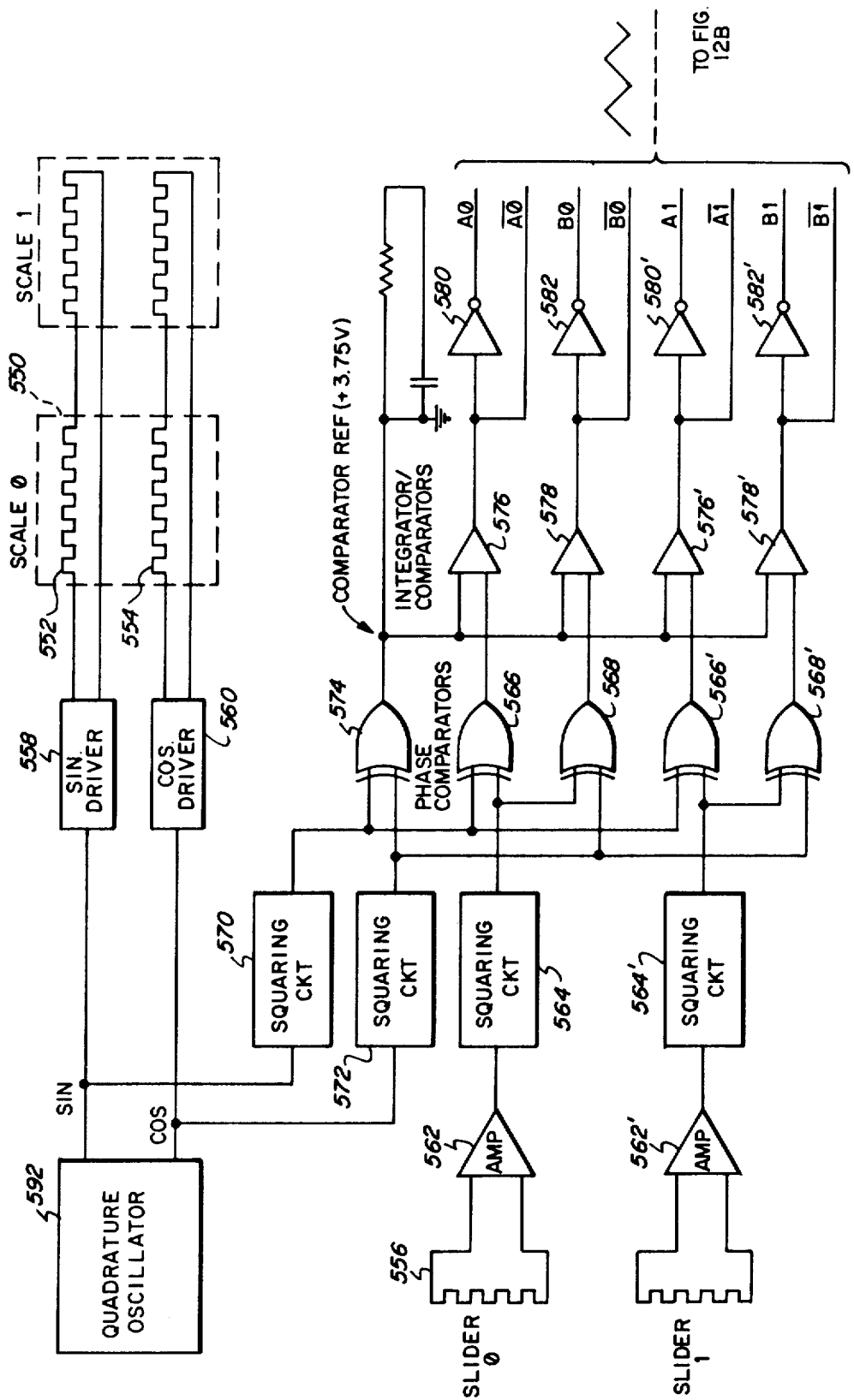
FIGS. 12A, 12B are a schematic block diagram of the transducer circuits depicted in FIG. 9.
Figure 12B:
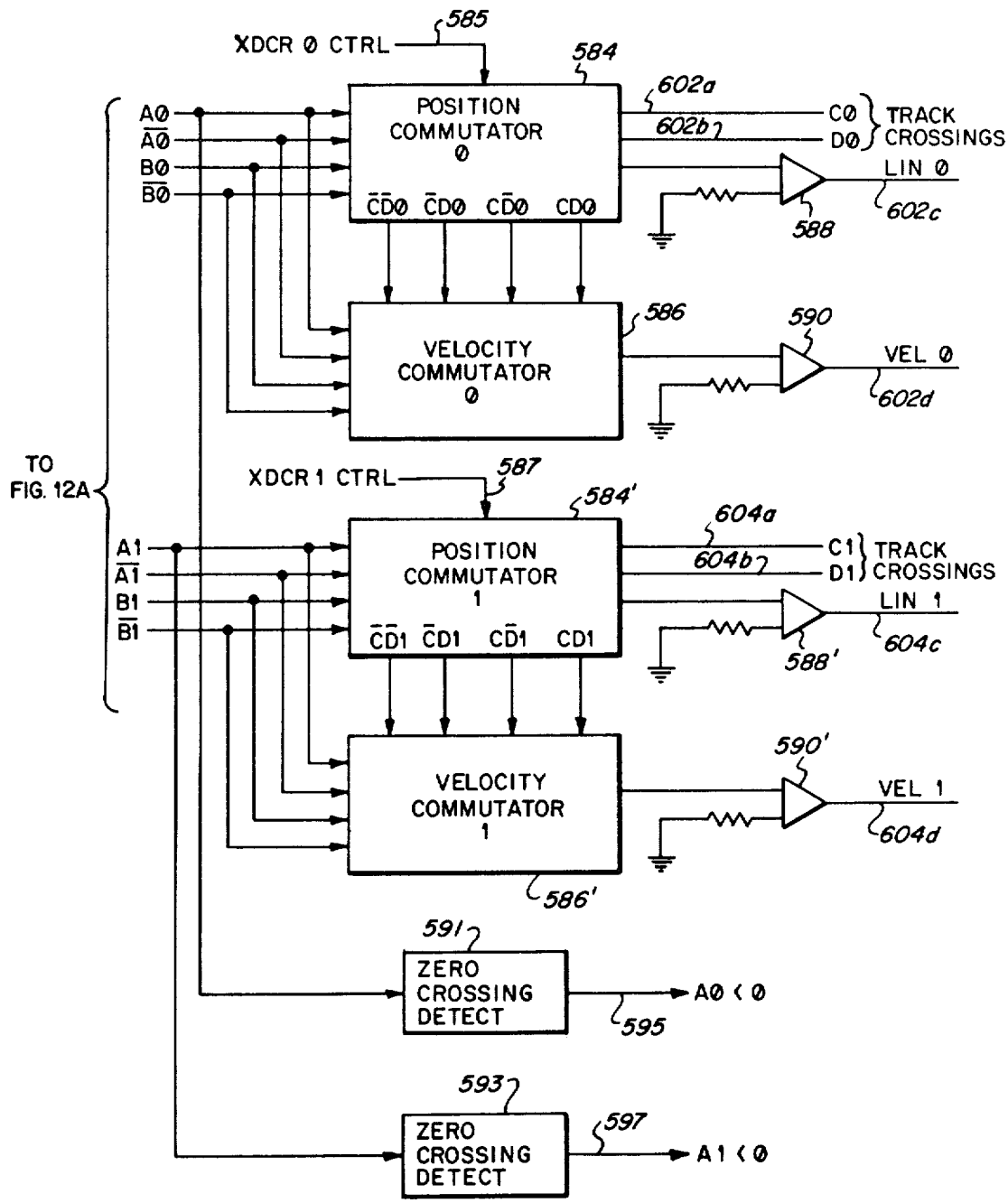

Reference is now had to FIG. 12, wherein the position transducer apparatus 332 for unit 0 and the position transducer apparatus 334 for unit 1 will be described. The apparatus 332 includes a phase-sensitive transducer comprised of a scale 550 having a pair of windings 552 and 554 displaced in space-quadrature and a slider 556 comprised of a single winding. Although the scale 0 and slider 0 are shown separated on FIG. 12, they are actually in juxtaposed physical relationship with the scale 0 being fixed in position to the frame of the drive 10 and the slider 0 being mounted to the carriage assembly 72 for unit 0. A presently preferred scale and slider that may be used for scale 550 and slider 556 is shown and described in copending application Ser. No. 747,116 filed in the name of Louis G. Gitzendanner, et al, entitled IMPROVED INDUCTIVE TRANSDUCER.

In accordance with aphase-sensitive transducer, a pair of 90° phase-displaced sinusoidal signals (SIN and COS) are respectively applied across the windings 552 and 554 through a respective pair of drivers 558 and 560. The SIN and COS signals may originate from a suitable conventional quadrature oscillator 592. A signal will then be induced on the winding of the slider 556 which will be of constant peak amplitude and frequency, but variable in phase, referenced to the quadrature oscillator outputs, in dependence upon the relative horizontal position of the scale and slider. This phase-modulated output signal from the slider 556 is amplified by an amplifier 562 and then forwarded through a squaring circuit 564 to a demodulator circuit.

The demodulator circuit includes a comparator portion and an integrator portion. More specifically, the phase comparator portion includes a pair of Exclusive OR-gates 566 and 568. The output from the squaring circuit 564 is applied to first inputs of each of these gates. A second input of the gate 566 is adapted to receive the SIN signal as squared by a squaring circuit 570, and the second input of the gate 568 is adapted to receive the COS signal as squared by another squaring circuit 572. The outputs of squaring circuits 570 and 572 are further applied to respective inputs of yet another Exclusive OR-gate 574.

The output of gate 566 is applied to one input of a comparator amplifier 576, and the output of the gate 568 is applied to one input of a comparator amplifier 578. A second input of each of the amplifiers 576 and 578 is connected to the output of the gate 574 and to an integrator comprised of an R-C circuit. The output signal from the gate 574 serves as a reference for balancing each of the outputs from the amplifiers 576 and 578 about zero, such output signals preferably being triangular-wave position signals $A\emptyset$ and $\overline{B\emptyset}$, respectively, which are phase-displaced by 90°. These two signals are desirably also applied through respective inverters 580 and 582 to derive two additional signals $A\emptyset$ and $B\emptyset$. Specific details of the circuits thus far described may be had from a review of copending application Ser. No. 737,972 filed in the names of James O. Jacques and Robert D. Carlson and entitled IMPROVED INDUCTIVE TRANSDUCER.

The four mutually phase-displaced signals $A\emptyset$, $\overline{A\emptyset}$, $B\emptyset$ and $\overline{B\emptyset}$ are applied to respective inputs of a position signal commutator 584 and to respective inputs of a velocity signal commutator 586. The commutator 584 includes conventional circuits which commutate the four input signals applied thereto in order to generate a saw-tooth position signal LIN $\emptyset$ which is amplified by an amplifier 588 and has a period equal to the distance between adjacent tracks on the disks 16a–16d. Four periods of the LIN$\emptyset$ position signal are equal to one period of each of the position signals $A\emptyset$, $\overline{A\emptyset}$, $B\emptyset$, and $\overline{B\emptyset}$. The commutator 584 also generates conventional composite signals C$\emptyset$ and D$\emptyset$ which are used to determine each time a track center is crossed. The C$\emptyset$ and C$\emptyset$ signals and the LIN$\emptyset$ signal can be selectively shifted in amplitude and phase by a predetermined amount by a XDCR $\emptyset$ CONTROL signal applied as an input to the commutator 584 from the tracking circuits 330 on a line 585. The purpose of such shifting will be explained in more detail below. Further details as to the general nature of the signals C$\emptyset$ and D$\emptyset$ and an exemplary position signal commutator may be had from a review of U.S. Pat. No. 3,839,665.

The velocity signal commutator 586 is also comprised of conventional differentiation and commutation circuitry for differentiating the four positions signals $A\emptyset$, $\overline{A\emptyset}$, $B\emptyset$ and $\overline{B\emptyset}$ applied at its inputs and then commutating the differentiated signals. The resultant signal VEL $\emptyset$ is amplified by an amplifier 590 and is representative of the actual velocity of the slider 556 relative to the scale 550 and thus of the carriage assembly 72 relative to the frame of the drive 10.

The transducer apparatus 334 is identical in all respects to transducer apparatus 336 and thus the same reference numerals (primed) are employed. A XDCR 1 CONTROL signal is applied to an input of the position commutator 584' for a purpose identical to that achievable by the XDCR $\emptyset$ CONTROL signal. The XDCR 1 CONTROL signal is applied on a line 587 from the tracking circuits 330.

As shown in FIG. 12, the A$\emptyset$ and A1 position signals are applied to respective zero crossing detectors 591 and 593. These detectors each include conventional circuitry for generating output signals A$\emptyset$<$\emptyset$ and A1<$\emptyset$ whenever the A$\emptyset$ and A1 signals are at a voltage level less than zero. The A$\emptyset$<$\emptyset$ and A1<$\emptyset$ signals are applied on respective output lines 595a and 597a to the tracking circuits 330 for a purpose to be described below.

VI. SERVO CONTROL SYSTEMS

Figure 13A:
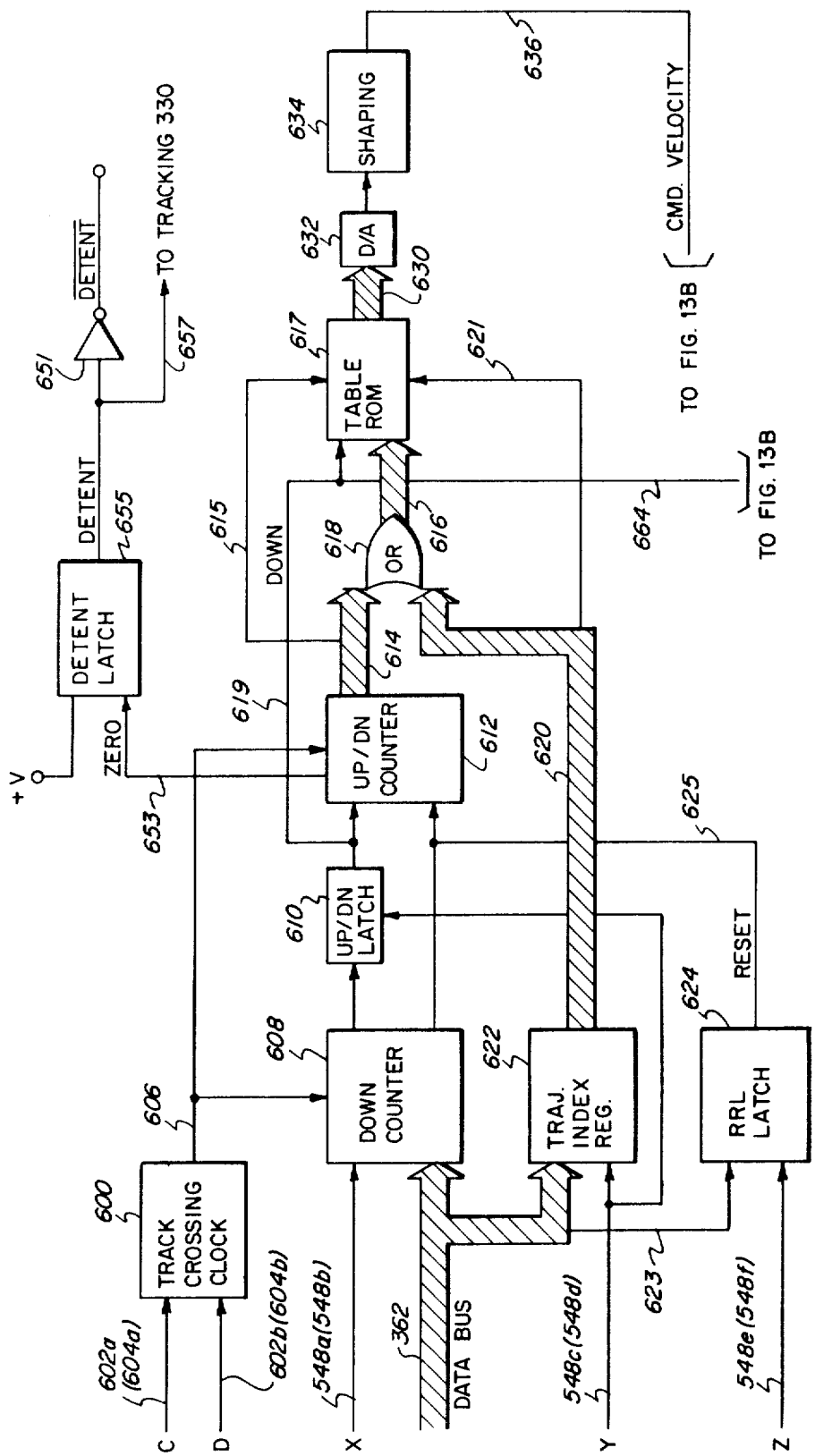

Reference is now had to FIG. 13 wherein the servo control systems 194 will be described. At the outset, it must be stated that there are two identical servo control systems 194, one for each unit of the drive 10. Accordingly, the specific circuits thereof will be described with reference to the generic block diagram of FIG. 13.

As shown in FIG. 13, each servo control system comprises a track crossing clock 600 that receives the track crossing signals C and D developed by the respective position commutator 584 or 584'. The signals C∅ and D∅ are applied on lines 602a and 602b from the position commutator 584 to respective inputs of the track crossing clock 600 for unit ∅. The signals C1 and D1 are applied on lines 604a and 604b to respective inputs of the track crossing clock 600 for unit 1. Each clock 600 operates in a known manner to generate a counting pulse on a line 606 each time the heads on the respective head carriage assembly cross a track boundary, as determined by comparing the digital position signals C and D. Details of an exemplary clock 600 may be found in U.S. Pat. No. 3,839,665.

Each servo control system 194 further comprises a down counter 608. The down counter has an 8-bit data input connected to the data bus 362 for receiving a 8-bit code representative of one-half the distance the respective head carriage assembly must travel in order for each head thereof to be moved from a track location it is initially at (i.e. actual position) to another track location over which it is desired to be stopped (i.e. desired position). This 8-bit code shall hereinafter be designated as ½ DTT (one-half distance-to-travel). This code will be loaded into the down counter 608 upon receipt of a load command X from the processor 328 which will either ADDR ∅5 (W) for unit ∅ or ADDR ∅8(W) for unit 1, as shown in the table depicted in FIG. 13. The down counter 608 is decremented one count at the occurrence of each clock signal on line 606, such line being connected to the clock input of the down counter 608. The ½ DTT code on the data bus 362 will initiate a head positioning operation which can either be a seek (position over one of tracks ∅-429 for reading or writing data) or restore (position over track ∅).

A zero-condition output of the down counter 608 is coupled to an UP/DN latch 610. When the down counter 608 counts down to zero, indicating that the heads of the respective carriage have moved one-half the necessary distance from actual to desired positions, the latch 610 will be set. The output of the latch 610 is connected to the count direction control input of an up-down counter 612, which is clocked by the clock signal from the clock 600 as applied to a clock input on line 606. When the output of latch 610 is false (first one-half distance), the up-down counter 612 will increment by one at each clock pulse. On the other hand, when the output of latch 610 goes true (down counter 608 has counted down to zero), the up-down counter (now registering a count equal to one-half the initial distance to be traveled) will decrement by one at each clock pulse. The 8-bit output of the up-down counter 612 is applied to a table ROM 617 for a purpose and in a manner to be described below. At this point, however, it should be noted that the seven most significant bits are applied along a bus 614 and through a bank of seven OR-gates 618 and the least significant bit is applied on a line 615 directly to the ROM 617.

After the ½DTT code is placed on the data bus 362 by the processor 328, a positioning command is placed on the bus 362 indicative of the type of head positioning function required, e.g. restore, retract, load, etc. If either of the latter three functions are to be preformed, a predetermined bit of the command code will always be binary one and such bit is connected along a line 623 to the data input of an RRL latch 624. The latch 624 will be set, when the data input is high, upon receipt of a set command Z applied at its clock input. The command Z will be an ADDR ∅6 (W) control signal from the processor 328 on a line 548e (unit ∅), or an ADDR ∅9 (W) control signal from the processor on a line 548f (unit 1). When set, the output of the latch 624 will go high thereby generating a RESET signal on a line 625 for application to reset inputs of the counters 608 and 612 for resetting same. The reason why these counters are reset when a restore, retract or head loading function is to be carried out will be described in more detail below.

The next code that is applied on the data bus 362 in order to initiate a positioning operation is a trajectory index code. This code is an 8-bit code and is located into a trajectory index register 622 upon receipt of a load command Y which is either an ADDR ∅3 (W) control signal on a line 548c (unit ∅) or an ADDR 1∅ (W) control signal on a line 548d (unit 1) from the processor 328. The trajectory index code cooperates with the output of the up-down counter 612 in addressing the ROM 617. The seven least significant bits of the trajectory index code are applied from the register 622 along a bus 620 to respective inputs of the seven OR-gates 618. The eighth most significnt bit is applied directly to the ROM 617 on a line 621.

Before describing the specific nature, constitution and purpose of the ROM 617 is, it must be noted that the address input code thereto is a 10-bit code. The least significant bit is presented on line 615 from the up-down counter 612, the most significant bit on line 619 from the up/down latch 610 (i.e. the DOWN signal), the next to most significant bit on line 21 from the trajectory index register 622, and the remaining bits on a bus 616 from outputs of the OR-gates 618.

Figure 22:
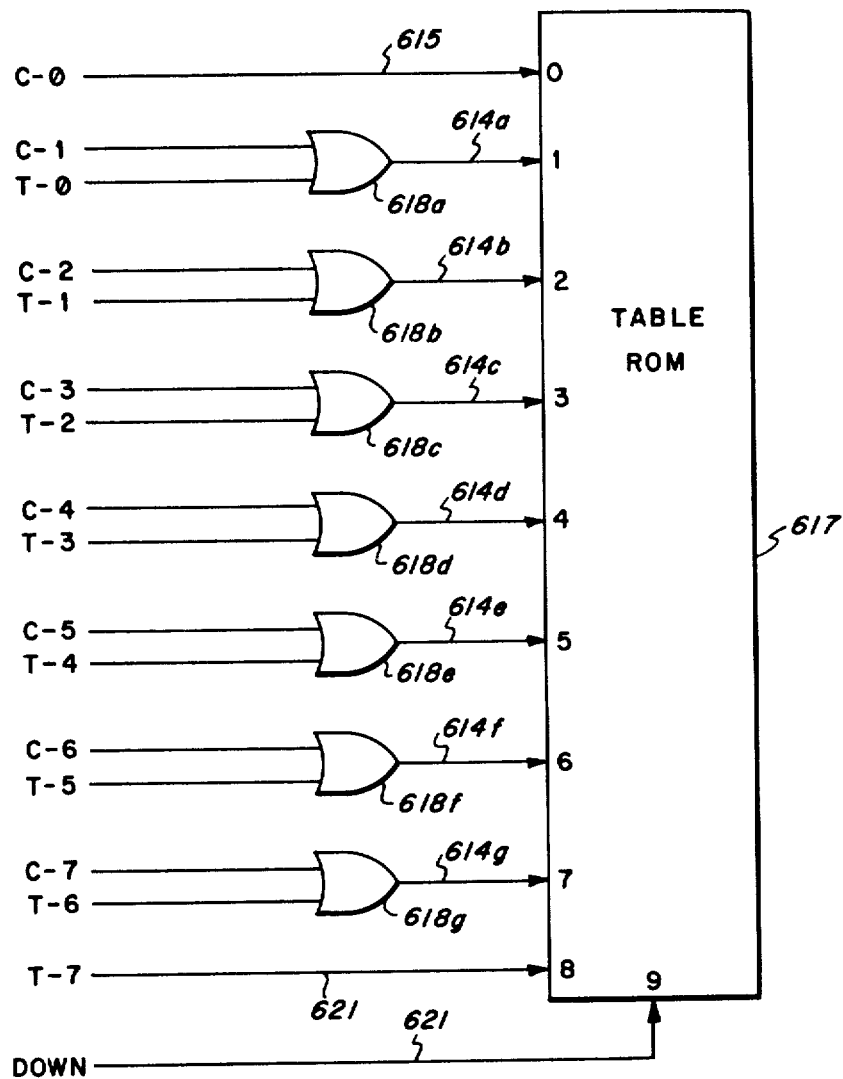
FIG. 22 is a detailed schematic diagram of a portion of the servo control system circuitry depicted in FIG. 13.

Referring to FIG. 22, the eight bits of the up-down counter output are referred to as C-∅ through C-7, and the eight bits of the trajectory index register output are referred to as T-∅ through T-7. As shown, bit C-∅ is applied directly to input ∅ of the ROM 617 on line 615. Bits C-1 and T-∅ are applied to OR-gate 618a with the output thereof applied on line 614a to input 1 of the ROM 617. Bits C-2 and T-1 are applied to OR-gate 618b with the output thereof applied on line 614b to input Z of the ROM. Bits C-3 and T-2 are applied to OR-gate 618c with the output thereof applied on line 614e to input 3 of the ROM. Bits C-4 and T-3 are applied to respective inputs of OR-gate 618d with the output thereof applied on line 614d to input 4 of the ROM 617. Bits C-5 and T-4 are applied to respective inputs or OR-gate 618e with the input thereof applied on line 614e to input 5 of the ROM 617. Bits C-6 and T-5 are applied to respective inputs of OR-gate 618f with the output thereof applied on lin 614f to input 6 of the ROM 617. Lastly, bits C-7 and T-6 are applied to respective inputs of OR-gate 618g with the output applied on line 614g to input 7 of the ROM. Input 8 of the ROM 617 is connected directly to the trajectory index register for receiving the bit T-7 on line 621, and input 9 of the ROM 617 is connected directly to the output of the up-down latch 610 on line 619.

In order to understand the significance of the 10-bit input address to the ROM 617 defined by the output of the up-down counter 612, up-down latch 610, and the output of the trajectory index register 622, it is first necessary to discuss the nature and constitution of the ROM 617. The ROm 617 is divided into two halves. One half is associated with the first half of any distance to be traveled in a head positioning operation, and the other half with the second half of a distance to be traveled. Each half of the ROm is further divided into a plurality of segments, each segment containing one or more memory locations. Each segment is associated with and defines, by the values stored in the memory locations thereof, a unique command velocity profile.

By way of example, and in accordance with the preferred embodiment, the ROM 617 is a 1024 × 8-bit ROM wherein locations ∅–511 are associated with the first half of any distance to be traveled and locations 512–1023 with the second half of a distance to be traveled. There are desirably nine different velocity profiles defined in the ROM in accordance with the initial distance to be traveled in any positioning operation. For example, a desired velocity profile associated with a head positioning of betwen 256 and 430 tracks could have its first half (increasing velocity-upward slope) defined in the first half of the ROM of a first segment defined by memory locations 0–215. The second half of the profile (decreasing velocity-downward slope) would then be defined in memory locations 726–512 of the second half of the ROM.

The Table II below sets out the preferred nine velocity profiles as far as storage location and relationship to the distance to be traveled (DTT)

TABLE II

| | VELOCITY PROFILES IN ROM | | |
|---|---|---|---|
| VEL. PROFILE | DDT | UP-SLOPE STORAGE | DOWN-SLOPE STORAGE |
| 1 | 256–430 | 0–215 | 726–512 |
| 2 | 128–255 | 256–383 | 895–768 |
| 3 | 64–127 | 384–447 | 959–896 |
| 4 | 32–63 | 448–479 | 991–960 |
| 5 | 16–31 | 480–495 | 1007–992 |
| 6 | 8–15 | 496–503 | 1015–1008 |
| 7 | 4–7 | 504–507 | 1019–1016 |
| 8 | 2–3 | 508–509 | 1021–1020 |
| 9 | 1 | 510–510 | 1022–1022 |

It must be emphasized that the distance-to-travel (DDT) is the initial distance differential between actual and desired positions. Every single one of the 1024 memory locations (each storing an 8-bit word) is capable of beingg addressed by a unique 10-bit address code, as explained above, and contains, in binary digital form, the desired velocity of travel for the real-time distance remaining to be traveled, as determined by the value stored in the up-down counter. This concept will be described in more detail below.

The first half of the ROM 617 (locations 0–511) will be addressed when the most significant bit (DOWN signal) is false, which occurs during the time the ½ DTT code loaded in the down counter is being counted down to zero. When that counter reaches zero, i.e. the first one-half of the distance to be traveled has been transgressed, then the DOWN signal goes high which will address the second half of the ROM associated with the downwad-sloped halves of the velocity profiles.

A particular one of the nine-velocity profiles to be accessed from the ROM (first from the first half of the ROM when DOWN is low and then from the second half when DOWN is high) is determined by the 8-bit trajectory index code from the register 622. Referring to FIG. 22 again, the mine different segments of each half of the ROM storing a corresponding one of the nine velocity profiles therein has a unique starting value in accordance with TABLE II above. The trajectory index code acts as a pointer to the segment of the ROM to be accessed for the particular half addressed by the state of the most significant bit, i.e. DOWN.

Preferred trajectory index codes for the nine different velocity profiles are shown in TABLE III below.

TABLE III

| TRAJECTORY INDEX CODES | |
|---|---|
| VEL. PROFILE | TRAJECTORY CODE |
| 1 | 00000000 |
| 2 | 00000001 |
| 3 | 00000011 |
| 4 | 00000111 |
| 5 | 00001111 |
| 6 | 00011111 |
| 7 | 00111111 |
| 8 | 01111111 |
| 9 | 11111111 |

Thus, when the trajectory code is 00000000, the first address to the ROM 617 will be 0000000000, which will call out the value stored in memory location 0. This value will represent an initial starting velocity level making up the upward-sloped portion of the desired velocity profile. The up-down counter will then clock by one so that the next address to the ROM 617 will be 0000000001. This will access memory location 1 that will call out the next velocity level, and so on. Eventually, one-half the distance to travel would have occurred so that the second half of the ROM will be addressed at memory location 726 (velocity profile 1). The last address to the ROM for velocity profile 1 will be 1000000000, i.e. memory location 512. If the trajectory code from register 622 was 00001111 (velocity profile 5), then the first address to the ROM would be 000011110 and the last address would be 100011110. When the trajectory code is 11111111 (velocity profile 9), then there are only two possible addresses for each half of the ROM, i.e. the first address would be 0111111110, the next 0111111111, the next 1111111111, and the last 1111111110.

As stated above, each memory location of ROM 617 that is address supplies an 8-bit word defining particular command velocity level that the respective head carriage assembly should be traveling at for the distance remaining to be traveled. These 8-bit words are applied on a transfer bus 630 to respective inputs of a conventional D/A converter 632 which converts the binary value of the 8-bit word to a discrete voltage level. If one looked at the composite of all the voltage levels defining the velocity profile addressed, it would be stepped approximation of optimum velocity vs. distance curves for the upward-slope and the downward-slope. Accordingly, the analog output of the D/A converter 632 is applied to a conventional shaping circuit 634 which shapes the signal so that the composite velocity vs. distance curves more closely approximate the optimum curves.

The output of the shaping circuit 634 will be a COMMAND VELOCITY signal that will have different voltage levels dependent upon the value of the address code input to the ROM 617. The COMMAND VELOCITY signal is applied on a line 636 through a non-inverting amplifier 638 to the source electrode of a FET 640, the drain electrode of which is connected to a summing junction 641 and then to a summing amplifier 642. The output of the amplifier 638 is also connected through an inverter 644 to the source electrode of a FET 646, the drain electrode of which is connected to the summing junction 641. The gate electrode of the FET 640 is connected to the output of a NAND-gate 648 and the gate electrode of the FET 646 is connected to the output of a NAND-gate 650.

The NAND-gate 648 has a first input adapted to receive a $\overline{\text{FORWARD}}$ signal from the processor 328 on a line 548g. That signal will be high when the processor has determined the requisite carriage movement to be in the reverse direction. A second input of the NAND-gate 648 is adapted to receive a $\overline{\text{DETENT}}$ signal from an inverter 651. That signal will be high when the servo system 194 is to be operated in a velocity mode, as to be distinguished from a position mode. Both modes will be described in more detail below. At this point, however, it is to be noted that when the up-down counter 612 is at a zero condition, a ZERO signal will be applied on a line 653 to the clock input of a Detent latch 655. The data input is tied high so that a high ZERO signal will set the latch 655. When set, a high DETENT signal is generated at its output. This signal is applied to the tracking circuits on a line 657 and is also applied through the inverter 651. As is conventional, the counter will count down to zero at one-half a track from the center of the desired track, at which point the DETENT signal will go high to switch the servo system from velocity mode to linear mode.

The $\overline{\text{DETENT}}$ signal is also applied to one input of the NAND-gate 650, the other input of which is adapted to receive a $\overline{\text{REVERSE}}$ signal on a line 548i from the processor 328. The $\overline{\text{REVERSE}}$ signal will be high when the processor has determined the requisite direction of travel to be forward.

Now then, during the velocity mode of servo operation, if a forward movement is required, the output of the NAND-gate 650 will go true, thereby enabling FET 646 to apply the negative COMMAND VELOCITY signal at the summing junction 641. If reverse movement is required, the gate 640 will be enabled to apply the positive COMMAND VELOCITY signal at the summing junction 641.

Also applied to the summing junction during both the velocity and position modes is the velocity signal VEL $\emptyset$ or VEL 1 generated by the associated transducer apparatus 332 or 334 (FIG. 12). As will be recalled, a VEL signal is representative of the actual velocity of the head carriage assembly being positioned.

Still referring to FIG. 13, the LIN $\emptyset$ or LIN 1 position signal developed by the associated transducer apparatus 332 or 334 is applied on the respective line 602c or 604c to a position amplifier 654 and to one input of a seek amplifier 657. The seek amplifier 657 has a further input adapted to receive a TRACKING CONTROL signal generated by the tracking circuits 330 on a line 652. As will be described in more detail below, the TRACKING CONTROL signal is used for track-following purposes, i.e. following "run-out."

The seek amplifier 657 amplifies the difference between the LIN and TRACKING CONTROL signals and applies the connected LIN signal (i.e. LIN is offset by TRACKING CONTROL) to the source electrode of a FET 656, the drain electrode of which is connected to the summing junction 641. The gate electrode of FET 656 is connected to the output of an inverter 660, the input of which is connected to the output of an AND-gate 662. A first input of the AND-gate 662 is adapted to receive the DOWN signal from the up-down latch 610 on a line 664, and a second input is adapted to receive the $\overline{\text{DETENT}}$ signal. In this manner, during the velocity mode ($\overline{\text{DETENT}}$ is low), the FET 656 will be enabled to apply the LIN signal to the summing junction 641 during the second half of the velocity profile being generated on line 636, i.e. when the DOWN signal is high. Superimposing the LIN position signal onto the summing junction 641 during velocity mode is a conventional technique known as "piercing" that is used for velocity curve smoothing purposes.

The output of the position amplifier 654 is connected to the source electrode of a FET 658. The TRACKING CONTROL signal is also connected to the source electrode. The drain electrode is connected to the summing junction 641 and the gate electrode is connected to the $\overline{\text{DETENT}}$ line. Thus, when the $\overline{\text{DETENT}}$ signal is low (position mode), the amplifier LIN signal and the TRACKING CONTROL signal will both be applied through the FET 658 to the summing junction 641. During position mode, it will be evident that the FET's 640, 646 and 656 will be off. Thus, the only signals present on the summing junction 641 will be LIN, VEL and TRACKING CONTROL. During the velocity mode, the COMMAND VELOCITY, VEL and TRACKING CONTROL will be the only signals presented at the summing junction 641 during the upward-sloped portion of the velocity profile with the addition of the LIN signal during the downward-sloped portion of the velocity profile for "piercing" purposes, as described above.

The output of the summing amplifier 642 is applied through a conventional compensation circuit 666 in order to control movement of the associated head carriage assembly. In this respect, the SERVO DRIVE signal at the output of the compensator 666 is applied on the line 193 to the carriage drive circuit 190 (FIG. 7) in the associated carriage drive 300 or 302 (FIG. 9). Each servo control system 194, operating in both velocity and position modes, may thus be characterized as a "dual-mode" servo system.

VII. TRACKING CIRCUITS

Figure 17A:
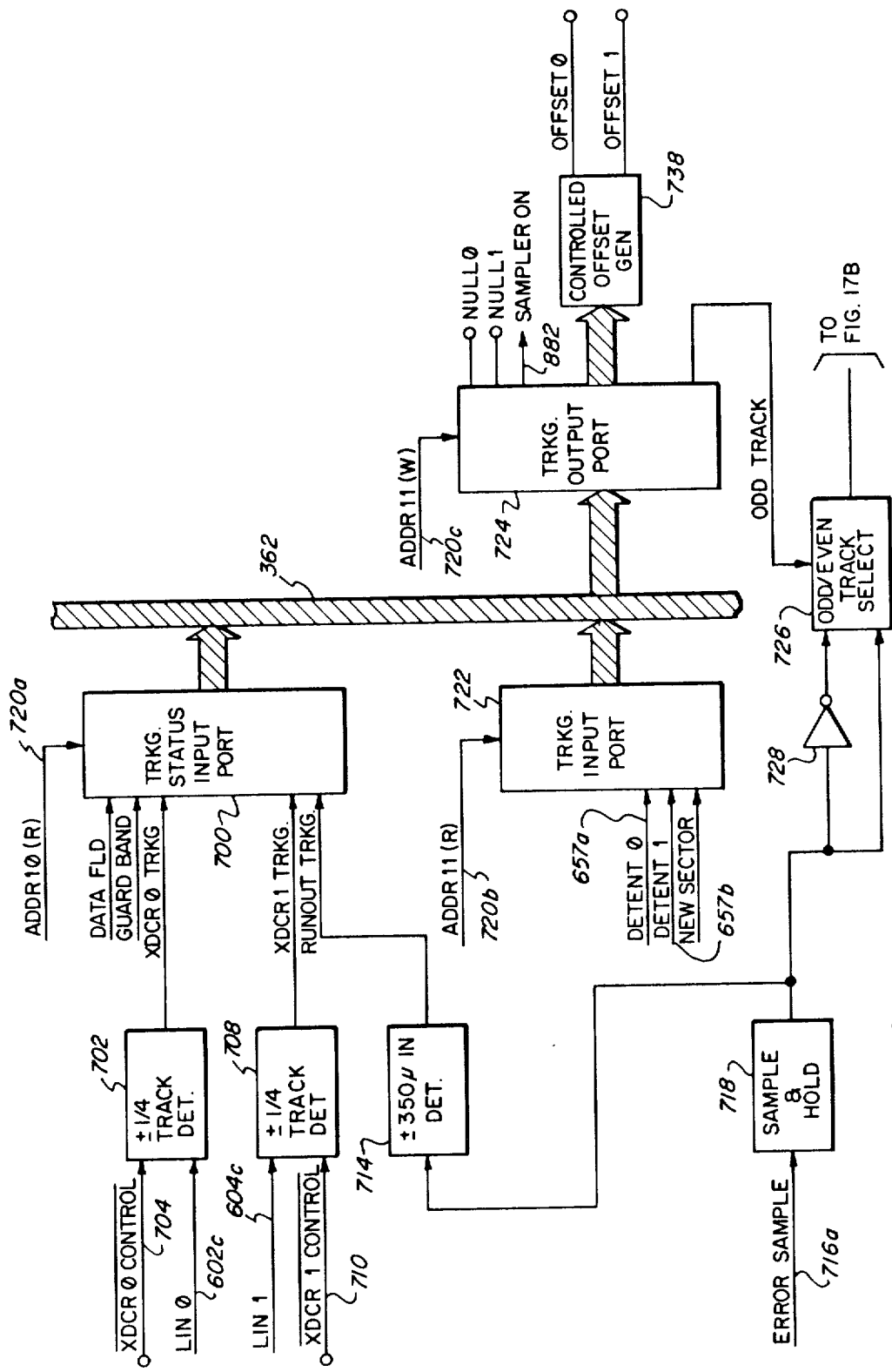
Figure 17B:
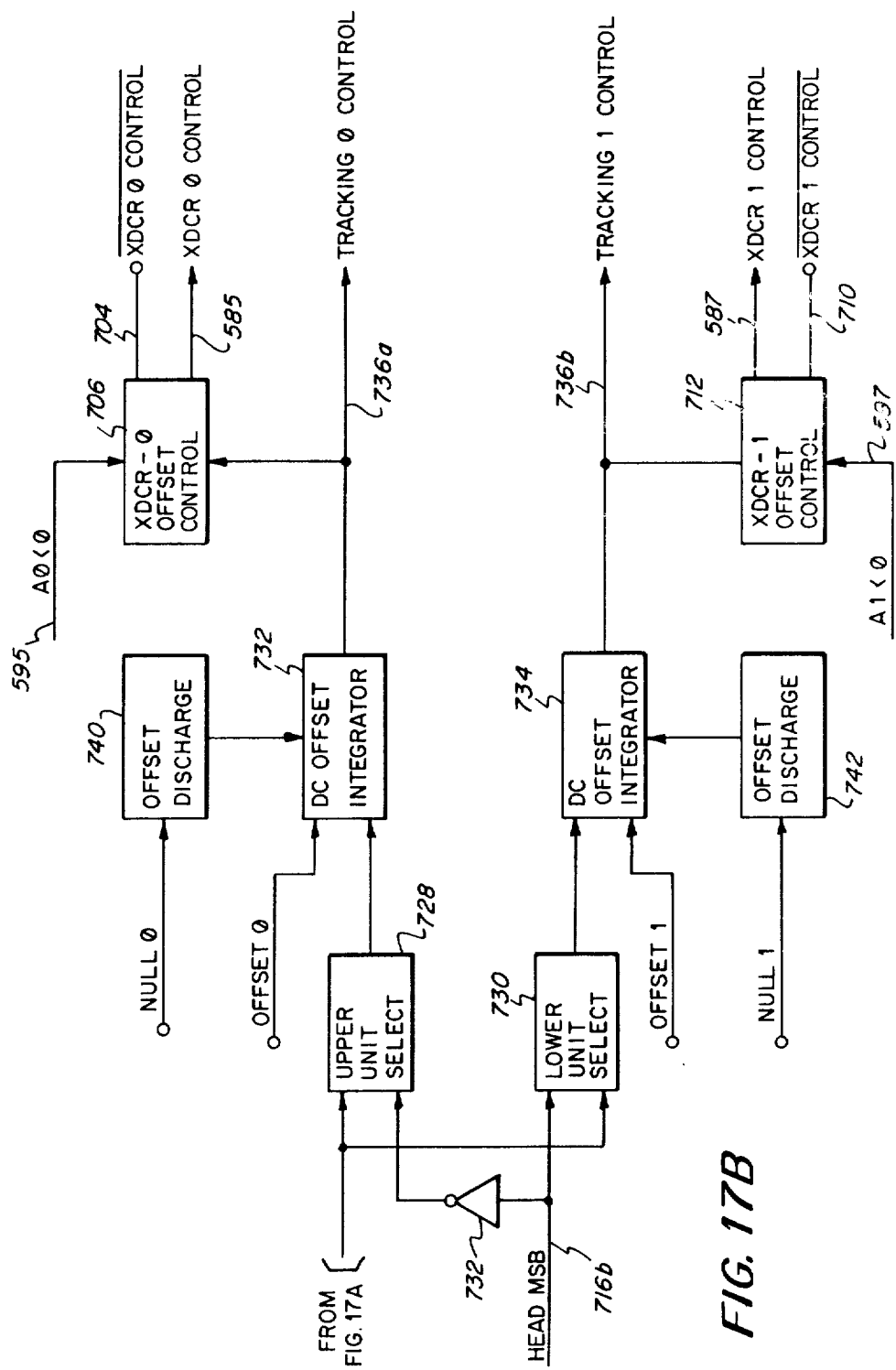

Reference is now had to FIGS. 17-20 for a description of the various tracking circuits 330. Referring first to FIG. 17, the tracking circuit 330 include a tracking status input port 700. A first input (bit $\emptyset$) of the port 700 is adapted to receive a XDCR $\emptyset$ tracking signal from a $\pm\frac{1}{4}$ track detector 702. The XDCR $\emptyset$ TRACKING signal will be true whenever the heads 14a and 14b are within $\frac{1}{4}$ track of the center of a track over which it is being positioned. The $\pm\frac{1}{4}$ track detector 702 receives at one input the LIN 0 signal on line 602C from the transducer 0 circuits 332. Another input of the detector 702 is adapted to receive a $\overline{\text{XDCR 0 CONTROL}}$ signal on a line 704 from an output of a transducer offset control circuit 706. A XDCR $\emptyset$ CONTROL circuit is generated at another output of the offset control circuit 706 and applied along the line 585 to the position commutator 584 (FIG. 12).

The XDCR $\emptyset$ CONTROL signal is a d-c voltage level representative of a desired amount of offset for the signals C$\emptyset$, D$\emptyset$ and LINE $\emptyset$. The XDCR $\emptyset$ CONTROL signal is dependent upon the control voltage acquired by the offset integrator 734 plus the desired offset voltage required by the controller 318, as determined by the track offset commands applied to the drive 10 by the controller 318. The control voltage normally required by the offset integrator 734 is that voltage needed to position the heads 14a and 14b such that the d-c component of the ERROR SAMPLE signal from the sample and hold circuit 718 is zero in the absence of any offset commands to the drive 10 from the controller 318. The XDCR 0 CONTROL signal, when true, will cause the C0, D0 and LIN 0 to be off-set both in amplitude and phase by a predetermined amount determined by the voltage level of the SDCR 0 CONTROL signal.

Since LIN 0 would have been offset by an amount defined by the XDCR 0 CONTROL signal applied to the position commutator 584, in order to detect whether the heads 14a and 14b are within ¼ track of track center, the offset introduced by the XDCR 0 CONTROL signal has to be subtracted from the LIN 0 signal. This subtraction occurs in the detector 702 as a result of the $\overline{\text{XDCR 0 CONTROL}}$ signal applied at its second input. It is possible to detect when the heads 14a and 14b are within ¼ track of track center since it will be recalled that the LIN 0 signal is a saw-tooth wave having a period equal to the distance between adjacent tracks, wherein the median voltage level of the wave represents track centers. Thus, by using appropriate voltage threshold detector circuitry, it is possible to detect when the heads 14a and 14b are within ¼ of either side of track center. Since the voltage threshold levels remain constant, it is necessary to subtract back out the offset introduced by the XCDR 0 CONTROL signal, as explained above.

A second input (bit 1) of the tracking status input port 700 is adapted to receive a XDCR 1 TRACKING signal from the output of another ±¼ track detector 708 identical with detector 702. The XDCR 1 TRACKING signal, when true, indicates that the heads 14c-14h of unit 1 are within ¼ track of track center. Detector 708 operates identically to detector 702 and thus receives at one input the LIN 1 signal on line 604c from the transducer circuits 334, and at another input a $\overline{\text{XDCR 1 CONTROL}}$ signal on a line 710 from the output of a XDCR-1 offset control circuit 712 identical to circuit 706. A second output of the offset control circuit 712 carries a XDCR 1 CONTROL signal on the line 587 to the position commutator 584' for the purposes as described above relative to XDCR 0 CONTROL and commutator 584. The specific manner of operation of the offset control circuits 706 and 712 will be described in more detail below.

A third input (bit 2) of the port 700 is adapted to receive a RUNOUT TRACING signal from the output of a ±350 uin detector 714. This signal will be true when a run-out error signal (ERROR SAMPLE) from the read-write circuit indicates tracking within 350 350 of track center. In this respect, the ERROR SAMPLE signal is applied on a line 716a from the read/write circuits 336 to a sample and hold circuit 718 which then applies such signal to the input of the ±350 uin detector. As will be described in more detail below, there is a track-following or "run-out" code stored in the 60-byte reserved area of each track sector (see FIG. 21). The read/write circuits 336 read the code at the beginning of each sector within the 60-byte reserved area. An error signal will be generated if the heads are not precisely following the track center-line. This error signal is the ERROR SAMPLE signal mentioned above. The ±350 uin detector includes suitable voltage threshold circuitry for detecting whenever, due to the voltage level of the ERROR SAMPLE signal, the unit being controlled is tracking within 350 uin of track center. Details of a preferred track-following code may be had from a review of copending application Ser. No. 732,634. Details of circuitry that may be used to read such code and generate the ERROR SAMPLE signal will be described below.

A fourth input (bit 3) of the port 700 is adapted to receive a GUARD BAND signal. This signal is derived from a GUARD-BAND FOUND (GBF) signal that is generated on a line 716d from the read/write circuits 336 (see FIG. 14). The GBF signal preferably triggers a retriggerable monostable multivibrator (not shown) whose output is the GUARD BAND signal. The GUARD BAND signal will remain true so long as a GBF signal pulse is raised once each sector. The GBF signal will go true when a first predetermined identifying code, which is preferably "nine-easy" (9E) is detected in the 60-byte reserved area in each sector. The code 9E is stored in the reserved area of each sector proceeding the track following code for only tracks −2 and −6 and 430 through 435. These tracks indicate the "guard-band" around the 430 tracks that are used for reading and writing data i.e. tracks 0-429. The guardbank tracks are not to be used for reading. The reason track −1 does not have the code 9E stored therein will be described below with reference to a restore operation. To distinguish the usable tracks from the guardbank tracks, a second different identifying code, preferably "eight-easy" (8E) is stored in the 60-byte reserved area of each sector of each of tracks 0 through 429. The code "8E" is also stored at track −1 for restore purposes, as will be explained below.

Each time an 8E code is read by the read/write circuits 336, a SEP SYNC signal pulse will be generated on a line 716c. It will also be applied to a monostable multivibrator (not shown) for triggering same. The output of that multivibrator is a DATA FIELD signal that is applied to a fifth (bit 4) input of the tracking status input port 700. The DATA FIELD signal will be high whenever the heads of the associated unit are reading from any one of the tracks −1 through 429.

The port 700 is enabled to load in the input signals applied thereto upon receipt of an ADDR 10(R) control signal from the processor 328 on a line 720a. It is noted that bits 5–7 of the port 700 are unused. The contents of the port 700 when loaded are applied onto the data bus 362 for transfer to the processor 328.

The tracking circuits 330 further include a tracking input port 722 which has three active inputs. A first input (bit 5) is adapted to receive the DETENT 0 signal from the servo control system 194 for unit 0 on a line 657a. A second input (bit 6) is adapted to receive the DETENT 1 signal from the servo control system 194 for unit 1 on a line 657b. The third and last active input (bit 7) is adapted to receive a NEW SECTOR signal which is basically a synchronization signal for the processor 528 to synchronize its software operations to the revolution speed of the disks 16a–16d. The NEW SECTOR signal is generated by either the SEP SYNC signal received on line or the GBF signal received on line 716b whenever the tracking circuit is enabled by a true output on the SAMPLER ON signal on a line 882. The inputs to the tracking input port 722 will be loaded therein upon receipt of an ADDR 11(R) control signal from the processor 328 on a line 720b. These input signals will then be forwarded to the data bus 362 for transmittal to the processor 328.

Still referring to FIG. 17, the tracking circuits 330 include a tracking output port 724 that is capable of loading a tracking output byte therein upon receipt of a load command in the form of an ADDR 11(W) control signal from the processor 328 on a line 720c. The tracking output port byte consists of the following bits of information. Bit ∅ contains a NULL ∅ signal that will be high when the beginning of a restore operation is to be performed on unit ∅. Bit 1 contains a NULL 1 signal that will be high when the beginning of a restore operation is to be performed on unit 1. Bit 2 contains a SAMPLER ON signal that is applied to the enable input of a data bit counter 726 (FIG. 20) for a purpose to be described below. Bits 3–6 together represent a desired amount of offset, as initially determined by the TRACK OFFSET command signal from the controller 318 as discussed above. The processor 328 responds to that command and generates a corresponding 4-bit offset code that is accessed from the port 724 on output lines 3–6. The last bit (bit 7) contains an ODD TRACK signal that will be high when it is desired to set the tracking circuit to compensate for an odd track run out.

More specifically, the ODD TRACK signal is coupled to one input of an odd/even track select circuit 726. The circuit 726 also receives the ERROR SAMPLE signal from the sample and hold circuit 718 and an $\overline{\text{ERROR SAMPLE}}$ from the output of an inverter 728 coupled to the output of the sample and hold circuit. When the ODD TRACK signal is low, indicating an even track, only the ERROR SAMPLE signal is applied at the output of the circuit 726. On the other hand, when the ODD TRACK signal is high, indicating an odd track, only the $\overline{\text{ERROR SAMPLE}}$ is applied at the output of the circuit 726. The circuit 726 includes conventional switching circuitry for achieving the above functions.

The output signal from the circuit 726, i.e. ERROR SAMPLE or $\overline{\text{ERROR SAMPLE}}$, is applied to one input of an upper unit, (unit ∅) select circuit 728 and to one input of a lower unit (unit 1) select circuit 730. A second input of the select circuit 728 is adapted to receive a $\overline{\text{HEAD MSB}}$ signal from the output of an inverter 732, the input of which is connected to the read/write circuits 336 on a line 716b for receiving a HEAD MSB signal therefrom. The HEAD MSB signal is also applied directly to the second input of the select circuit 730. The HEAD MSB signal is the most significant bit of a 5-bit head select code that will be described in more detail below. At this point, it should be noted that the HEAD MSB signal when low, indicates that the head selection is for unit ∅, whereas when it is high it indicates that the head selection is for unit 1.

When the HEAD MSB signal is low, the upper unit select circuit 728 will be enabled to pass the output signal from the circuit 726 to a dc offset integrator 732. When the HEAD MSB signal is high, the lower unit select circuit 730 will be enabled to pass the output signal from the circuit 726 to another dc offset integrator 734. The integrators 732 and 734 comprise conventional circuitry for integrating the input signals thereto in order to develope the tracking control signals, i.e. TRACKING ∅ CONTROL and TRACKING 1 CONTROL, respectively, for application to the respective servo control systems 194 on lines 736a and 736b, respectively. These tracking control signals can be offset in the desired amount commanded by the controller 318, as indicated by the 4-bit offset output from the tracking output port 724.

More specifically, this 4-bit offset code is applied to a controlled offset generator 738 which basically acts to decode and convert to analog form an offset value for unit ∅, or for unit 1, as the case may be. These analog signals, i.e. OFFSET ∅ and OFFSET 1, are applied from the controlled offset generator 738 to respective inputs of the integrators 732 and 734 so as to offset the sampled error signal applied thereto by an amount proportional to the d-c level of the signals OFFSET ∅ and OFFSET 1, respectively.

The NULL ∅ signal developed at the bit ∅ output of the tracking output port 724 is applied to an enable input of an offset discharge circuit 740. When the NULL ∅ signal is high, which occurs when a restore operation is to be performed on unit ∅, the circuit 740 will be enabled to discharge the integrator 732 thereby disabling the TRACKING ∅ CONTROL signal input to the servo control system 194 for unit ∅. Correspondingly, when the NULL 1 signal is high, which occurs when a restore operation is to be performed on unit 1, a similar discharge circuit 742 will be enabled by the NULL 1 signal to discharge the integrator 734 thereby disabling the TRACKING 1 CONTROL signal.

As alluded to earlier, the XCDR ∅ CONTROL AND $\overline{\text{XDCR ∅ CONTROL}}$ signals are developed at respective outputs of the XDCR-∅ offset control circuit 706, and the SDCR 1 CONTROL and $\overline{\text{XDCR 1 CONTROL}}$ signals are developed at respective outputs of the XDCR-1 offset control circuit 712. The circuit 706 has one input adapted to receive the A∅<∅ signal on line 595 from the zero crossing detector 591 (FIG. 12), and another input adapted to receive the TRACKING ∅ CONTROL signal from the integrator 732. In this manner, an appropriate offset value represented by the XDCR ∅ CONTROL signal will be developed for offsetting the C∅, D∅ and LIN ∅ a predetermined amount both in amplitude and phase. A primary purpose of this offset, as explained above, is to relocate the commencement of the clock pulses on the 606 (FIG. 13) so that when the up-down counter counts down to zero and the ZERO line 653 goes high, the DETENT signal will occur at a location properly shifted in phase to compensate for the amount of offset in order for the heads to correctly stop over track center.

In correspondence with the above, the XDCR-1 offset control circuit 712 receives a first input adapted to receive the A1<∅ signal on line 597 from the zero crossing detector 593 (FIG. 12) and a second input adapted to receive the TRACKING 1 CONTROL signal from the output of the integrator 734.

Reference is now had to the circuit depicted in FIG. 18 which is included in the tracking circuits 330 and effects the generation of the SECTOR MARK ∅ and INDEX MARK ∅ signals. Sector/index ring (not shown) is mounted to spindle 30 of the drive 10 for rotation along with the disk 16a in cartridge 28. The ring is actually in the cartridge 28 and is loaded about the spindle 30 when the cartridge is loaded in the drive. The ring has a plurality of spaced magnetic sector marks formed thereon equal in number to the desired number of sectors on each surface of the disk 16a. A single magnetic index mark is also formed thereon. A magnetic sensor in the drive generates a SEC-TR∅ signal pulse each time either a sector mark or the index mark is detected. These pulses are applied through a conventional integrator 750 and peak detector 752, and then to a conventional index/sector separator circuit 758 which separates the $\overline{\text{SECTOR MARK ∅}}$ pulses from the $\overline{\text{INDEX MARK ∅}}$ pulses. These pulses are respectively applied on lines 442a and 442b to the interface circuit 326 (FIG. 10).

Mounted permanently in the drive for rotation with the spindle 30 is another ring (not shown) which includes a plurality of uniformly spaced openings thereabout defining sector marks for unit 1, as well as another opening defining an index mark. These openings are detected by a conventional photo-emission and detection device (not shown) included in the drive. Referring to FIG. 19, a SEC-TRI pulse is generated each time an opening is sensed. These pulses are applied through a conventional inverting amplifier 754 and a conventional peak detector 756 to another conventional index/sector separator circuit 760 which separates the SECTOR MARK 1 pulses from the INDEX MARK 1 pulses. These pulses are respectively applied on lines 442c and 442d to the interface circuit 326.

The circuit of FIG. 20, which is also part of the tracking circuits 330, will be described below in conjunction with the description of the read-write circuits 336.

VIII READ/WRITE CIRCUITS

The read/write circuits 336 will now be described with reference to FIGS. 14–16 and 20. Referring first to FIG. 14, the read/write circuits include a phase-locked oscillator (PLO) 800 for generating WR CLOCK signal pulses that are synchronized with the speed of rotation of the disks 16a–16d, as determined by the SECTOR MARK 1 signal pulses applied to an input of the PLO 800. The SECTOR MARKS 1 are used instead of the SECTOR MARKS ∅ since SECTOR MARK 1 detection components are installed for all configurations of the drive.

The PLO 800 also generates a BYTE RATE CLOCK signal that is comprised of pulses occurring at ⅛ the rate of the WR CLOCK pulses. The BYTE RATE CLOCK signal pulses are applied to the clock input of a byte counter 802. The counter 802 is enabled to load in and count each BYTE RATE CLOCK pulse at the occurrence of either a SECTOR MARK ∅ pulse or a SECTOR MARK 1 pulse, as applied through an OR-gate 804 to the enable input of the byte counter 802. The byte counter 802 also receives at an input the SEP SYNC output of an "8E" detector 806 which will be true when the code 8E is detected by the reading head in the 60-byte reserved area of a track sector. Additionally, the byte counter 802 receives as yet another input the GBF (ground-band-found) signal generated at the output of a "9E" detector 808 when the reading head detects the code 9E in the 60-byte reserved area of a track sector. The operation of detectors 806 and 808 will be described below.

In response to the various input signals applied to the byte counter 802, it generates a WRITE INHIBIT output signal which will be set at the occurrence of a SECTOR MARK and will be reset 12 bytes after either an 8E or 9E code is detected, as indicated by either SEP SYNC OR GBF going high. The WRITE INHIBIT signal is used internally by the read/write circuits 336 in a manner to be described below. The byte counter 802 also generates the ESM (electronic sector mark) signal that is applied on line 390 to the interface 326 (FIG. 10). The ESM signal will go high at the detection of an 8E or 9E code and will go low 12 bytes later. Thus, the ESM signal will go low at the same WRITE INHIBIT goes low.

Figure 16:
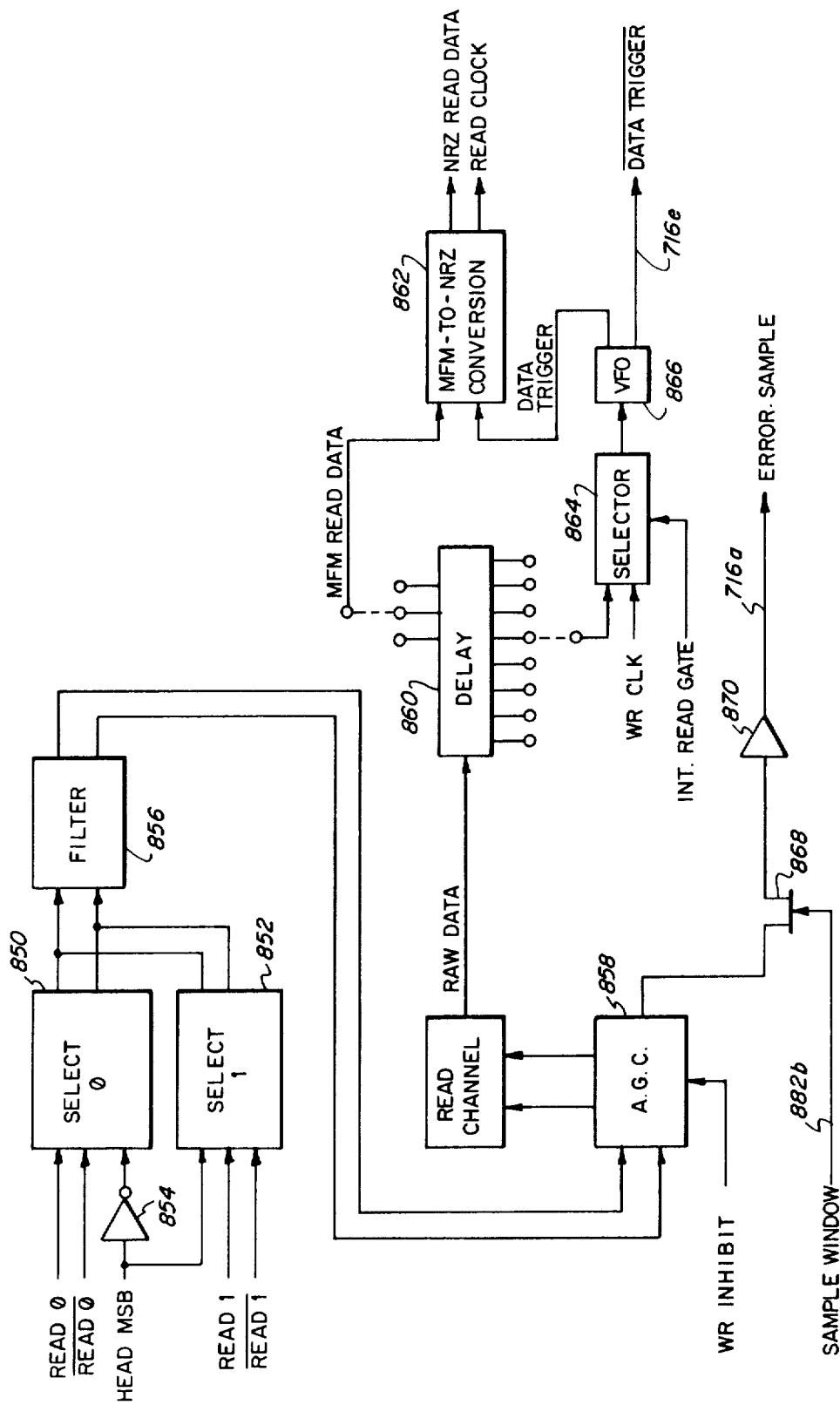

The read/write circuits 336 also include a shift register 810 which is enabled by an enable signal from the byte counter 802 to receive NRZ READ DATA signals developed by the circuits of FIG. 16. Data is recorded on a disk surface in MFM (modified frequency modulation) format and, when read therefrom by a head, is first converted to an "NRZ" code for transmittal to the controller 318. This concept will be described in more detail below.

NRZ READ DATA signals are clocked into the shift register at the rate of READ CLOCK signal pulses that are developed by the circuit of FIG. 16 and are at the same frequency of data recorded on the disk. The contents of the shift register 810 are constantly monitored by the 8E detector 806 and the 9E detector 808 since such contents are applied in parallel on a bus 812 to respective inputs of these detectors. Each detector 806 and 808 includes conventional comparison circuitry for generating a high output signal (SEP SYNC or GBF, respectively) when the code 8E or 9E is presented on the bus 812.

NRZ READ DATA signals are applied through a line driver 814 onto the cable B as NRZ DATA (INT. DATA) that is applied through the interface 326 to the controller 318 (see FIG. 10). Correspondingly, NRZ DATA applied from the controller 318 on the cable B is received by a line receiver and forwarded as NRZ WRITE DATA to a conventional NRZ-to-MFM converter 818. The converter 818 converts the NRZ WRITE DATA signals to MFM WRITE DATA signals for application to the circuit of FIG. 15. These latter signals will ultimately be recorded on a desired track of a disk.

The read/write circuits 336 also include a clock select circuit 820 for receiving the WRITE CLOCK signal developed by the PLO 800 at its clock input, and for receiving the READ CLOCK signal from the circuit of FIG. 16. Further, the circuit 820 is enabled by the INT. READ GATE signal applied on a line 445a from the interface circuit 326. The output of the latch 820 represents system clock pulses that are applied through a line driver 822 onto the cable C an INT. CLOCK signal pulses. The INT. CLOCK signal pulses are then forwarded along such cable C through the interface 326 to the controller 318.

The read/write circuits 336 also include a conventional write current control circuit 824 that generates a pair of signals I WR∅ and I WR1 at respective outputs thereof. Each of these signals may be at any one of a number of voltage levels corresponding to deserved writing currents for the heads of unit ∅ and 1. The magnitude of the writing current is dependent upon the location of the track to be written upon. For example, the lowest level write current is used for tracks 385–429, a higher level current for tracks 128–191, a still higher current for tracks 64–127, and the highest level current for tracks ∅–63.

In order to control the magnitude of signals I WR∅ and I WRI, the circuit 824 has a first input adapted to receive the WRITE INHIBIT signal from the byte counter 802, which will be true when it is desired to prevent writing, i.e. during the 60-byte reserved area in each track sector. A second input of the circuit 824 is adapted to receive the HEAD MSB signal which identifies either unit ∅ or unit 1. The third through fifth inputs of circuit 824 are respectively adapted to receive CYL 64, CYL 128 and CYL 286 signals. Each of these signals will go true when the heads to perform a write function are located over those respective track numbers. All of the signals CYL 64, CYl 128 and CYL 256 signals will be false when the head is between tracks ∅ and 63, only CYL 64 will be true when the head is between tracks 64 and 127, and so on. The signals HEAD MSB, CYL 64, CYL 128 and CYL are generated by the processor 328 in a manner to be described below. The sixth and last input of the circuit 824 is adapted to receive the INT. WRITE GATE signal from the interface on the line 445b.

A pair of indentical read/write status ports 826 (only one shown) are also included in the read/write circuits 336. There is one port 826 for unit ∅ and a separate port 826 for unit 1. The unit ∅ port 826 is enabled by an ADDR ∅ 4(R) control signal from the processor 328 on a line 828a and is reset by an ADDR 14(R) control signal from the processor on a line 848c. The unit 1 port 826 is also reset by the ADDR 14(R) signal, but is enabled by an ADDR 13 (R) control signal applied to the enable input thereof on a line 828b. Upon receipt of an enable command, each port 826 will load in the inputs applied thereto which are identical for each port and include the READ/WRITE GATE FAULT signal at a first input, a DATA RECORDING FAULT signal at a second input, the WR ACTIVITY FAULT signal at a third input, a WRITE UNSAFE signal at a fourth input, and a MULTI-HEAD FAULT signal at a fifth input. When each port 826 is enabled, these five input signals will be applied along a transfer bus 830 onto the data bus 362 for transmittal to the processor 328. The WRITE ACTIVITY, WRITE UNSAFE and MULTI-HEAD FAULT signals are developed by the circuitry depicted in FIG. 15 and will be defined and described below.

Figure 14:
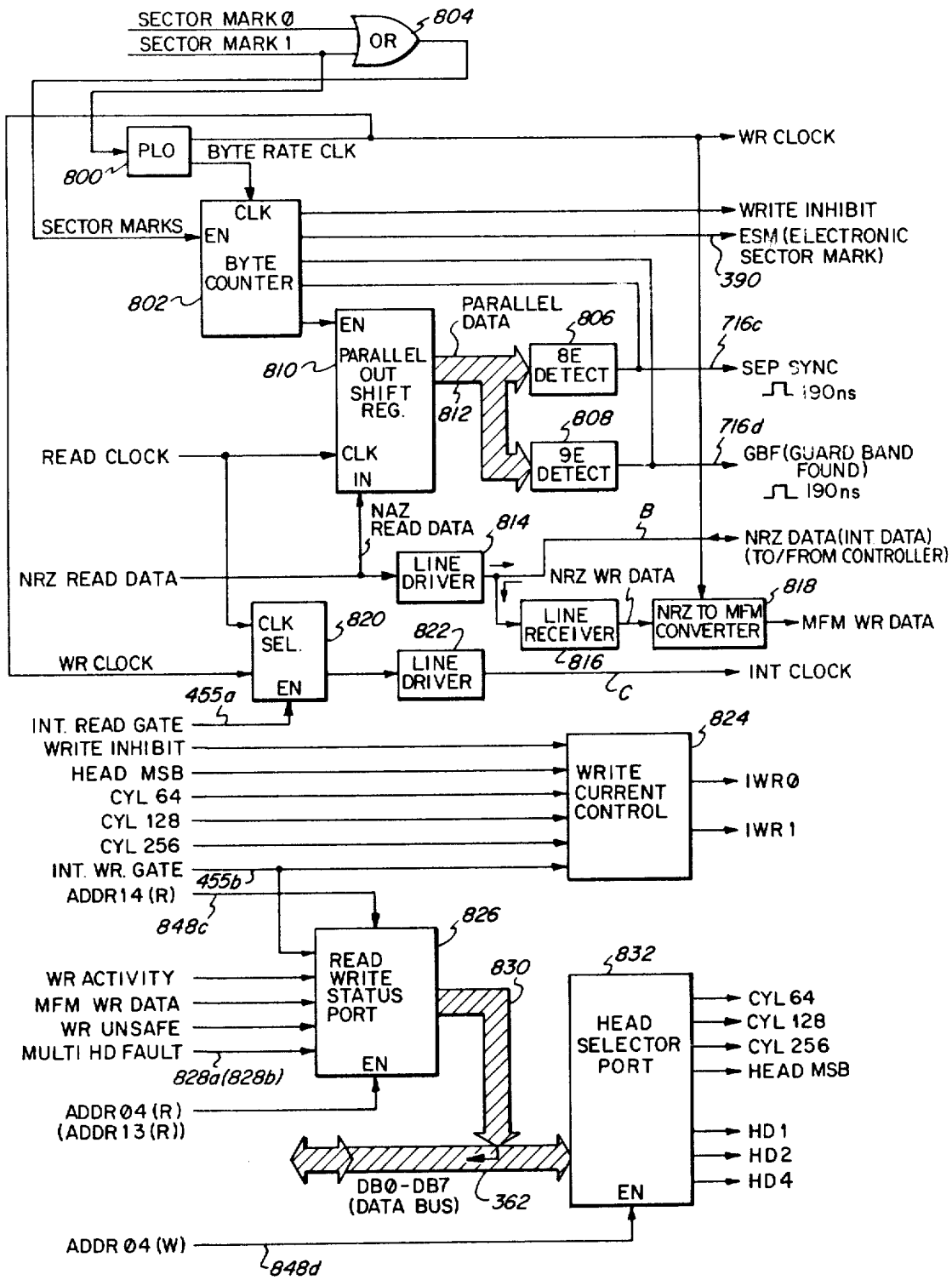
FIGS. 14–16 are schematic block diagrams of the read/write circuits depicted in FIG. 9.

Still referring to FIG. 14, the read/write circuits 336 include a head selector cylinder status pot 832 which has its eight inputs coupled to the data bus 362 for receiving a head selection byte and cylinder status from the processor 328. This head selection byte is loaded into the port upon receipt of an ADDR ∅4 (W) control signal on a line 848d from the processor. The bits of the status byte include the CYL 64, CYL 128, CYL 256 and HEAD MSB signals at bits ∅-3, respectively, as well as a 3-bit head selection code (HD1, HD2 and HD4) at bits 4-7, respectively. The code HD1 - HD4 is applied on respective lines to three respective inputs of a head select circuit 834 (FIG. 15).

Figure 15:
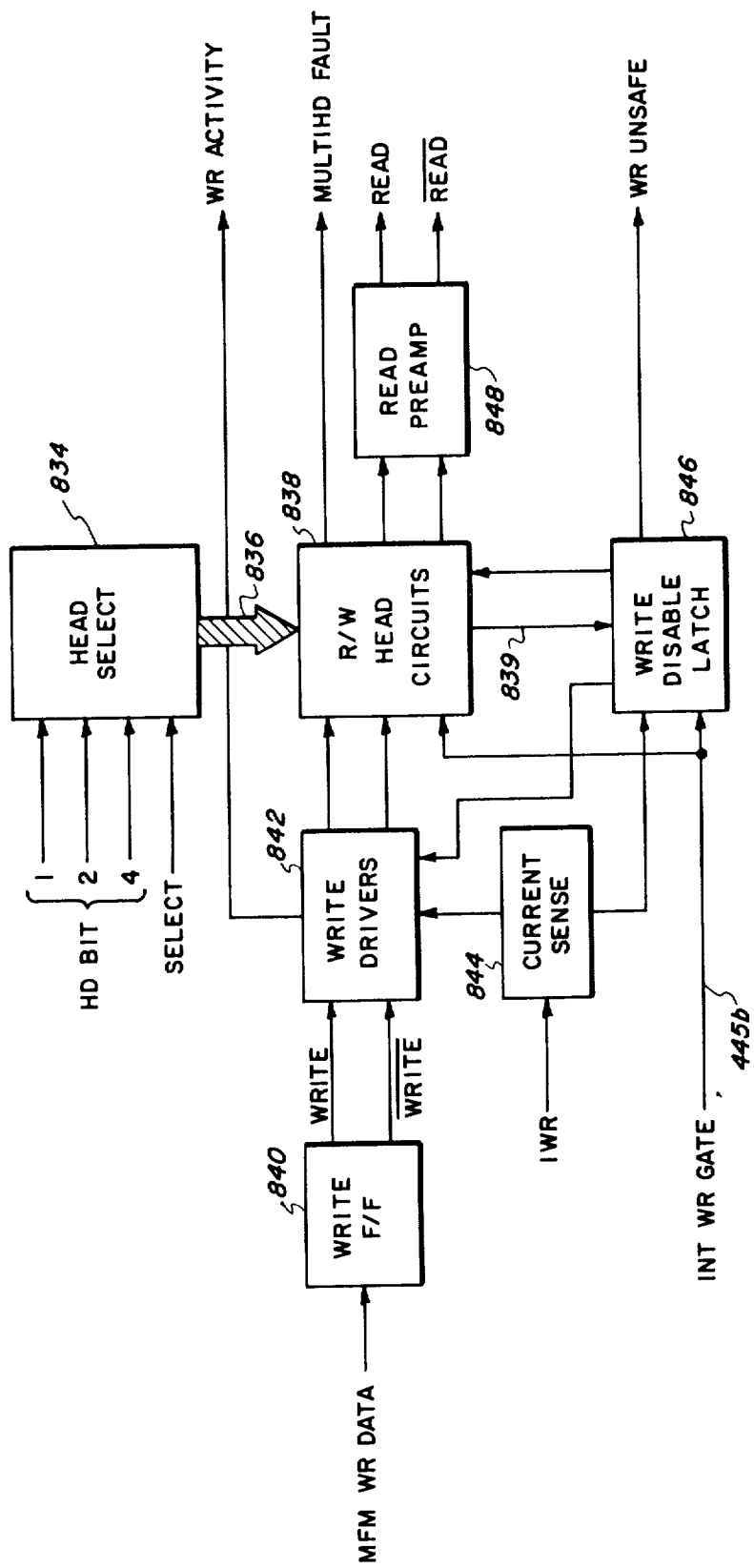

Referring now specifically to FIG. 15, the circuitry depicted therein is duplicated, an identical one for each unit ∅ and unit 1. Only one circuit is shown for simplicity of description. Thus, each head select circuit 834 receives the head select code HD1 - HD4 at the first three inputs thereof. A fourth input of each circuit 834 is adapted to receive a distinct SELECT signal, each SELECT signal being derived from the HEAD MSB signal. More specifically, if the HEAD MSB signal is low, then the SELECT line applied to the unit ∅ head select circuit 834 will be high, whereas if the HEAD MSB signal is high, then the SELECT signal for the unit 1 head select circuit will be high. When a particular SELECT signal is high, it enables its associated head select circuit to load in the head select code HD1-HD4.

From the head select circuit 834, the head select code HD1-HD4 is applied in parallel on a transfer bus 836 to respective inputs of conventional read/write head circuits 838 which decode the code and enables a particular one of the heads in the unit selected. The circuits 838 also receive the MFM WRITE DATA from the converter 818 (FIG. 14) as applied through a conventional write buffer 840 and write drivers 842. A current sensing circuit 844 receives the I WR signal developed from the write control circuit 824 (FIG. 14) and generates a current control signal to the write drivers to insure that no writing occurs in unsafe conditions. This data can be written only during the time the INT. WRITE GATE signal is high. In this regard, the INT. WRITE GATE signal is applied to an input of the read/write head circuits 838.

A center-tap output of the head circuits 838 is applied on a line 839 to a write disable latch 846, which also receives the INT. WRITE GATE signal. If the disable latch 846 senses a write current on line 839 during the time INT. WRITE GATE is low, then the latch 846 will generate a high level WRITE UNSAFE signal at its output. This signal is applied to an input of the read/write status port 826 (FIG. 14).

The write drivers 842 will generate a high level WRITE ACTIVITY signal at an output thereof if a writing operation is being conducted. This signal is applied to another input of the port 826. The read/write head circuits 838 will generate a high level MULTI-HEAD FAULT when they detect that more than one head of the selected unit is being accessed during a data write operation. This signal is also applied to an input of the status port 826.

Still referring to FIG. 15, data read by a head from a disk is fed through conventional pre-amplifier circuits which supplies the data read as READ and $\overline{\text{READ}}$ signals, as is conventional. The READ ∅ and $\overline{\text{READ}}$ ∅ signals from a unit ∅ operation are applied to respective inputs of a select ∅ circuit 850 (FIG. 16), whereas the READ 1 and READ 1 signals are applied to respective inputs of a select 1 circuit 852.

Referring now specifically to FIG. 16, the select ∅ circuit 850 is enabled by a $\overline{\text{HEAD MSB}}$ signal applied thereto from an inverter 854. When enabled, the READ ∅ and $\overline{\text{READ}}$ ∅ signals will be applied through a conventional filter circuit 856 to a conventional automatic gain control (AGC) circuit 858. The circuit 858 is used to bring the READ ∅ and $\overline{\text{READ}}$ ∅ signals up to the proper signal amplitude. The signals READ ∅ and $\overline{\text{READ}}$ ∅ are applied from the AGC circuit 858 to a conventional read channel which forms the RAW DATA. This data, which is in MFM format, is then applied through a conventional delay circuit 860 to a conventional MFM-to-NRZ converter 862.

The converter 862 is triggered by a variable-frequency-oscillator (VFO) 866 when locked to the read data during the time the INT. READ GATE signal is high. This occurs by applying the read data to the VFO 866 from a selection circuit 864 upon receipt of a high INT. READ GATE signal at an input thereof. The converter 862 will not be triggered by the VFO 866, however, if it is locked to the WRITE CLOCK signal instead of the data. This will occur when the INT. READ GATE signal is low. The selector 864 may comprise any suitable conventional selection circuitry capable of functioning in the above manner.

The READ 1 and $\overline{\text{READ 1}}$ signals read from a disk of unit 1 are applied through the selection circuit 852, when enabled by a HEAD MSB signal, and forwarded to the filter 856 where they are handled from then on identically as the READ ∅ and $\overline{\text{READ}}$ ∅ signals were handled, as described above.

Still referring to FIG. 16, it will be recalled that track-following servo data is recorded in the 60-byte reserved area of each track sector following an 8E or 9E code (dependent upon the track as explained above), also stored therein. It will further be recalled that the WRITE INHIBIT signal will be high from the occurrence of a sector mark until the ESM signal goes low, i.e. twelve bytes following the detection of an 8E code in a sector of tracks 0-429. Thus, the 60-byte reserved area will be protected from writing.

Accordingly, when servo data is being read by the heads of either unit, the WRITE INHIBIT signal will be high. The ABC circuit 858 applies the READ 0 signal or the READ 1 signal, as the case may be, to the source electrode of a FET 868, the gate electrode of which is adapted to receive a SAMPLE WINDOW signal from the tracking circuit of FIG. 20. The SAMPLE WINDOW signal will be high when it is desired to sample the servo data and apply it as the ERROR SAMPLE signal to the tracking circuit. Thus, when SAMPLE WINDOW is low, the READ signal will be applied through the FET 868 to an inverting amplifier 870 connected at its input to the drain electrode of the FET 868. The output of the amplifier 870 represents the ERROR SAMPLE signal and is coupled on a line 716a to the tracking circuits.

Referring to FIG. 20, the manner of generating the SAMPLE WINDOW signal will be described. As shown, a data bit counter 880 is provided that has a first enable input adapted to receive a SEP SYNC signal on the line 716c from the 8E detector 806 (FIG. 14), a second enable input adapted to receive a GBF signal on the line 716d from the 9E detector 808, and a third enable input adapted to receive the SAMPLER ON signal on a line 882a from the tracking output port 724 (FIG. 17). The DATA TRIGGER signal is applied to the clock output of the counter 880 on a line 716e from the VFO 866 (FIG. 16).

When either the SEP SYNC signal or GBF signal goes high during the occurrence of a high SAMPLER ON signal, the data bit counter 880 is enabled and its outputs are sent to the on/off control circuit 884 causing it to turn on a sample window generator 886. The counter 880 will then count a predetermined number of DATA TRIGGER pulses, e.g. 8 bytes, during which the sample window generator 886 produces several sampling gates that are synchronized to the servo data and transmitted over the SAMPLING WINDOW line 882b to the sampling control fet 868 (FIG. 16). At the end of the sampling period, the ON/OFF control circuit 884 is disabled thereby causing the sample window generator 886 to disable the SAMPLE WINDOW signal.

IX. OPERATION (PROGRAM CONTROL)

The operation of the disk drive 10 in response to commands initiated by the controller 318 will now be described with reference to FIGS. 24-65.

Figure 24:
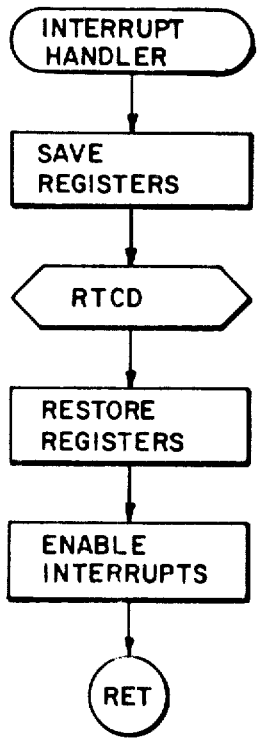
Figure 25:
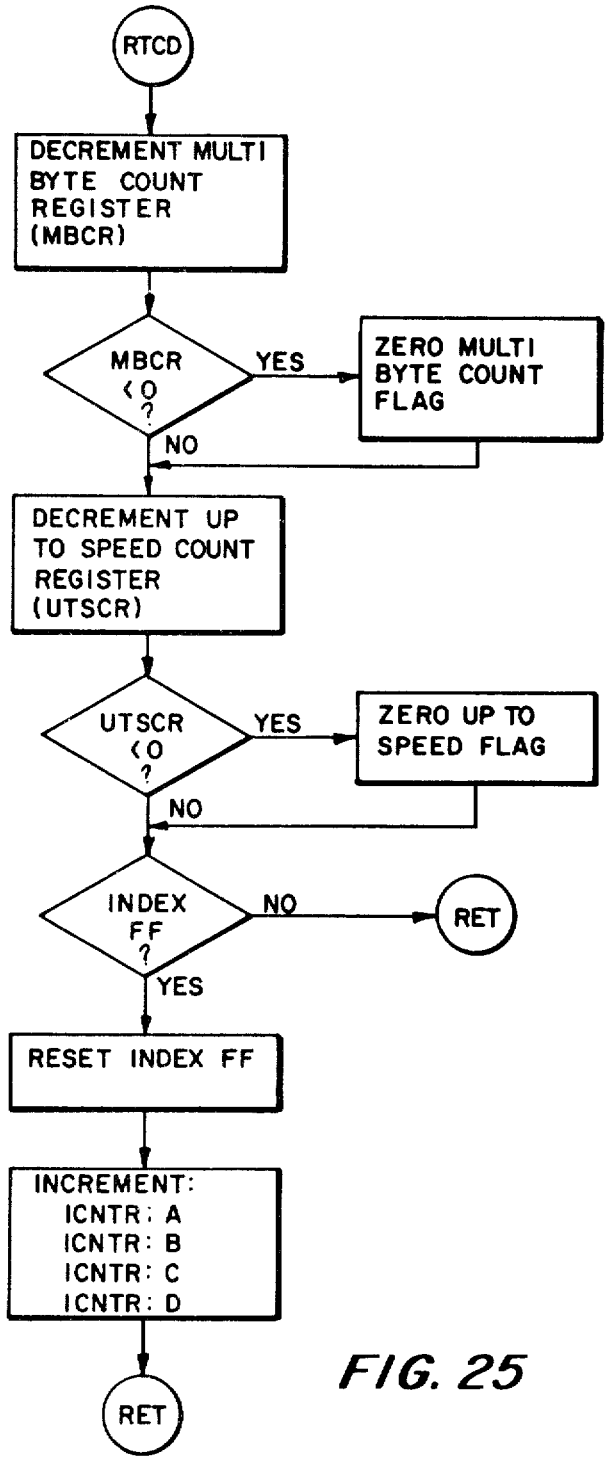
Figure 26A:
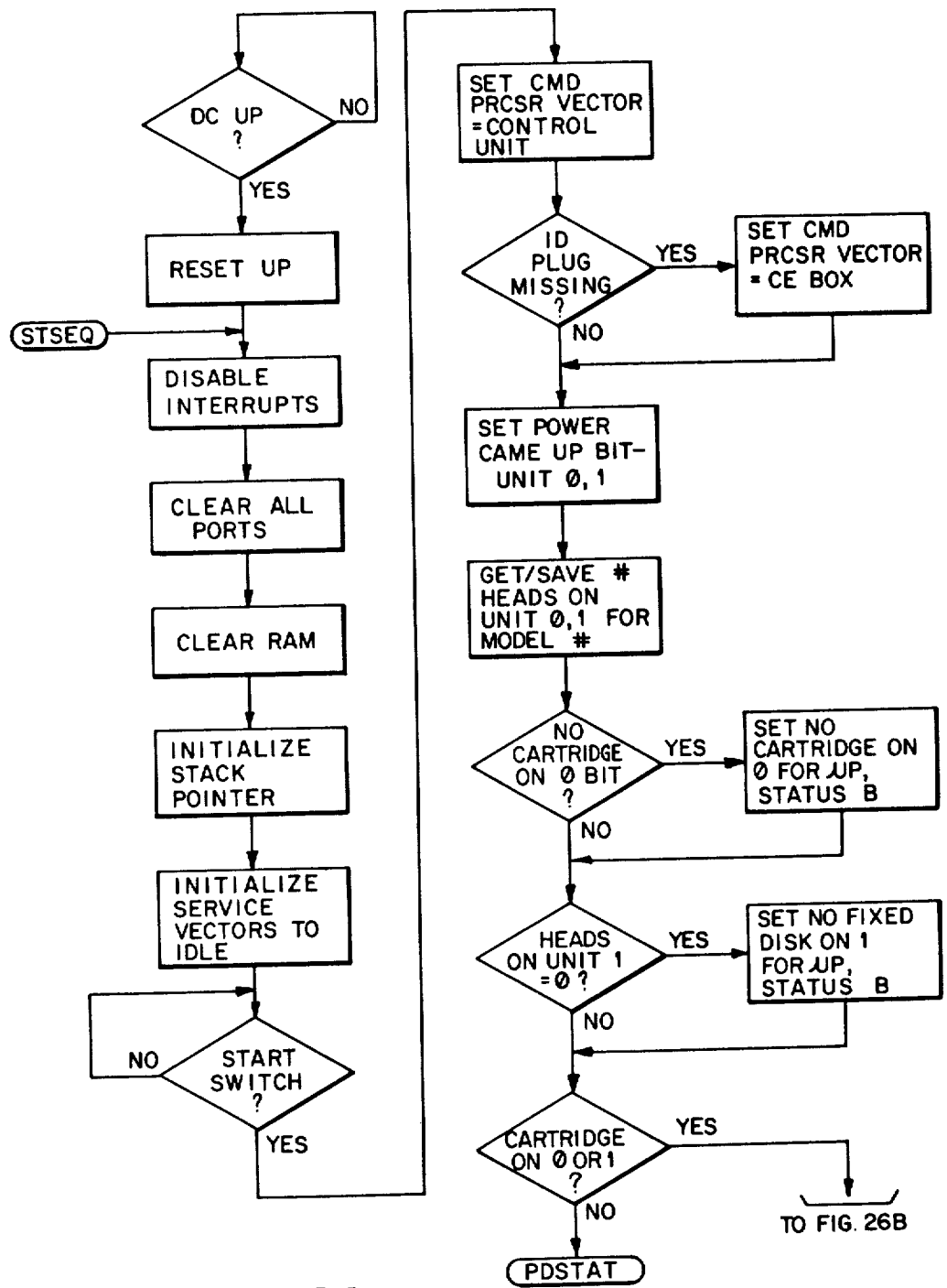
Figure 26B:
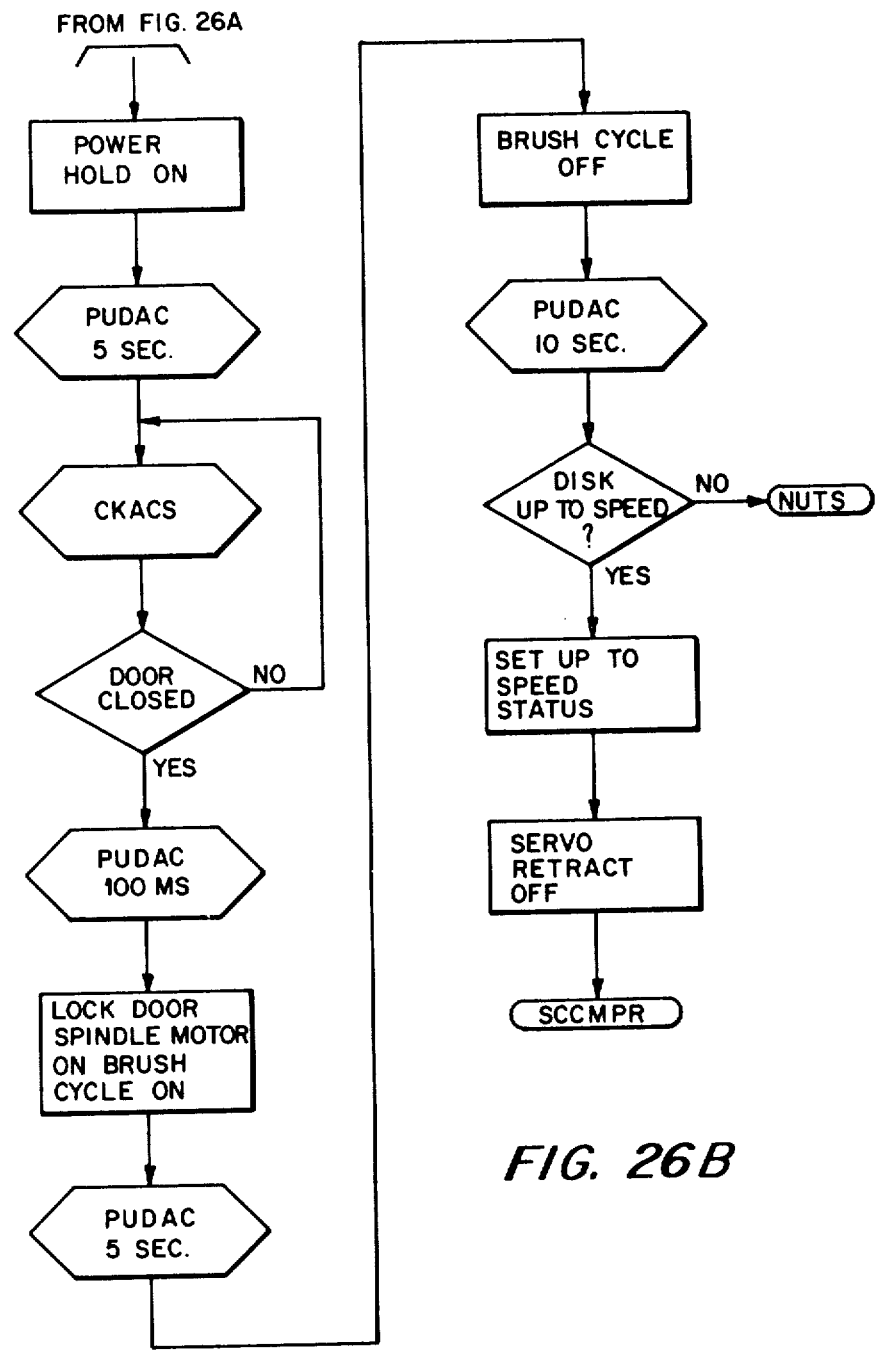

Referring to FIGS 24 and 25, the interrupt handler routine will be first described. It must be noted that an INTERRUPT signal is generated on line 517 every 500us by the clock 516 for application to the microprocessor 500 to interrupt the program to enter the interrupt handler routine. The first operation performed in that routine is to save the registers in the microprocessor 500. More specifically, the microprocessor 500, which desirably is comprised of an Intel 8080 microprocessor chip, includes various registers and a program counter. A "save register" operation causes the contents of each of the registers of the microprocessor 500 to be loaded thrugh the bidirectional bus driver 508 onto the transfer bus 510, data bus 362 and transfer bus 512 to predetermined memory locations in RAMS 504 (hereinafter referred to as "RAM").

After the "save registers" operation, a real-time count down (RTCD) sub-routine is executed. As shown in FIG. 25, the first operation of that sub-routine is to decrement a multi-byte count register (MBCR) defined at a memory location in RAM. The MBCR is used for various "time-outs." After this operation, the processor looks to see whether the MBCR is less than zero, it being noted that this register will count down to −1. If the MBCR is less than 0 then a 0 multi-byte count software flag is set at a RAM location. If the MBCR is not less than 0 or after the 0 multi-byte count flag is set if it was less than zero the processor causes an "up-to-speed" count register (UTSCR) defined at another RAM location to be decremented. Then, the processor looks to see whether the UTSCR is less than 0.

If yes, a 0 up-to-speed software flat is set at an appropriate RAM location. If no, or after the 0 up-to-speed flag is set if yes, then the processor looks to see whether the index FF 544 (FIG. 11) is set. If not, then the program returns to the main interrupt handler routine commencing with a restore registers operation to be described below. If the index FF 544 was set, then the processor resets and increments a number of general purpose event registers in RAM and then returns to the main interrupt handler routine.

Upon return to the interrupt handler routine, a "restore registers" operation is executed wherein the contents of the registers in the microprocessor 500 that were temporarily stored in RAM will be reloaded back into the microprocessor 500 registers. Following this operation, the microprocessor 500 is enabled again to receive future INTERRUPT signals on line 517, it being noted that the microprocessor 500 will be disabled from responding to INTERRUPT signals that occur during the execution of an interrupt handler routine.

Reference is now had to FIGS. 26-31 which depict the power-up routine. The first two operations are hardware implemented. Thus, the voltage level detector 518 (FIG. 11) determines if the correct d-c voltage levels are present. If no, it keeps looking until they are. When they are, the clock 516 applies a RESET command on line 519 to reset the microprocesor 500. The following operations are software implemented and are carried out as well during a status sequence (STSEQ) routine. In accordance with the routine, the microprocessor 500 is disabled from responding to the INTERRUPT signals on line 517. Then, all input and output ports and latches are cleared. This operation is followed by clearing the RAMS 502 and the initializing a "stack pointer" located in the microprocessor 500. The stack pointer is a register containing an address identifying a particular memory location in a push-down stack in the microprocessor 500.

In accordance with the next operation, three "Vector" registers located in RAM are preloaded with individual initialization addresses in order to address appropriate sections of the RAMS 502. As will be described in more detail below, each of these vector registers is capable of operating in accordance with a unique time-slicing method. At this point, it should be noted that each of these three vector registers can be loaded with the next required address for any one of a number of routines which can be executed when the contents of the vector register are loaded into the program counter in the microprocessor 500. In accordance with the time-slicing method, one operation of each routine that is loaded from a vector register into the program counter will be executed during each processing cycle. In this manner, all of the routines handled by each vector register will, due to the speed of the microprocessor, appear to be executed simultaneously, even though they are executed sequentially in time. Again, the unique method of time-slicing will be described in more detail below.

Following initialization of the vector registers, the processor looks to see whether the START/STOP switch 306 (FIG. 1) is set to start. This is accomplished by looking at bit (2) of the sequence status port 536 which contains the START SWITCH signal, as explained above. If the switch is not at the START position, then the processor keeps looking at bit (2) until it goes high. When this occurs, one of the three vector registers in RAM, i.e. a command processor vector register, is set to the beginning address of a "control unit" servicing routine (CUIN) so that the appropriate memory location in ROMS 502 (hereinafter referred to as "ROM") will be addressed when the contents of the command processor vector register are loaded into the program counter in the microprocessor 500. The command processor vector register can also be set with the first address of a "CE BOX" servicing routine (CEIN) when an external exerciser (FIG. 23) is connected to the drive 10 for running diagnostic programs in a manner to be described below.

After the command processor vector register is set to the starting address of the CUIN routine, the processor looks to see whether the ID plug 324 (FIG. 1) is missing. If it is, then the command processor vector register is set to the first address of the CE BOX servicing routine CEIN stored in ROM. If the ID plug was not missing, or after the latter operation if it was, then the POWER CAME UP bit in the RAM is set for eventual transmittal to the controller 318 in the STATUS D byte following a STATUS D command signal applied therefrom.

The next operation of the power up/status sequence routine is to fetch two codes stored in ROM locations each indicating the number of heads in each unit of the drive 10, and then to load such codes into corresponding RAM locations. Following that operation, the processor looks to see whether bit (∅) of the sequence status port is true, i.e. whether no cartridge 28 is loaded into the drive 10. If such is the case, then the NO CARTRIDGE bit (2) of the STATUS B byte stored in RAM is set. If such is not the case, i.e. a cartridge 28 is loaded in the drive 10, or after the latter operation if none was, then the processor looks to see whether the number of heads on unit 1 is zero, i.e. the disk drive 10 is of the model having no fixed disks. If such is the case, then bit (2) of the STATUS B byte is set. If such is not the case, or after the latter operation if it was, the processor next looks to see whether there is either a cartridge 28 in unit ∅ or any disk in unit 1. If not, the program will enter a power down status (PDSTAT) routine to be described below.

If the answer to the last question was yes, then the next operation is to hold the power on even though the START/STOP switch may have been turned to stop. This is followed by a PUDAC sub-routine to be described below. After that routine has been executed, a CKACS sub-routine, also to be described below, will be executed. Following this, the processor looks to see whether the front door 24 (FIG. 1) is closed. This is accomplished by sampling the state of bit (3) of the sequence status port 536 which contains the DOOR SWITCH signal, as explained above. If the door is not closed, then the CKACS sub-routine will be re-executed. If the door is closed, then the PUDAC sub-routine will be again executed.

The next operation is to set the DOOR SOLENOID LOCKED SPINDLE DRIVE CONTROL and BRUSH CYCLE START bits of the sequence control byte in RAM for eventual application through the sequence control port 538 (FIG. 11) to the respective portions of the drive. This operation is followed by a re-execution of the PUDAC sub-routine, which is itself followed by resetting the BRUSH CYCLE START bit. After this operation, the PUDAC sub-routine is again executed and thereafter the processor looks to see whether the disks 16a-16d are up to proper speed. If not, a not-up-to-speed (NUTS) routine is executed. If yes, then bit (1) of the STATUS B byte in RAM is set. This is followed by switching from the head retracted mode to the servo controlled mode, which is accomplished by setting bit (2), i.e. SERVO RELAY CONTROL, of the sequence control byte in RAM for application through the port 538 to the head retract mechanism (not shown) of the drive 10. After this operation, the program enters a SCCMPR routine to be described below.

Figure 27A:
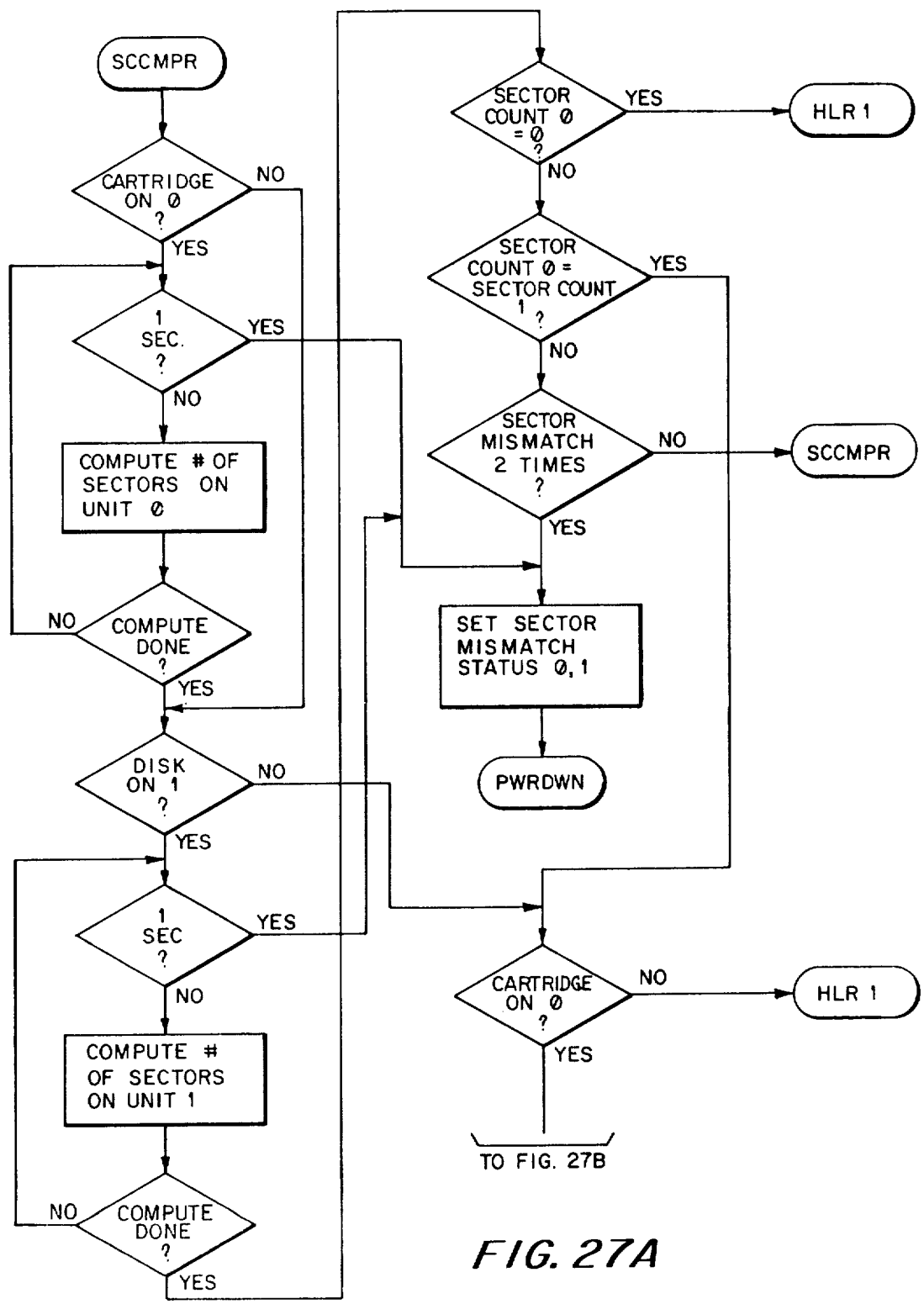
Figure 27B:
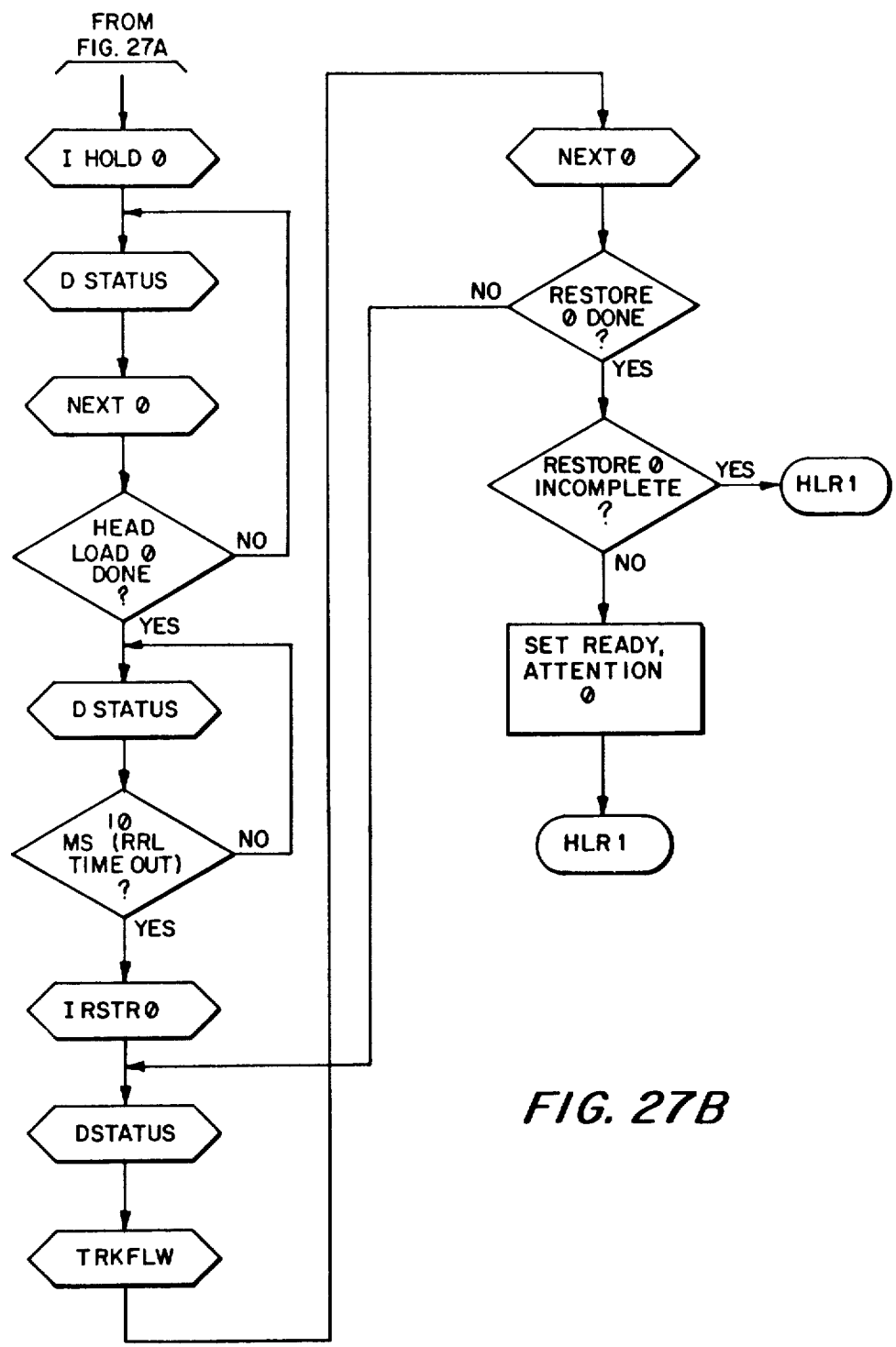

Referring now to FIG. 27, the SCCMPR routine will be described. In accordance with this routine, the processor first looks to see if a cartridge 28 is loaded in the drive 10 by looking at bit (∅) of the sequence status port, i.e. CARTRIDGE OUT. If a cartridge 28 is loaded in the drive 10, then the processor determines whether a one second time interval has occurred. If no, the processor computes the number of sectors on the disk 16a of unit ∅, which is derived from the sector ∅ counter port. The processor then determines whether such computation has been done that cycle. If not, the program returns to the one-second interrogation for repeating the sequence. If yes, or if it was determined that no cartridge 28 was loaded into the drive 10, then the processor looks to see whether there is at least one fixed disk in unit 1.

If the drive is of a model that has at least one fixed disk 16, then the processor determines whether a one second time period has occurred. If not, it computes the number of sectors on each disk 16 of unit 1 by sampling the sector 1 counter port. The processor next determines whether such computation has been accomplished during that cycle. If not, the program returns to the latter mentioned 1-second time period inquiry and repeats the sequence that followed.

When the sector computation for unit 1 is completed, the processor looks to see whether the sector count for unit ∅, as stored in a register in RAM, is equal to zero. If yes, then the processor executes a HLR 1 routine to be described below. If no, the processor looks to see whether the sector count for unit ∅ equals the sector count for unit 1, stored in another RAM location. Such inquiry is effected by the microprocessor 500 fetching and comparing the sector counts for units ∅ and 1 from RAM. If the sector counts for units ∅ and 1 are not equal, a mismatch has occurred. The processor determines then whether such mismatch has occurred twice. If not, the SCCMPR routine is begun again. If it has occurred twice, or either a 1-second time period inquiry resulted in a positive determination, then the processor sets bit (5) in the STATUS B byte register in RAM, i.e. ILLEGALLY SECTORED CARTRIDGE, and begins executing a power-down (PWRDWN) routine to be described below.

Now then, if the inquiry as to whether a disk in unit 1 was negative, or if the inquiry as to whether the sector count for unit ∅ is equal to the sector count for unit 1 was positive, then the processor again looks to see whether there is a cartridge 28 loaded into the drive. If not, the program branches to the HLR1 routine to be described below. If yes, the program then executes in sequence a IHLD∅ sub-routine, a DSTATUS sub-routine and a NEXT∅ sub-routine, all to be described in detail below. At this point, however, it should be noted that the second vector register in RAM contains addresses for the NEXT∅ sub-routine. That routine is comprised of a plurality of different routines that are carried out in successive cycles in accordance with the time-slicing method alluded to above and to be described in more detail below.

Following the NEXT∅ sub-routine, the processor determines whether a head load operation for unit ∅ has been completed. If no, the processor returns to the DSTATUS sub-routine above-described and re-executes it and the NEXT∅ sub-routine. If yes, then the processor executes the DSTATUS routine and then determines whether a 10 ms time out has occurred. If no, the DSTATUS routine is returned to and the determination repeated. When the 10 ms time out has occurred, the processor executes in sequence the following sub-routines: IRSTR∅, DSTATUS, TRKFLW and NEXT∅. These routines will be described below. After the NEXT∅ routine, the processor inquires as to whether a restore operation on unit ∅ has been completed. The specific manner of restoring each unit will be described in detail below.

If the last mentioned inquiry was determined to be no, then the program returns to the DSTATUS routine last executed and re-executes it and the succeeding routines. When the restore operation has been completed, the processor next inquires as to whether a RESTORE ∅ INCOMPLETE flag was set (bit 4 of STATUS B byte in RAM). If yes, the program branches to the HLR1 routine. If not, then the processor sets the READY ∅ bit in the summary status byte in RAM for transmittal to the summary status port 442, and sets the ATTENTION ∅ flip-flop 434 (FIG. 10). Following this operation, the program executes the HLR1 routine.

Referring to FIG. 28, the HLR 1 routine alluded to above will be described. As shown, in that routine the processor first determines whether there is at least one fixed disk in the drive 10. If yes, the processor executes in sequence the IHLD1, DSTATUS, and NEXT1 sub-routines. The third vector register in RAM discussed above contains addresses for the NEXT1 sub-routine. That routine, like the NEXT∅ routine, is comprised of a plurality of different routines that are carried out in successive cycles in accordance with the time-slicing method to be described in more detail below.

Following execution of the NEXT1 routine, the processor determines whether a head load operation for unit 1 has been completed. If no, the program returns to the DSTATUS routine and re-executes it and the NEXT1 routine. When the head load operation has finally been completed, the processor executes the DSTATUS routine and then looks to see whether a 10 ms time out has occurred. If no, the DSTATUS routine is again executed and the inquiry made again. When the 10 ms time out has occurred, the processor executes in sequence the following sub-routines: IRSTR1, DSTATUS, TRKFLW and NEXT1.

Following the execution of these sub-routines, the processor determines whether the heads of unit 1 have been restored. If no, the program recycles through the DSTATUS, TRKFLW and NEXT1 routines before inquiring again. When a restore operation for unit 1 has been completed, the processor inquires as to whether a RESTORE 1 INCOMPLETE flag was set (bit-4 of the STATUS B byte in RAM). If yes, the HLR1 routine is repeated. If no, the processor sets the READY 1 bit in the summary status byte and the ATTENTION 1 flip-flop 436. Following this, the TRANSITION light 308 is extinguished. This also occurs if it was initially determined that there was not at least one fixed disk in unit 1. The processor then branches to the MAIN program routine, to be described below.

Referring to FIG. 29, the PUDAC sub-routine will be described. In accordance with this routine, the proccessor first executes a RSETUP sub-routine and then a CKACS sub-routine, both to be described below. Then, the processor determines whether a predetermined time-out has occurred. If not, the program re-executes the CKACS sub-routine and inquires again. When the time-out has occurred, the program returns to the specific routine that called for execution of the PUDAC sub-routine.

In accordance with the RSETUP sub-routine depicted in FIG. 30, the processor first inquires as to whether a "termination" (to be described below) is pending. If yes, it returns to the routine calling for the execution of RSETUP. If not, the processor sets the multi-byte count register in RAM to the value previously set in the micro-processor H & L registers. Then, the processor sets a multi-byte count flag and returns to the appropriate routine. In accordance with the CKACS routine depicted in FIG. 31, the processor looks to see whether either the START SWITCH or AC OFF signals are true. If yes, it returns to the routine initiating the routine. If either signal is false, the program enters the PWRDWN routine. It wll be recalled that these signals are applied to the processor through the sequence status port 536. FIGS. 26-31 together depict the power up routines.

The power down (PWRDWN) routine will now be described with reference to FIGS. 32 and 33. Referring first to FIG. 32, the processor first turns on the TRANSITION light 308. Then, it executes a IRTCTEX sub-routine, to be described below in connection with FIG. 33. Following the execution of that routine, the processor lowers the SPINDLE DRIVE CONTROL and SERVO RELAY CONTROL bits applied through the sequence control port 538 thereby turning off the spindle motor 58 and enabling the head retract mechanism to retract the heads. Following this operation, the processor inquires as to whether a 1 second time out has occurred. If no, it waits until it has and then raises the SPINDLE BRAKE bit that is passed through the port 538 to stop the spindle 30. The processor then waits 25 seconds and turns off the TRANSITION light 308 and lowers the SPINDLE BRAKE signal thereby disengaging the spindle brake. This portion of the routine also marks the beginning of the PDSTAT routine, referred to above.

The next operation is for the processor to execute a CMDPRCS sub-routine to be described below. This is followed by an inquiry as to whether the START switch is at the START position (true START SWITCH signal to port 536). If such is the case, the program re-executes this instruction. When the switch is set to STOP, then the processor clears the sequence control port 538 and goes to a STSEQ routine.

In accordance with the IRTCTEX sub-routine shown in FIG. 33, the processor executes in sequence a RTCT ∅ sub-routine and then a RTCT 1 sub-routine. Following this, the processor determines whether a retract time-out has occurred. If no, it waits until it has and then executes in sequence XTRTM∅ and XTRTM1 sub-routines, which will be described below. The program then returns to the routine that requested the IRTCTEX sub-routine.

The MAIN program routine will now be described with reference to FIG. 34. As shown, it includes cycling through the following sub-routines in sequence: DSTATUS, CMDPRCS, TRKFLW, NEXT∅, TRKFLW, and NEXT1.

Figure 35:
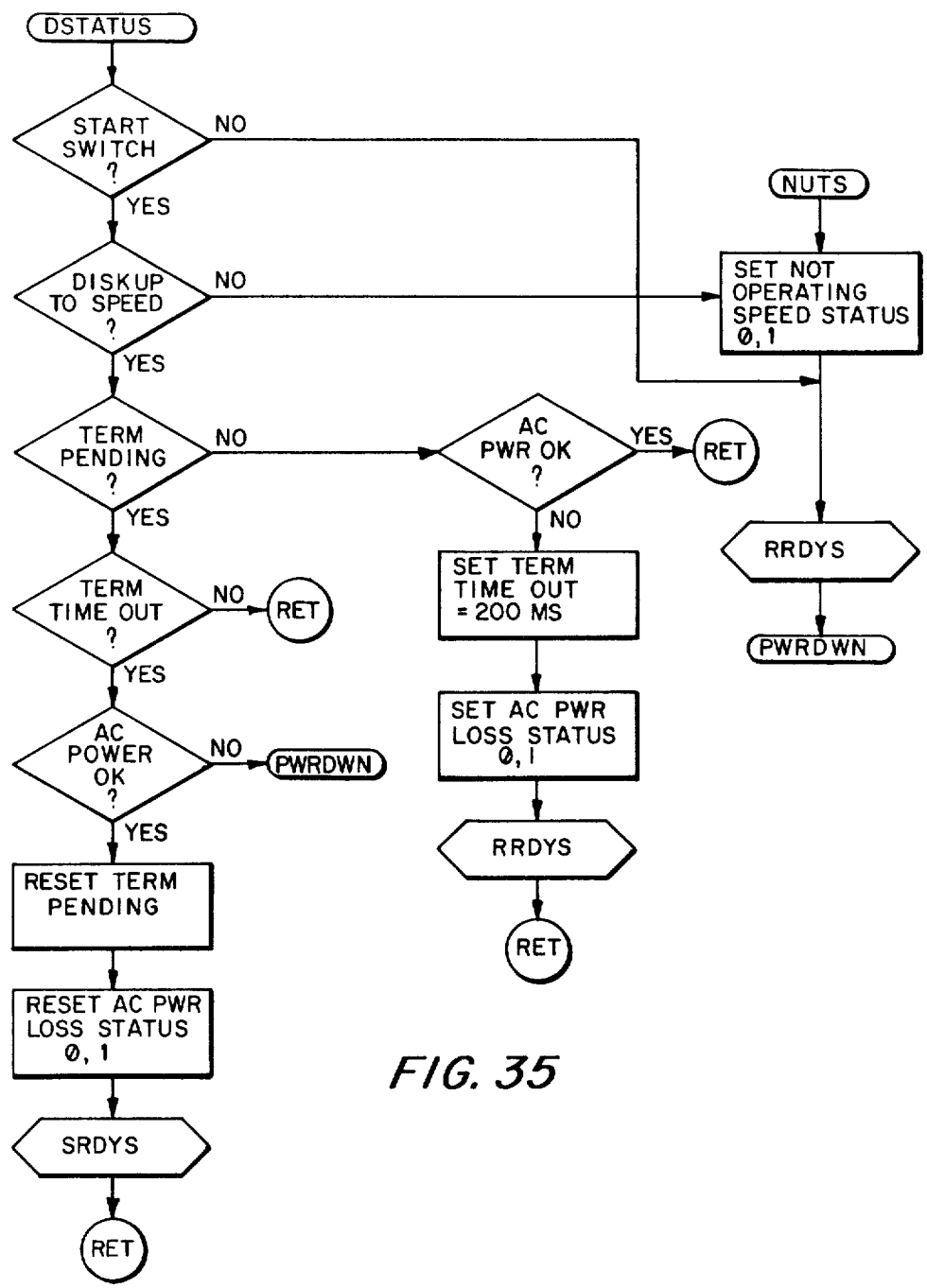
Figure 36:
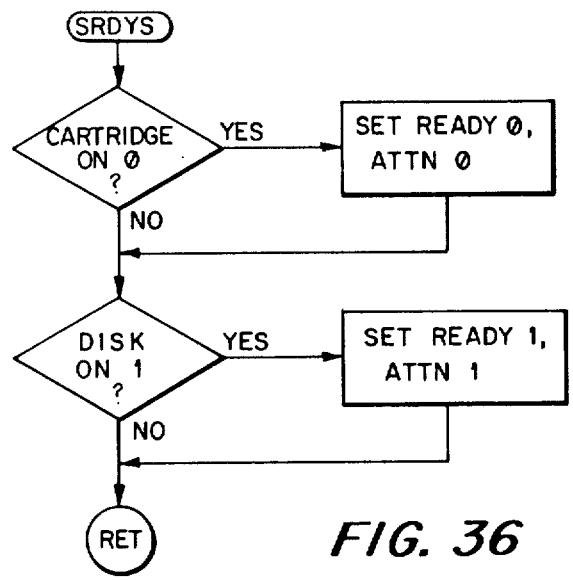
Figure 37:
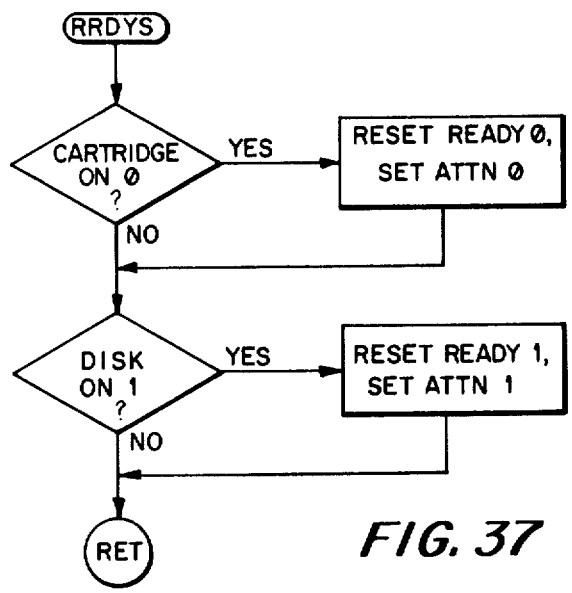

Reference is now had to FIGS. 35-37 where the check drive status (DSTATUS) routine will be described. Referring first to FIG. 35, the processor first looks to see whether the START switch is set to START. If no, it executes a RRDYS routine and then branches to the PWRDWN routine described above. If yes, then the processor looks to see whether the disks are up to proper operating speed in the manner described above. If no, the processor sets the NOT OPERATING SPEED bit in the STATUS B byte in RAM, then executes the RRDYS sub-routine, and then branches to PWRDWN. This same sequence is also executed during the NUTS sub-routine. If the disks are up to proper operating speed, then the processor looks to see whether TERMINATION is pending, i.e. whether there has been an a-c power loss for a predetermined amount of time.

If TERMINATION is not pending, then the processor looks to see whether the AC OFF signal is low. If it is, then the processor returns to the routine initiating the DSTATUS routine. If the AC OFF signal is high, meaning a-c power is not alright, then the processor sets a 200 ms TERMINATION time out and then SETS THE POWER GOING DOWN bit in the STATUS B byte in RAM which will subsequently be forwarded to the controller 318 upon command therefrom. After this operation, the processor executes the RRDYS sub-routine and then returns to the routine initiating the DSTATUS routine.

Now then, if TERMINATION was pending when that inquiry was made, then the processor looks to see whether the 200 ms time out has occurred. If not, the program returns to the initiating routine. If yes, the processor checks to see whether a-c power is all right. If not, it branches to the PWRDWN routine. If a-c power is all right, then the processor resets a TERMINATION PENDING flag in RAM and then resets the POWER GOING DOWN status B bit in RAM. This is followed by the processor executing a SRDYS sub-routine and then returning to the initiating routine.

Referring now to FIG. 36, the SRDYS sub-routine will be described. In accordance with that routine, the processor first looks to see whether there is a cartridge 28 in unit ∅. If there is, it causes the ready ∅ bit in the summary status byte to be set, and sets the ATTENTION ∅ flip-flop 434. If there is not, or after READY ∅ and ATTENTION ∅ are set, the processor then determines whether there is at least one fixed disk in unit 1, i.e. does this model of the drive 10 have at least one fixed disk 16. If there is at least one disk 16 in unit 1, the READY 1 bit and the ATTENTION 1 flip-flop are set. If there is not, or after READY 1 and ATTENTION 1 are set, the program returns to the routine that initiated the SRDYS routine. The RRDYS sub-routine is identical to SRDYS, as shown in FIG. 37, with the exception that it resets the READY bits.

Figure 38:
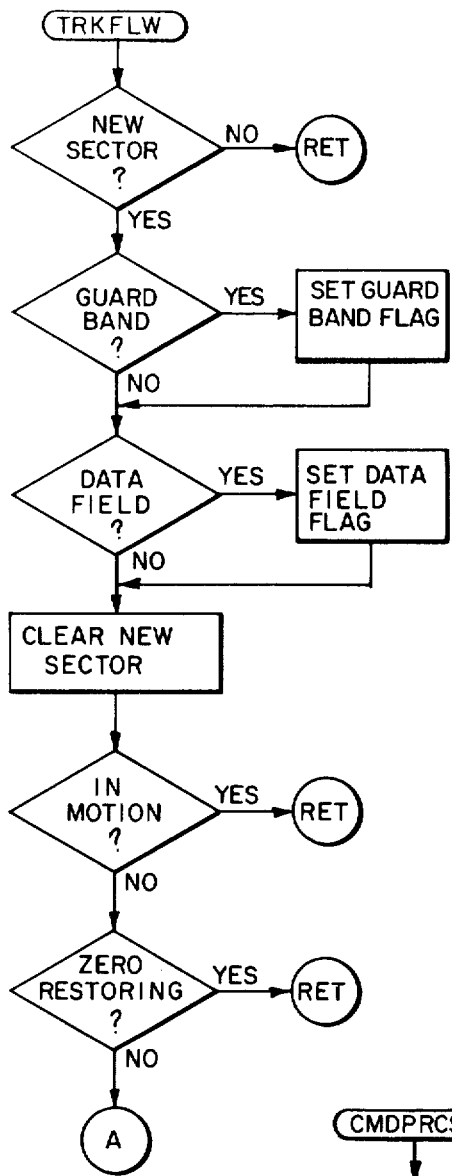
Figure 39:
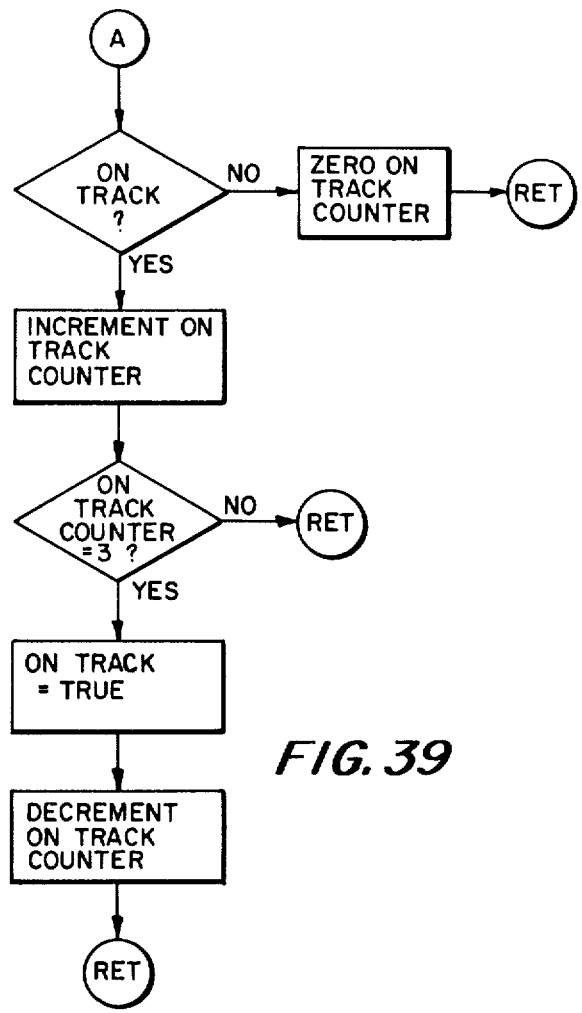

The track following routine (TRKFLW) will now be described with reference to FIGS. 38 and 39. Referring first to FIG. 38, the processor first looks to see whether the NEW SECTOR signal is high. As will be recalled, that signal is applied to the processor from the tracking input port 722 (FIG. 17). If that signal is low, then the program returns to the routine that initiated TRKFLW. If that signal was high, then the processor looks to see if the GUARD BAND signal inputted to the processor from the tracking status input port 700 is high. This signal will be high so long as the code "9E" continues to be read by the reading head in each sector of a track beng read. The code 9E is stored in the guard band tracks −2 through −6, as mentioned above.

If the GUARD BAND signal was high, then the processor sets a GUARD BAND flag in RAM. If the GUARD BAND signal was low, or after the flag is set if it was high, then the processor looks to see if the DATA FIELD signal applied to the processor through the tracking status input port 700 is high. If so, the processor sets a DATA FIELD flag in RAM. If not, or after the flag is set if the signal was high, then the processor clears the NEW SECTOR flip-flop (not shown) that generated the NEW SECTOR signal.

Thereafter, the processor looks to see if the head carriage assembly that is reading is in motion. If so, the program returns to the routine initiating TRKFLW. If no, the processor looks to see if the head carriage assembly is being restored to track ∅. If yes, the program returns to the routine initiating TRKFLW. If no, and referring now to FIG. 39, then the processor inquires as to whether the heads doing the reading are on track, i.e. is either the XDCR ∅ TRACKING signal or the XDCR 1 TRACKING signal high. It will be recalled that these signals are applied to the processor throgh the tracking status input port 700.

If the XDCR TRACKING signal is low, then the processor sets a software "on-track" counter in RAM to zero. If the signal is high, then the on-track counter is incremented and the processor next looks to see whether the on-track counter has been incremented to three. If not, the program returns to the routine initiating the TRKFLW routine. When the on-track counter does register a count of three, the processor sets an ON TRACK flag in RAM there is applied to an input of the respective mode port 346 or mode port 348, as the case may be (see FIG. 10). After the ON TRACK flag is set, then the on-track counter is decremented and the program returns to the routine that initiated TRKFLW.

Figure 40:
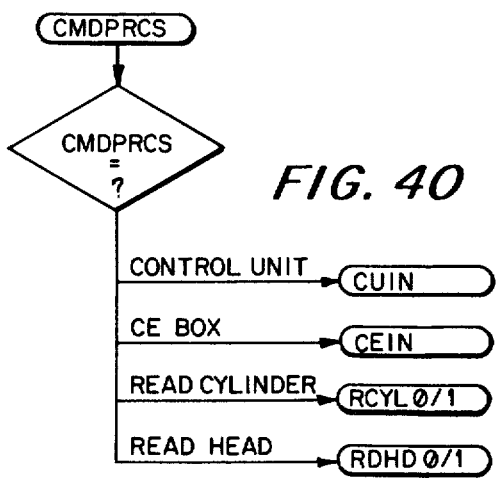

Referring now to FIG. 40, the CMDPRCS routine will be described. It will be recalled that one of the so-called "vector" registers in RAM is the command processor vector register. It can be loaded with four distinct initial addresses corresponding to distinct memory locations in ROM identifying the start of four distinct routines. These routines are control unit (CUIN), CE BOX (CEIN), read cylinder (RCYL∅/1), and read head (RDHD∅/1). When this vector register is loaded with the initial address of one of these four routines and it is desired to execute that routine, the contents of the vector register will be transferred from RAM to the program counter via internal registers in the microprocessor 500. Thus, it is possible to execute any one of four routines during the execution time slot of a single routine. This is a feature of the unique time-slicing method alluded to above. Hereafter, the designation 0/1 for a routine shall indicate that the routine is identical for both unit 0 and unit 1 operations.

Figures 41, 42:
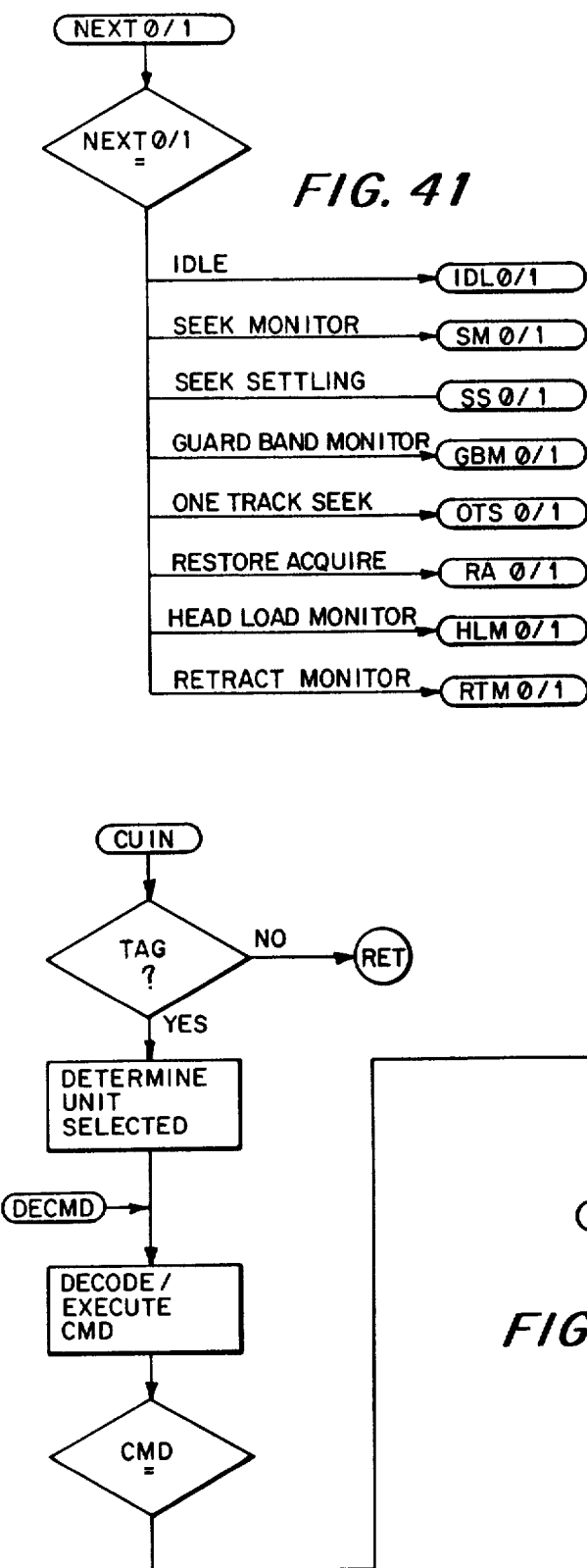

FIG. 41 depicts the NEXT0/1 routine, i.e. the routines for NEXT0 and NEXT1, which are identical. It will be recalled that the other two vector registers in RAM used for time-slicing are the NEXT0 and NEXT1 rector registers. Each one of these registers may contain any one of a number of initial addresses, each pointng to the starting instruction in ROM for a respective plurality of distinct servicing routines. These routines are executed in sequence, one during each processing cycle, and include: idle (IDL0/1), seek monitor (SM0/1), seek settling (SS0/1), guard band monitor (GBM0/1), one track seek (OTS0/1) restore acquire (RA0/1), head load monitor (HLM0/1), and retract monitor (RMT0/1). As each of these routines is completed, the last instruction causes the corresponding NEXT0 or NEXT1 address to change to an address pointing to the first instruction for the successive routine in the sequence to be performed, as shown in FIG. 41. This new servicing routine of the main NEXT0/1 routine will then be executed during the next processing cycle.

Referring to FIG. 42, the CUIN routine of the main CMDPRCS routine, as handled by the command processor vector register in RAM, will be described. The processor first looks to see whether a command has been received by the drive 10 from the controller 318, i.e. whether the INPUT FULL signal applied through the I/O tag port 350 is high. If no, then the processor returns to the routine initiating the CMDPRCS routine. If yes, then the processor determines the unit selected by seeing whether the COMMAND UNIT 1 signal is high (unit 1 selected) or low (unit 0 selcted). When this is done, which also marks the start of the DECMD routine, the processor decodes and executes the command which may be any one of the first nine of nineteen commands shown in FIG. 42. If the received command represents neither of these, then the processor executes an illegal command (ILCMD0/1) routine. Each of the 19 listed command routines wll be described below.

Figure 43:
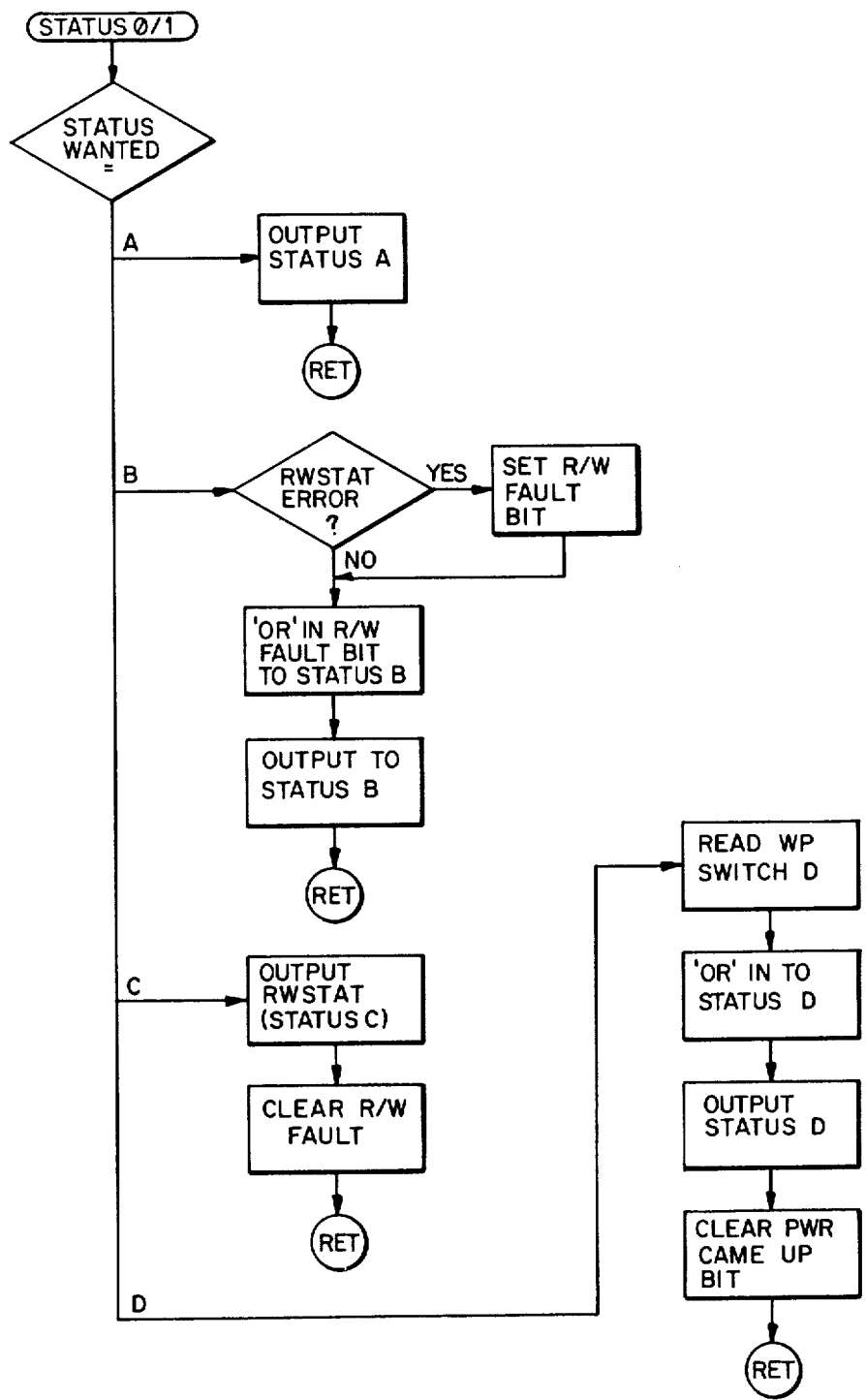

Reference is now had to FIG. 43 where the STATUS 0/1 routine depicted in FIG. 42 will be described. In accordance with that routine, the processor looks at the received command to see which status is required. If it is STATUS A, then the processor applies the STATUS A byte from RAM through the output port 352 to the controller 318. The program then returns to the routine initiating CMDPRCS. If it is STATUS B, then the processor first looks to see if there was a read/write status error. If yes, the processor sets the READ/WRITE FAULT flag in RAM. If no, or after the latter operation if yes, then the READ/WRITE FAULT bit (3) as determined above is set in the STATUS B byte, which is then applied to the controller 318 through the output port 352.

If the received command is a request for STATUS C, then the STATUS C byte is applied to the controller 318 through the output port 352. This is followed by resetting the READ/WRITE fault flag and then returning to the routine that initiated CMDPRCS. If the command received is a STATUS D request, then the processor reads the respective WRITE PROTECT SWICH 0 or 1 signal applied through the I/O tag port 350 and then loads it into the STATUS D bit (5). This is followed by applying the STATUS D byte through the output port 352 to the controller 318 and then resetting the POWER CAME UP bit of that byte in RAM. The program then returns to the routine initiating CMDPRCS.

Figure 44:
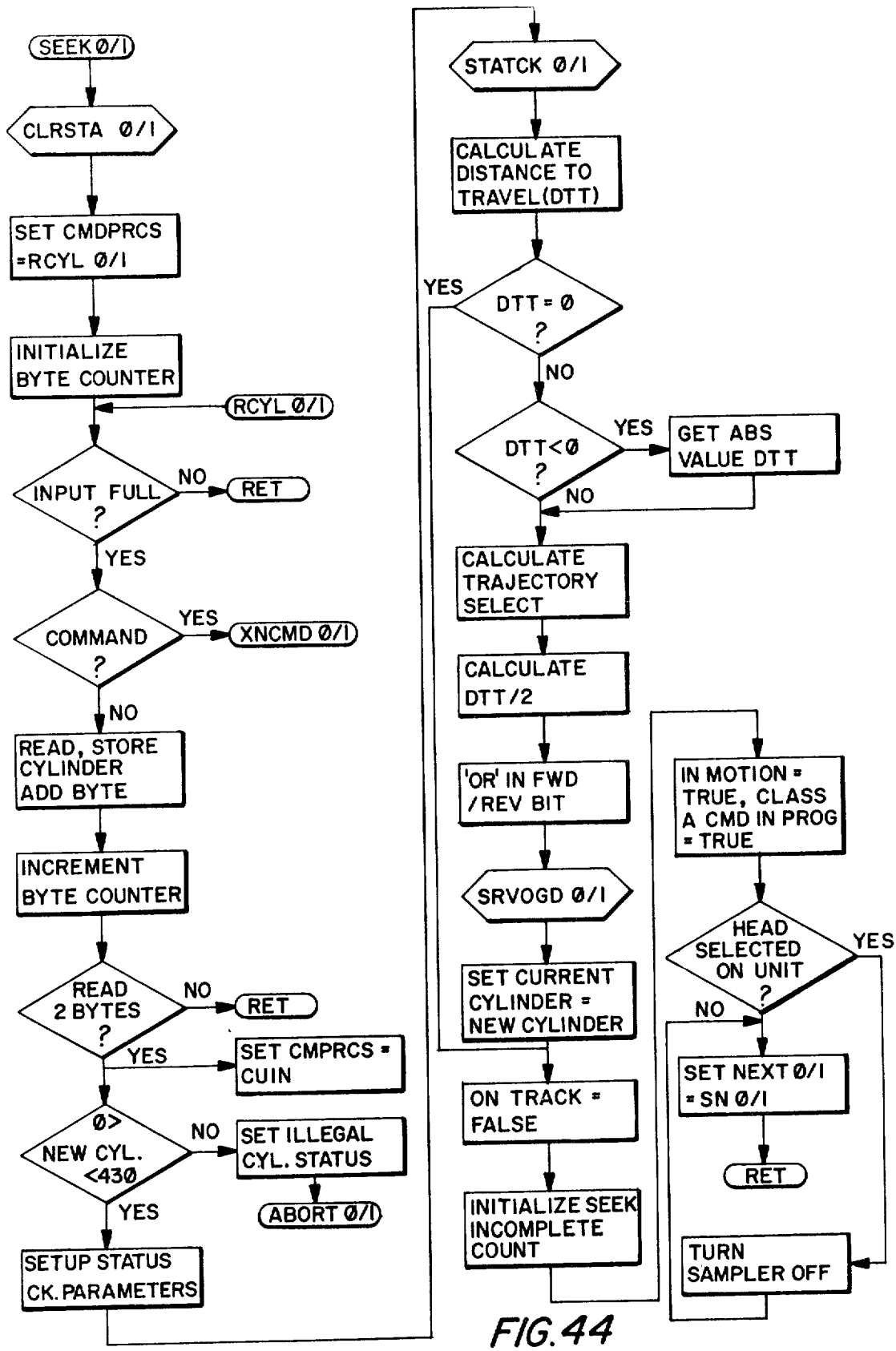

The SEEK0/1 routine depicted in FIG. 42 will now be described with reference to FIG. 44. As shown, the processor first executes a CLRSTA0/1 routine and then sets the command processor vector register in RAM to the starting address of the RCYI0/1 routine. This is followed by initializing the byte counter in RAM. Then, the processor looks to see if another command byte has been received by seeing if the INPUT FULL signal applied through the I/O tag port 350 is high. This point in the routine also marks the first instruction for the RCYL0/1 routine. If the INPUT FULL signal was low, then the program returns to the routine initiating CMDPRCS. If that signal is high, then the processor inquires as to whether the new data loaded in the input port is a command. This is done by looking at the COMMAND signal applied to the processor through the I/O tag port 350.

If the COMMAND signal is high, then the program branches to a XNCMD0/1 routine. If it is low, meaning the new input is a cylinder byte, then the processor reads and stores the CYLINDER ADDRESS LS byte in RAM. The processor then increments the software byte counter in RAM and then determines whether it has read two cylinder address bytes. If not, the program returns to the routine initiating CMDPRCS. The next time around, the processor will read and store the CYLINDER ADDRESS MS byte and increment the byte counter again. This time, it will recognize that it has read the requisite two bytes of the cylinder address.

When the latter occurs, the processor will look to see whether the cylinder address just read is for a track location greater than or equal to track 0 and less than track 430. If the cylinder address is for a track other than 0–429, then the processor sets the ILLEGAL CYLINDER ADDRESS bit in the STATUS A byte in RAM and then branches to a ABORT0/1 routine. If the cylinder address was for a track between tracks 0 and 430, exclusive, the processor sets up various status check parameters and then executes a STATCK0/1 sub-routine.

After this operation, the processor calculates the distance-to-travel (DTT) between the actual track location and the commanded track location. These two locations are stored in separate registers in RAM and are called out by the processor and compared. The resultant comparison is the DTT value. The processor then looks to see if it is equal to zero. If not, then it looks to see if it is less than zero (reverse direction seek required). If DTT is less than zero, the processor determines the absolute value of DTT, i.e., /DTT/. If DTT is not less than zero, or after /DTT/ is determined if DTT was less than zero, the processor calculates the velocity trajectory profile optimum for DTT or /DTT/. This code is ultimately loaded into the trajectory index register 622 (FIG. 13) for the purposes described above.

The processor then executes a SRVOGO0/1 subroutine and then sets current cylinder address registers in RAM equal to the value of the new cylinder address. Thereafter, or immediately after the processor initially determined DTT equals 0, an ON TRACK flag is reset. This is followed by initializing a seek incomplete count register in RAM and then setting IN MOTION and CLASS A COMMAND IN PROGRESS flags in RAM. After this, the processor looks to see whether the head selected is on the selected unit. If yes, the SAMPLER ON signal is lowered. If no, or after the latter operation if yes, the NEXT∅ or NEXT1 vector register, as the case may be, is set to the first address for the SM∅/1 routine in ROM and the program then returns to the routine initiating CMDPRCS.

Figure 45:
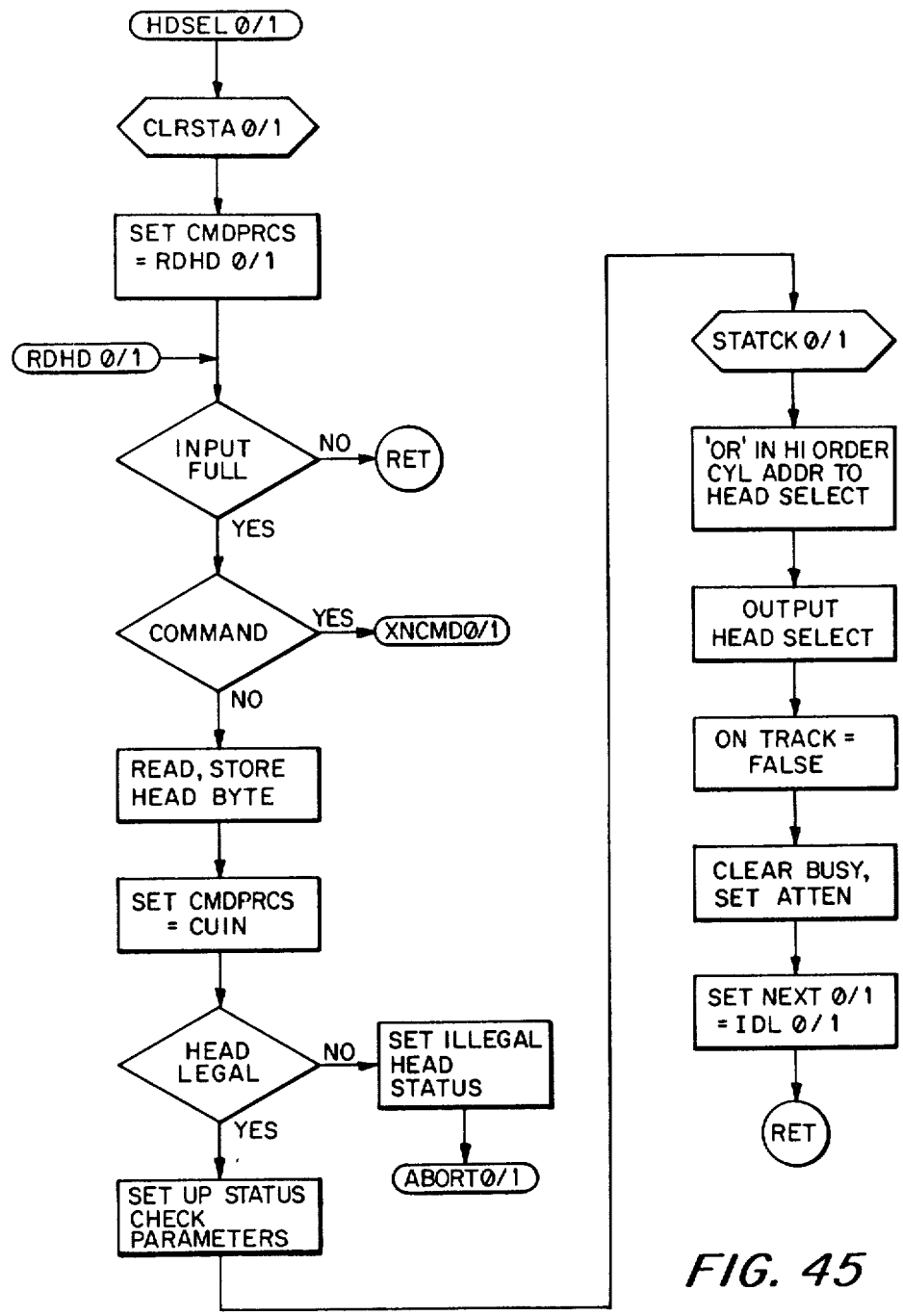

Reference is now had to FIG. 45 where the head select command routine (HDSEL∅/1) depicted in FIG. 42 will be described. As shown, the processor first executes the CLRSTA∅/1 sub-routine and then sets the command processor vector register in RAM to the first address for the RDHD∅/1 routine in ROM. The latter routine is then executed by loading the contents of that vector register into the program counter in the microprocessor 500. In accordance with the RDHD∅/1 routine, the processor first looks to see whether the input port 344 is full, i.e. whether the INPUT FULL signal applied to the processor through the I/O tag port 350 is high. If no, the program returns to the routine initiating CMDPRCS. If yes, the processor looks to see if a new command has been received. If yes, the program branches to the XNCMD∅/1 routine. If no, the processor reads and stores in RAM the HEAD ADDRESS byte.

This operation is followed by setting the command processor vector register in RAM back to the first address for the CUIN routine (FIG. 42). The next operation is to look to see whether the HEAD ADDRESS defines an existant head, i.e. it is legal. If no, then the processor sets the ILLEGAL HEAD ADDRESS bit in the STATUS A byte in RAM and then executes the ABORT∅/1 routine. If the HEAD ADDRESS byte was legal, then the processor sets up various status check parameters and then executes the STATCK∅/1 routine.

The next operation is to load the CYLINDER ADDRESS MS byte into the head selector port 832 for output therefrom. The processor then resets the UNIT ON TRACK bit on the respective mode port byte in RAM that will be applied to the controller 318 through the respective mode port. After the UNIT ON TRACK bit is set, then the processor clears the respective BUSY latch and then sets the respective ATTENTION flip-flop. Following this, the processor resets the next address in the NEXT∅ or NEXT1 vector register, as the case may be, to the IDL∅/1 routine and then returns to the routine that initiated CMDPRCS.

Figure 46:
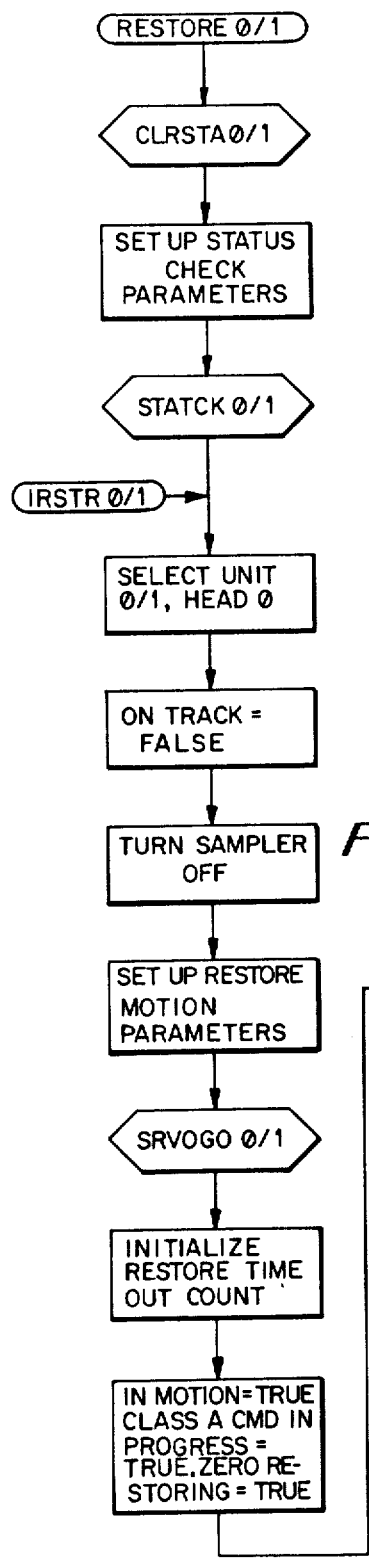

Reference is now had to FIG. 46 where the restore command routine (RSTORE∅/1) depicted in FIG. 42 will be described. In accordance with that routine, the processor first executes the CLRSTA∅/1 sub-routine and then sets up various status check parameters. This is followed by executing the STATCK∅/1 sub-routine. Following this, which also marks the initiation of a IRSTR∅/1 routine, the processor sets various unit and head selection flags, and then resets the UNIT ON TRACK bit and then the SAMPLER ON bit. This is followed by setting up various restore motion parameters and then executing the SRVOGO∅/1 sub-routine.

Following that operation, the processor initializes a restore time-out count register in RAM and then sets the following flags in RAM: IN MOTION, CLASS A COMMAND IN PROGRESS, and ZERO RESTORING. Then, the processor sets a READ/WRITE CHANNEL BUSY flag and then changes the address in the respective NEXT∅ or NEXT1 vector register in RAM to the first address of the GBM∅/1 routine. The program then returns to the routine that initiated CMDPRCS.

Figure 47:
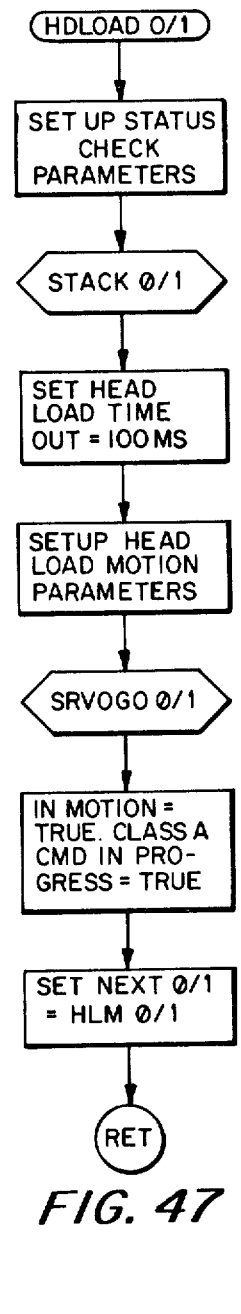

Referring now to FIG. 47, the head load command routine (HDLOAD∅/1) depicted in FIG. 42 will be described. As shown, the processor first sets up various status check parameters and then executes the STATCK∅/1 sub-routine. After that is done, the processor sets a HEAD LOAD time-out register to a value equivalent to 750 ms. This is followed by setting up various head load motion parameters and then executing the SRVOGO ∅/1 routine. Following this, the IN MOTION and CLASS A COMMAND IN PROGRESS flags are set. Then, the processor sets the NEXT0 or NEXT1 vector register, as the case may be, to the first address for the HLM ∅/1 routine in ROM, and then returns to the routine initiating CMDPRCS.

Referring now to FIG. 48, the write protect command routine (WRITTEP∅/1) depicted in FIG. 42 will be described. As shown, the processor first executes the CLRSTA∅/1 routine and then looks to see whether the CLASS A COMMAND IN PROGRESS flag is set. If yes, then the program branches to the ILCMD∅/1 routine. If no, then the processor looks to see whether the WRITE PROTECT MODE bit in the STATUS D byte is set or reset. If it is set, then the processor sets the UNIT WRITE PROTECTED bit in the respective mode byte and returns to the routine initiating CMDPRCS. If the WRITE PROTECT MODE bit was reset, then the processor looks to see if the respective WRITE PROTECT SWITCH has been set. If yes, the program branches to the ILCMD∅/1 routine. If no, then the processor resets the UNIT WRITE PROTECTED bit in the respective mode byte and then returns to the routine that initiated CMDPRCS.

Referring now to FIG. 49, the offset command routine (OFFSET∅) routine depicted in FIG. 42 will be described. As shown, the processor first executes the CLRSTA∅/1 routine, then sets up various status check parameters, and then executes the STACK∅ routine. This is followed by setting the UNIT WRITE PROTECTED mode bit. The processor next looks at the absolute value of the offset commanded and then determines whether it is a positive or negative offset. If negative, it sets the offset value negative. If positive, or after the latter operation, it stores the signed offset value in RAM and then returns to the routine initiating CMDPRCS.

The head retract command routine (RETRCT∅/1) depicted in FIG. 42 will be described with reference to FIG. 50. As shown, the processor first executes a RTCT∅/1 sub-routine, then sets a RETRACT time-out register in RAM to a value equivalent to 800 ms, then sets the NEXT∅ or NEXT1 vector register, as the case may be, to the first address of the RTM∅/1 routine, and then returns to the routine initiating CMDPRCS.

The RTCI∅/1 sub-routine just alluded to above is shown in FIG. 51 wherein the processor sets up various retract motion parameters, then executes the SRVOGO∅/1 routine and then returns to the routine initiating CMDPRCS.

Figures 52, 53:
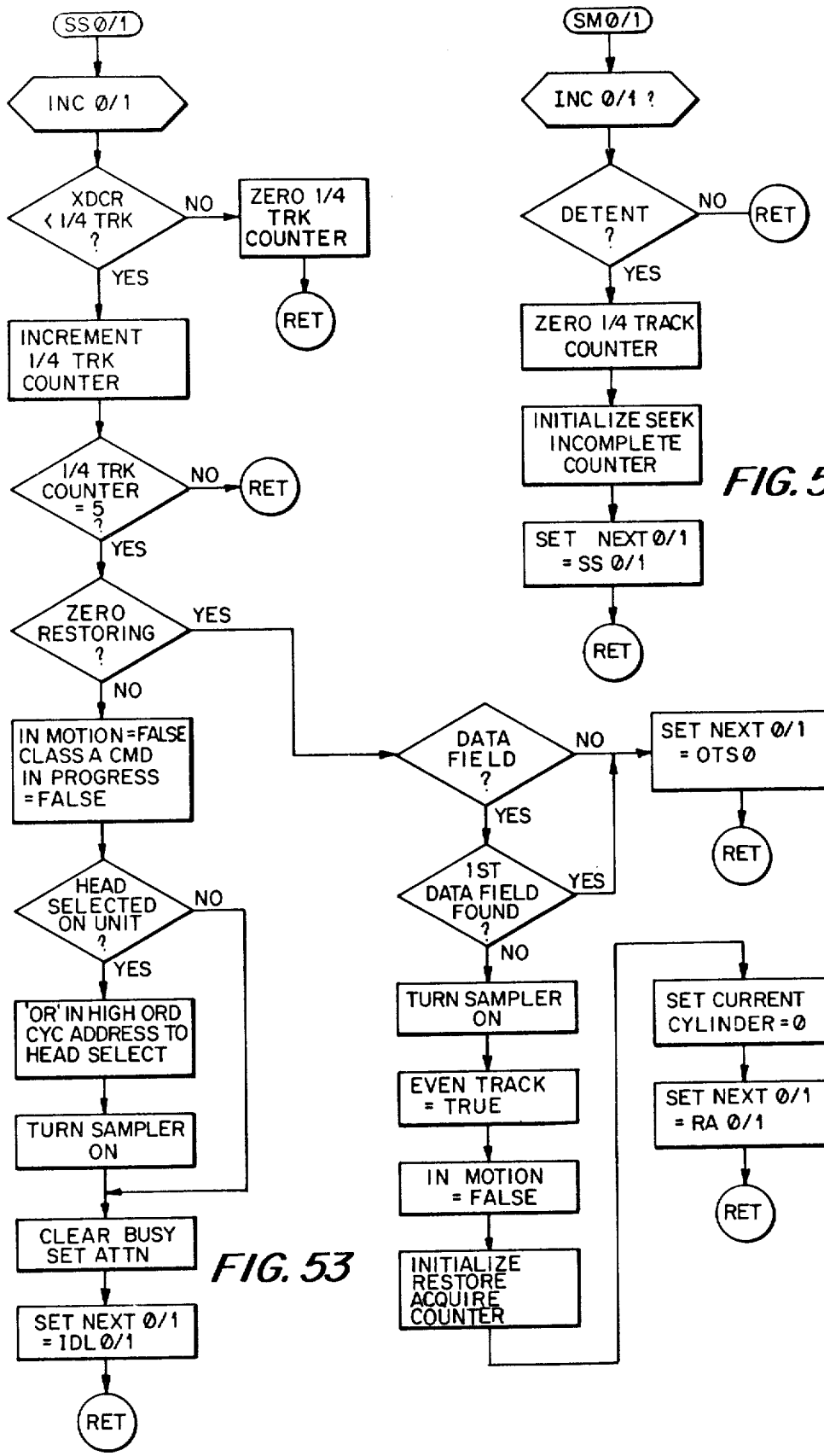

The seek monitor service routine (SM∅/1) depicted in FIG. 41 as being one of the program routines serviceable in sequence each time the NEXT∅ or NEXT1 main routine is to be executed i.e. the unique time-slicing method of the invention, will be described with reference to FIG. 52. As shown, the processor first executes the INC∅/1? routine and then looks to see whether the corresponding DETENT signal is high, such signal being applied to the processor through the tracking input port 722 (FIG. 17). If DETENT is low, then the program returns to the routine initiating NEXT∅ or NEXT1, as the case may be. If DETENT is high, then the processor resets a ¼ track counter in RAM, then initializes a seek incomplete counter in RAM, then sets the NEXT∅ or NEXT1 vector register, as the case may be, to the first address of the seek settling routine (SS∅/1), and then returns to the routine initiating the NEXT∅ or NEXT1 routine.

The seek settling time service routine (SS∅/1) depicted in FIG. 41 will now be described with respect to FIG. 53. The processor first executes the INC∅/1? routine and then looks to see whether the respective XDCR TRACKING signal applied through the tracking status port 700 is high, i.e. the heads of the respective unit are within ¼ track of track center. If no, the ¼ track counter in RAM is reset to zero and the program returns to the routine initiating NEXT∅/1. If yes, the ¼ track is incremented and then the processor looks to see whether such counter has a value of 5. If no, the program returns to the routine initiating NEXT∅ or NEXT1. If yes, the processor looks to see whether a restore operation is in progress, i.e. whether the ZERO RESTORING flag is set.

If the unit is in a restore operation, then the processor looks to see whether the code 8E has been detected, i.e. is the DATA FIELD applied through the tracking status input port line. If not, the processor sets the NEXT∅ or NEXT1 vector register to the first address of the one track seek routine (OTS∅/1) and then returns to the routine initiating the NEXT∅ or NEXT1 routine. If the DATA FIELD signal is high, then the processor looks to see whether that was the first DATA FIELD found, i.e. was that the first 8E code detected. If yes, the processor sets the NEXT∅ or NEXT1 vector register to the OTS∅ routine and returns. If no, the processor then sequentially performs the following operations before returning to the routine initiating NEXT∅/1 :(1) raises the SAMPLER ON bit, (2) sets an EVEN TRACK flag, (3) resets the IN MOTION flag, (4) initializes the RESTORE ACQUIRE counter, (5) resets a register in RAM keeping track of the current track location, and (5) sets the address in the NEXT∅ or NEXT1 vector register to the RA∅/1 routine.

If the unit was not in a restore operation, then the processor resets the IN MOTION flag and CLASS A COMMAND IN PROGRESS flag, and then looks to see whether a head has been selected on that unit. If yes, the CYLINDER ADDRESS MS byte is loaded into the head selector port 832 and then the SAMPLER ON bit is raised. Following this, or after it was determined that a head for the unit was not selected, the processor clears the respective BUSY latch and sets the respective ATTENTION latch. Following this, the NEXT∅ or NEXT1 vector register, as the case may be (i.e. depending on which unit is involved), will be set to the address of the first instruction for the IDL0/1 routine and the program then returns to the routine initiating the NEXT∅/1 routine.

The guard-band monitor service routing (GBM∅/1) depicted in FIG. 41 will now be described with reference to FIG. 54. As will be recalled, this routine has to do with the method of restoring in accordance with the invention. Thus, the processor first executes the INC∅/1? sub-routine and then looks to see if the corresponding DETENT signal is high. If not, then the processor looks to see whether GUARD BAND is high, i.e. has the code 9E been detected. If no, it means that the heads are being moved toward track ∅, but are still somewhere between tracks 1 and 429. If yes, the processor resets a DATA FIELD counter in RAM and sets DETENT. The processor then resets a revolution index counter in RAM and returns to the routine that initiated the NEXT∅/1 routine.

If the DETENT signal was true, then the processor looks to see whether the revolution index counter in RAM has a value greater than or equal to two. If not, the program returns to the routine initiating NEXT∅/1. If yes, then the processor looks to see whether the revolution index counter has a value less than three. If not, then the processor sets the NEXT∅ or NEXT1 vector register to the address of the first instruction for routine OTS∅/1 and then the program returns. If the revolution index counter has a value less than three, then the processor looks to see if the DATA FIELD signal is high, i.e., has the code 8E been detected. If no, the program returns to the routine initiating NEXT∅/1. If yes, then the processor increments a data field counter in RAM and then looks to see if that count is greater than 5.

Now then, if the data field count has a value not greater than five, the program returns, whereas if it is greater than five, the heads have been located in the guard-band (tracks less than −1) and the processor sets up various restore motion parameters and then executes the SRVOGO∅/1 routine before returning to the routine that initiated NEXT∅/1. A complete summation of the restore method of the invention is set out below following completion of the flow chart description.

FIG. 55 shows the one track seek service routine (OTS∅/1) depicted in FIG. 41. The processor first lowers the SAMPLER ON bit and then sets up various one track seek motion parameters. It will be noted that, in a restore operation, once the code 9E is detected (track <2), reverse movement of the head carriage is stopped so that the code 9E is verified. Then the head carriage assembly is advanced in a forward direction at a low-level velocity one track at a time until the code 8E is verified for the succeeding tracks (tracks −1) at which time the heads will be advanced to track ∅ and stopped. The processor next executes the SRVOGO∅/1 routine and then changes the address in the NEXT∅ or NEXT1 register to the first instruction of the seek monitor service routine (SM∅/1) before the program returns to the routine that initiated NEXT∅/1.

Figure 56:
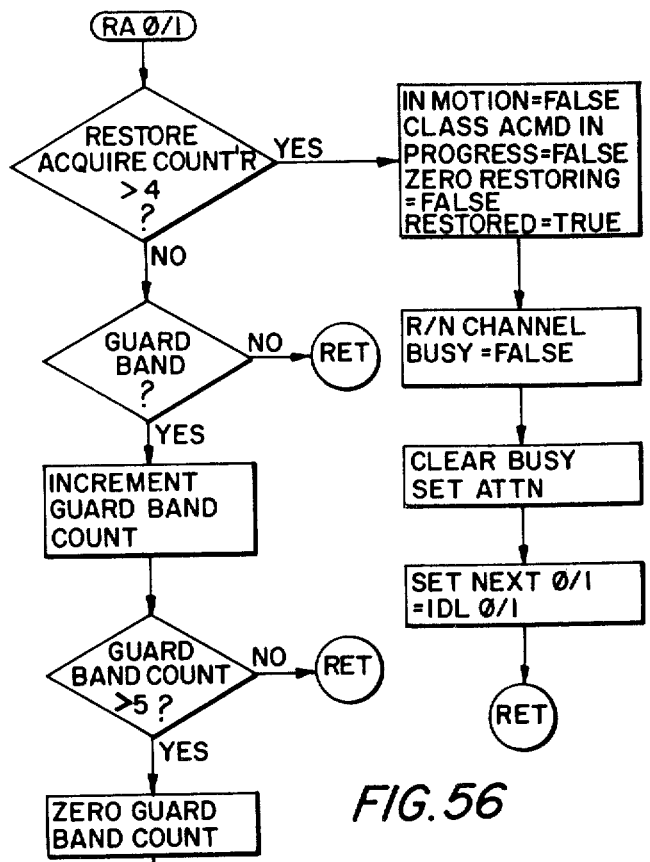

The restore acquire service routine (RA0/1) depicted in FIG. 41 will now be described with reference to FIG. 56. The processor first looks to see whether a restore acquire counter has a value greater than four. If yes, the processor resets the IN MOTION, CLASS A COMMAND IN PROGRESS and ZERO RESTORING flags in RAM, and sets a RESTORED flag. This is followed by resetting the READ/WRITE CHANNEL BUSY flag and then resetting the respective BUSY latch and setting the respective ATTENTION latch. The next operation is for the processor to load the NEXT∅ or NEXT1 vector register with the address for routine IDL∅/1 before the program returns to the routine initiating NEXT∅/1.

If the restore acquire counter does not have a value less than four, then the processor looks to see if the GUARD BAND signal is high. If no, the program returns. If yes, then the processor increments the guard band counter in RAM and then looks to see if the count is greater than five. If not, the program returns. If yes, the guard band counter is reset and the NEXT∅ or NEXT1 vector register in RAM is loaded with the address for the first instruction of the OTS∅/1 routine in ROM before the program returns to the routine initiating NEXT∅/1.

Figure 57:
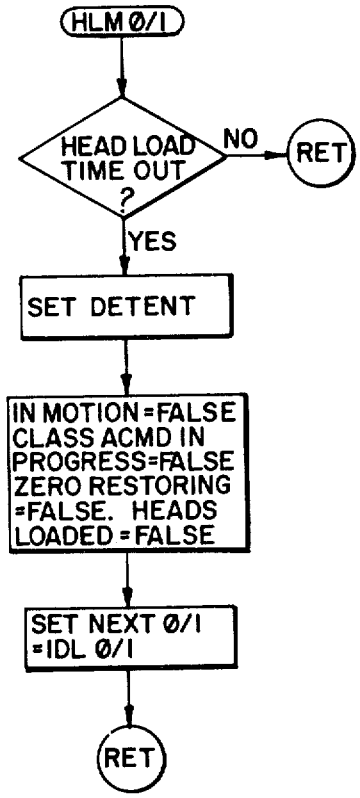

The head load monitor service routine (HLM∅/1) depicted in FIG. 41 will now be described with respect to FIG. 57. The processor first looks to see whether a head load time-out has occurred. If no, the program returns to the routine initiating NEXT∅/1. If yes, the processor sets DETENT and then resets the IN MOTION, CLASS A COMMAND IN PROGRESS and ZERO RESTORING flags, and then raises a HEADS LOADED flag. This is followed by the processor loading a new address in the NEXT∅ or NEXT1 vector register corresponding to the first instruction for the IDL∅/1 routine. The program then returns.

Figure 58:
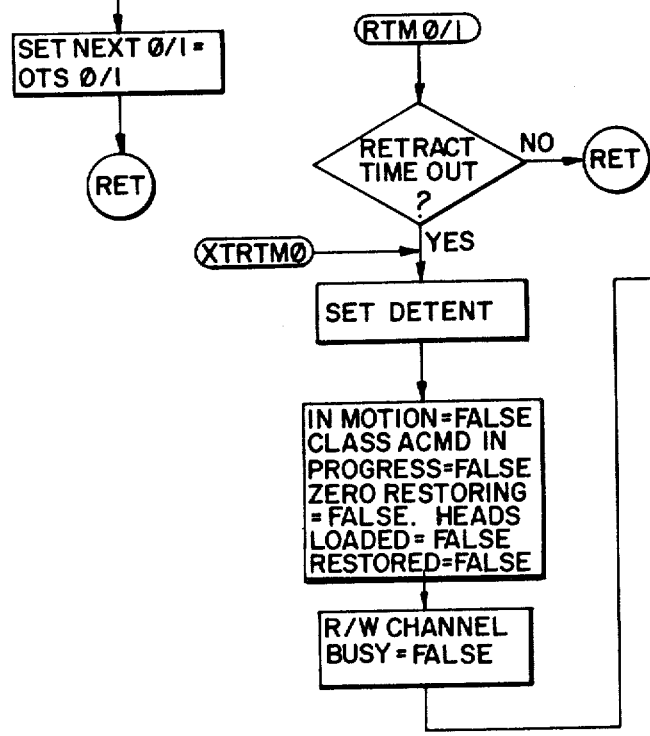

Referring to FIG. 58, the retract monitor service routine (RTM∅/1) depicted in FIG. 41 will be described. As shown, the processor first looks to see whether a retract time-out has occurred. If not, the program returns to the routine initiating NEXT∅/1. If yes, the next operation, which also marks the first operation in the XTRTM∅ routine, the processor sets the DETENT flag and then resets the IN MOTION, CLASS A COMMAND IN PROGRESS, ZERO RESTORING, HEADS LOADED and RESTORED flags in RAM. This is followed by the processor resetting the READ/WRITE CHANNEL BUSY flag and then setting the register in RAM keeping track of the current track location. Then, the processor loads the IDL∅/1 routine's first address into the NEXT∅ or NEXT1 vector register in RAM. The program then returns.

Figure 59:
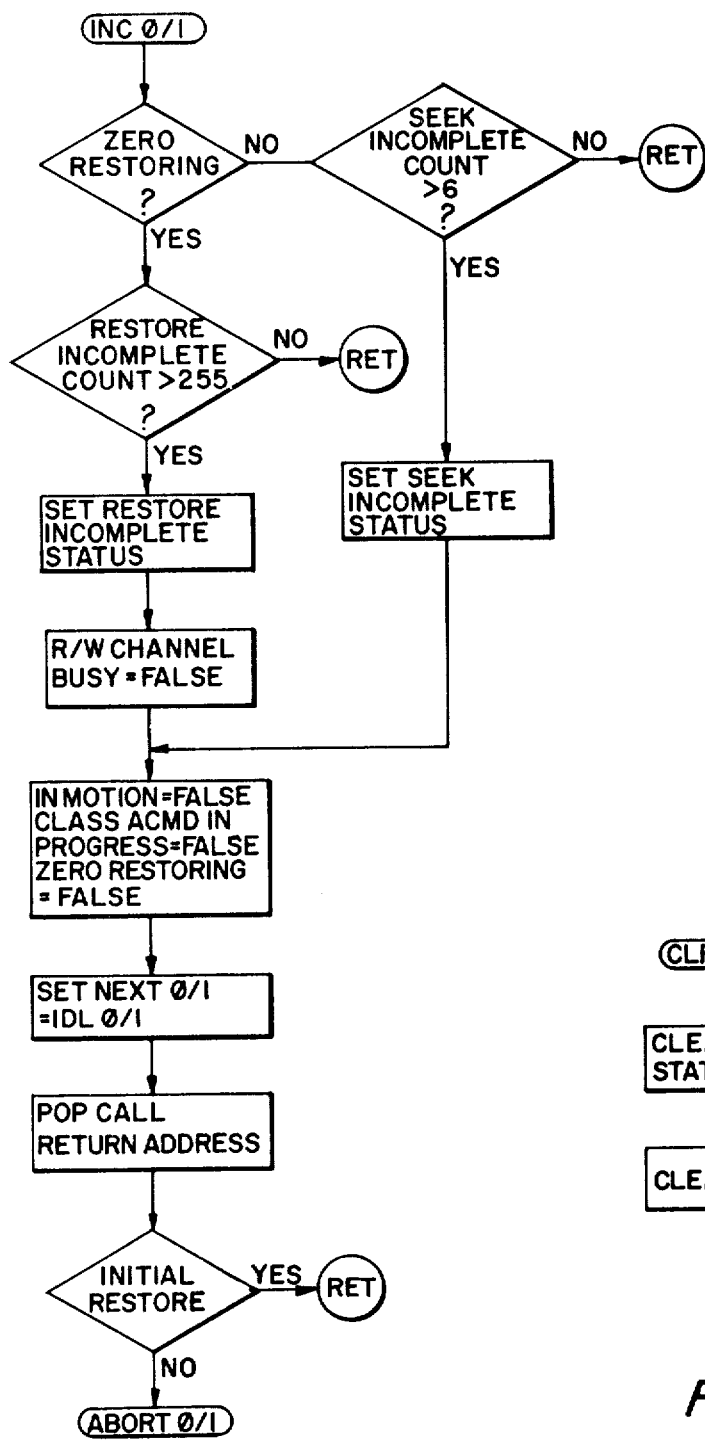

The restore/seek incomplete sub-routine (INC∅/1?)) will now be described with reference to FIG. 59. As shown, the processor first inquires whether a restore operation is being carried out, i.e. is the ZERO RESTORING flat set. If not, the processor looks to see whether a seek incomplete counter in RAM has a value greater than six. If no, the program returns and, if yes, the processor sets the SEEK INCOMPLETE bit in the STATUS A byte in RAM and then goes to a portion of the routine to be described below.

If the ZERO RESTORING flag was set, then the processor looks to see whether the seek incomplete counter has a value greater than 255. If no, the program returns and, if yes, the processor sets the RESTORE INCOMPLETE bit in the STATUS B byte in RAM and then resets the READ/WRITE CHANNEL BUSY flag. The next operation marks the portion of the routine above alluded to and includes resetting the IN MOTION, CLASS A COMMAND IN PROGRESS and zero RESTORING flags. Then, the processor loads the NEXT∅ or NEXT1 vector register with the address for the IDL∅/1 routine. The processor then changes the return address in its push-down stack so that when it next returns it will return to the MAIN program routine instead of the routine that initiated INC∅/1. The next operation is for the processor to see if this is an initial restore operation. If yes, it returns to the MAIN program routine. If not, it branches to the ABORT∅/1 routine.

Figure 60:
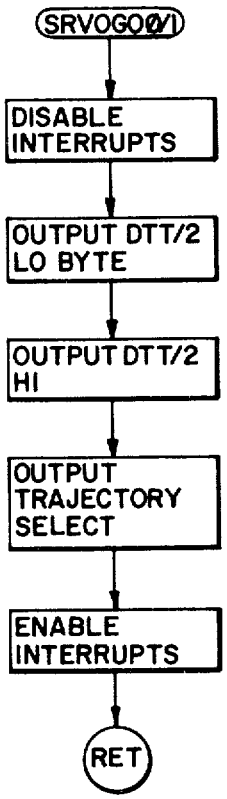

Referring now to FIG. 60, the servo go subroutine (SRVOG0∅/1) will be described. In accordance with this routine, the processor disables itself from responding to the INTERRUPT signals on line 517. Then, the least significant byte of the DTT/2 signal is applied to the down counter 608. This is followed by the most significant byte of DTT/2 being applied to counter 608. Following this operation, the trajectory index byte code is applied to the trajectory index register 622 for selecting the appropriate velocity profile in the table ROM 617, for reasons explained above (see FIG. 13). The next operation is for the processor to enable itself to again respond to INTERRUPT signals on line 517. The program then returns to the routine initiating SRVO-GO∅/1.

Figure 61:
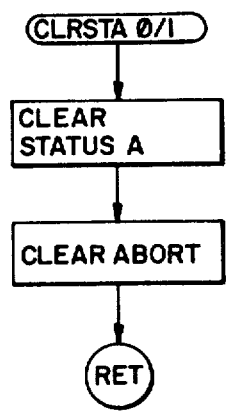

The clear status A and abort sub-routine (CLRSTA∅/1) will now be described with reference to FIG. 61. As shown, the processor first resets the STATUS A byte register in RAM and then resets the ABORT flag. The program then returns to the routine initiating the CLRSTA∅/1 routine.

Figure 62:
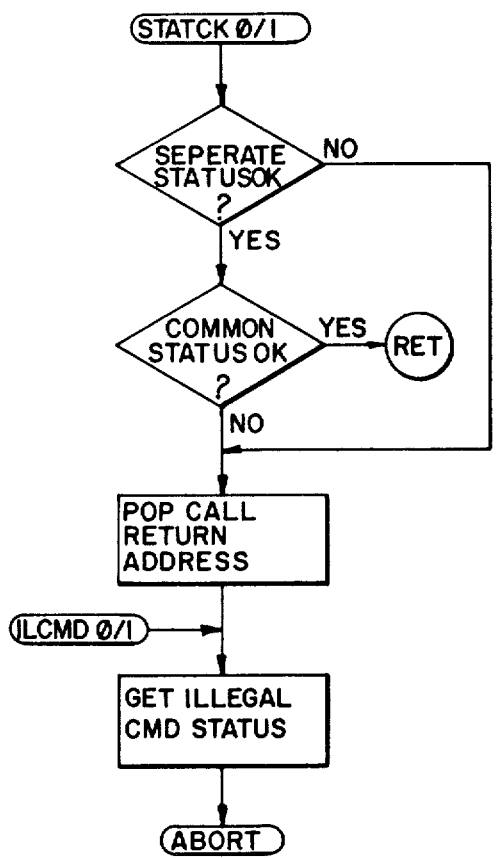

The status check sub-routine (STATCK∅/1) is shown in FIG. 62. In accordance with that routine, the processor first looks to see whether a SEPARATE STATUS byte in RAM is all right. If yes, it looks to see whether a COMMON STATUS byte also in RAM is all right. If yes, the program returns. If no, or if the SEPARATE STATUS byte was not all right, then the processor changes the return address so that it will next return to the MAIN program routine instead of the routine that initiated STATCK∅/1. The next operation also marks the start of ILCMD∅/1 and the processor sets the ILLEGAL COMMAND status bit of the STATUS A byte in RAM and then goes to the ABORT routine.

Figure 63:
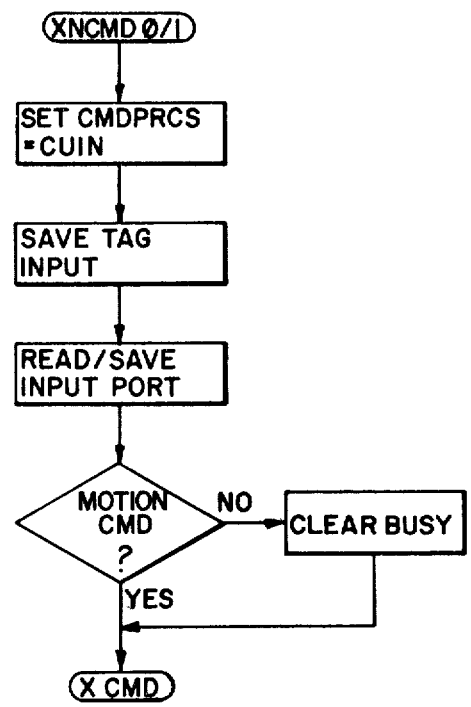

The execute break command sub-routine (XNCMD∅/1) will now be described with reference to FIG. 63. As shown, the processor first loads an address into the command processor vector register identifying the first instruction of the CUIN routine. Then, the processor retains the contents of the I/O tag port 350 in a RAM location. This is followed by the processor reading the contents of the input port 344 and retaining such contents in a RAM location. Then, the processor looks to see whether there is a motion command. If no, it clears the respective BUSY latch and then goes to the XCMD routine. If yes, it goes directly to that routine.

Figure 64:
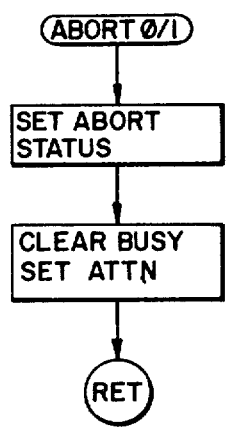

The abort sub-routine (ABORT∅/1) is shown in FIG. 64. In accordance with that routine, the processor sets the UNIT ABORT bit in the corresponding mode byte in RAM that will be applied to the controller 318 through the respective mode port (FIG. 10). The processor will then reset the respective BUSY latch and set the respective ATTENTION latch. The program will then return.

Figure 65:
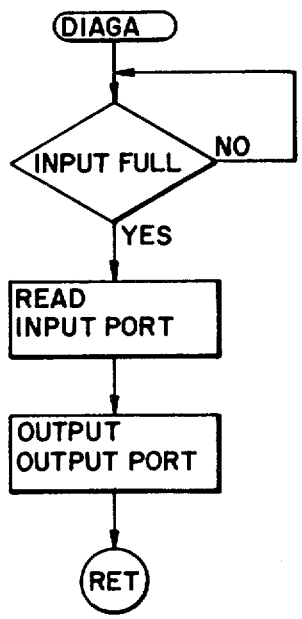

FIG. 65 shows the diagnostic A command routine depicted in FIG. 42. This routine has to do with the wrap test alluded to earlier. If the WRAP DATA byte has been received at the input port, as indicated by the INPUT PORT FULL signal being high, then the processor reads that byte and immediately applies it back to the controller 318 through the output port. The program then returns to the routine initiating CMDPRCS.

It would be helpful at this point to summarize the main process steps carried out in the restore method referred to above. The method includes pre-recording a code in each sector of tracks −6 through 435, where tracks −6 through −2 and 430–435 are defined as "guard-band" tracks and tracks ∅–429 are defined as "data-field" tracks and are used for reading and writing data. Track −1 is used in restoring only, and may be considered a "boundary" track. The preferred code for the guard-band tracks is "9E" which is recorded in the 60-byte reserved area of each sector of tracks −6 through −2 and 430-435, whereas the data field code 8E is recorded in the sectors for tracks 0 through 429, as well as in the boundary track −1 for reasons to be discussed below.

Continuing with the restore method, if the heads to be restored (located at track 0) are between tracks 0 and 429 (inclusive), the heads are moved in reverse at a constant, low velocity level. The processor will constantly be monitoring the GUARD-BAND signal which, when it goes high, indicates that a track in the guard band may have been reached. The reverse seek operation is then halted while the processor looks at the code read by the head at least five more times. If it was detected to be 9E for at least five times, i.e., the code 9E was not detected during such five times, then detection of a guard band track is verified. If such verification fails, the reverse seek operation is started up again and the above procedure repeated.

Following successful verification of the code 9E, the processor initiates a series of one-track seeks in the forward direction until the code 8E is detected. Then the heads are moved forwardly one more track. Normally, the initial 9E detection and verification would have occurred relative to track −2. In this event, the process would stop the heads and verify the 9E detection. Once verified, it would move the heads to track −1 and stop them, where 8E will be detected. The heads will then be moved one more track to track 0 and stopped. If the code 8E is then detected and verified the restore operation will be completed.

If track −3 was the track the heads first detected the code 9E during reverse seeking, due to an overshoot or the like, the heads would be stopped and if 9E is verified, a one-track seek will occur bringing the heads to track −2. Since 9E is prerecorded in that track, another one-track seek is initiated which will bring the heads to track −1. As explained above, the code 8E will then be detected so that the processor will initiate one more one-track seek operation to stop the heads over track 0. A detection and verification of the code 8E will then mark the end and completion of the restore operation.

X. EXERCISER (DIAGNOSTICS)

Thus far, the control system for the disk drive 10 has been described relative to commands initiated by the host controller 318. It oftentimes becomes necessary for the operator or manufacturer of the drive to "exercise" it for diagnostic purposes. In this respect, various commands that normally would be transmitted to the drive by the controller 318 would be applied instead by an "exerciser."

Figure 23:
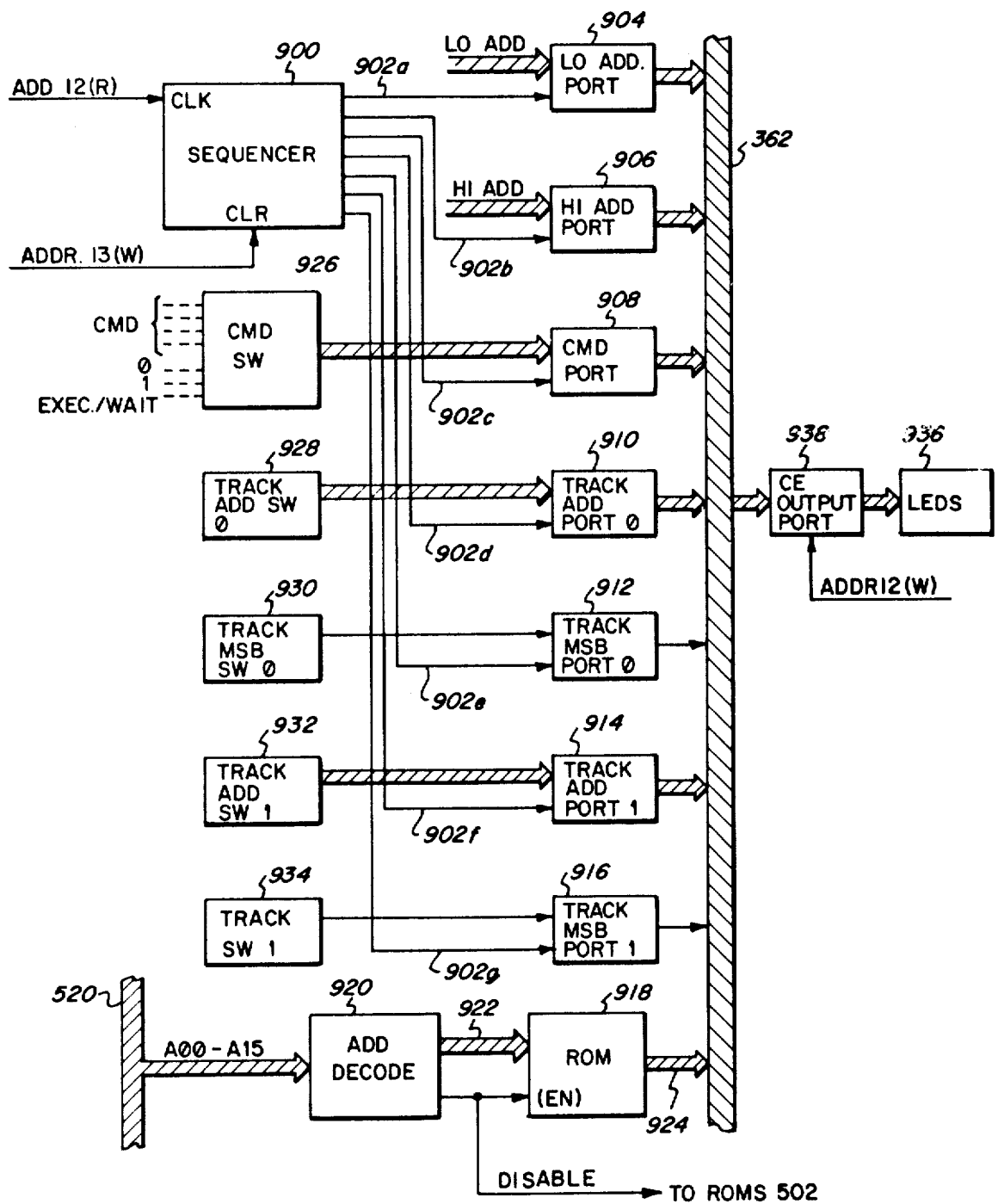
FIG. 23 is a schematic block diagram of an exemplary exerciser that may be utilized with the disk drive of FIGS. 1–6.

A preferred exerciser is depicted in FIG. 23 and may be connected to the drive in a manner which will be apparent below. The exerciser includes a sequencing circuit 900 having a clock input adapted to receive the ADDR 12(R) control signal, i.e. signals ADDR 12 and I/O RD, from the processor 326. The circuit 900 also has a reset input adapted to receive the ADDR 13(W) control signal from the processor 326. In response to each ADDR 12 (R) signal pulse, the sequencing circuit 900 will sequentially enable one of seven lines 902a–902g. Each line is connected to the enable input of a respective one of seven ports.

More specifically, the line 902a is connected to the enable input of a low address port 904, the line 902b to a high address port 906, the line 902c to a command port 908, the line 902d to a track address port 0-910, the line 902e to a track MSB port 0-912, the line 902f to a track address port 1-914, and the line 902g to a track MSB port 1-916.

The low address port 904 is adapted to receive the least significant byte of an initial address for a program ROM 918 which contains microcode for the exerciser (hereinafter referred to as a "CE BOX"). The high address port 906 is adapted to receive the most significant byte of the initial ROM address. When these two ports are enabled, the respective address bytes will be applied to the processor 326 through the data bus 362 and then loaded into the program counter of the microprocessor 500 (FIG. 11). They will then be applied on the 16 bit microprocessor address bus 520 back to the CE BOX where they will be decoded by a suitable decoder 920. The decoded initial address is then applied to the ROM 918 along a transfer bus 922. The microinstructions from the ROM 918 are applied along a transfer bus 924 to the data bus 362 for execution by the microprocessor 500 in processor 326. The ROM 918 is enabled by the address decoder 920 when it receives an input thereto, at which time the ROMS 502 will be disabled.

Now then, the command port 908 is adapted to receive a 7-bit code from a bank of seven switches 926 defining various commands. Four of the switches select a 4-bit command code, one switch selects or deselects unit 0, another switch selects or deselects unit 1, and the last switch defines WAIT and EXECUTE commands.

Port 910 is adapted to receive the 8 least significant bits of a 9-bit track address code for unit 1 as developed by a bank of 8 switches 928. The most significant bit is applied to port 912 from a single switch 930. Port 914 is adapted to receive the 8 least significant bits of a 9-bit track address code for unit 1 as developed by a bank of 8 switches 932. The most significant bit of that code is received by port 916 from a single switch 934.

These track addresses are applied to the processor 326 through the data bus 362 when the respective ports are enabled. Status bytes are applied from the processor 326 to a bank of LED indicator lights 936 of the CE BOX through the data bus 362 and a CE output port 938, which is enabled by an ADDR 12(W) control signal.

Reference is now had to FIGS. 66–76 where the various program routines relating to CE BOX initiated diagnostics will be described. As will be seen, each of the program instructions for these routines are in the ROM 918 in the CE BOX. When the ROM 918 is being addressed, the ROMS 502 will be disabled, as explained above.

Figures 66, 67:
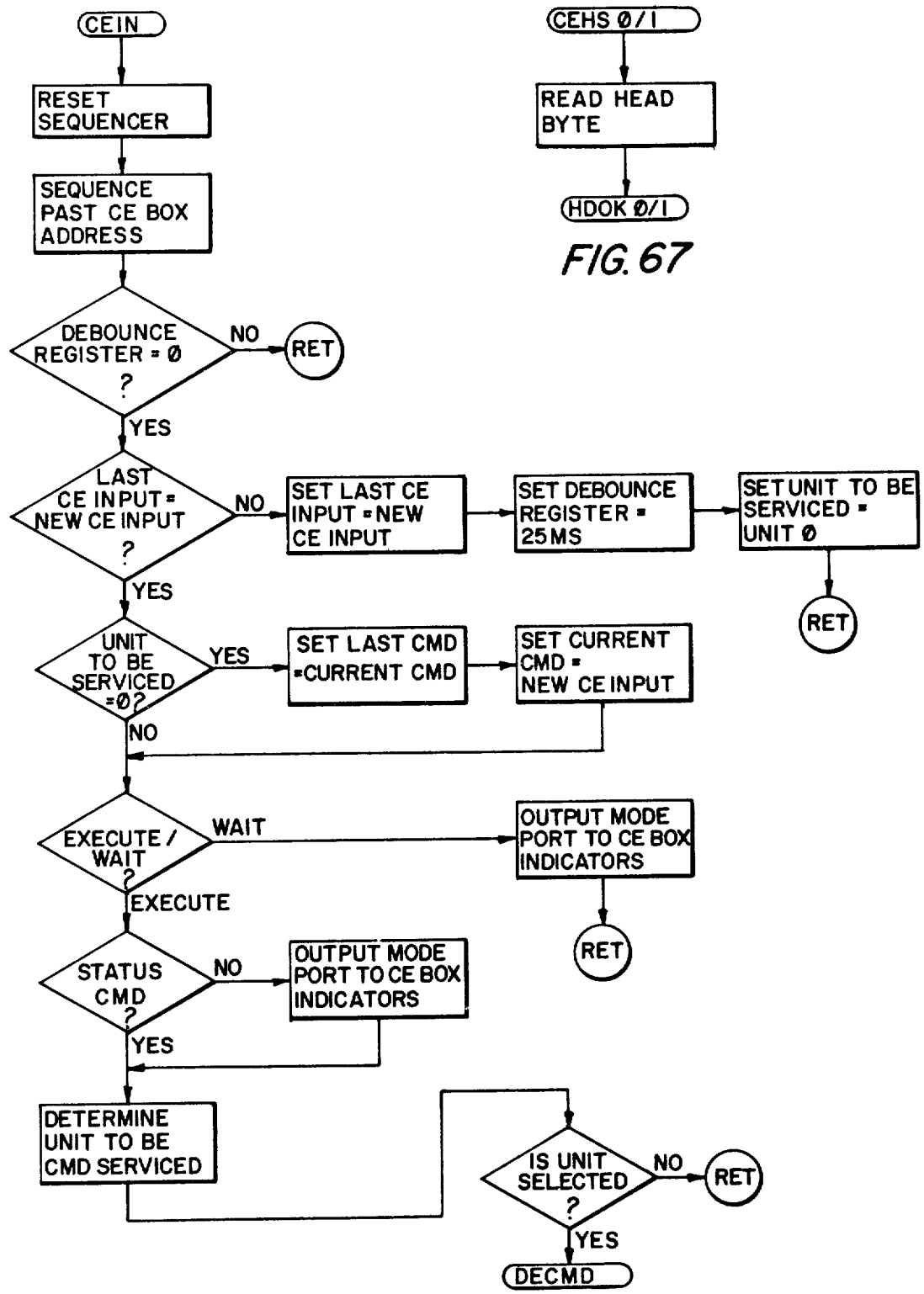
Figure 72:
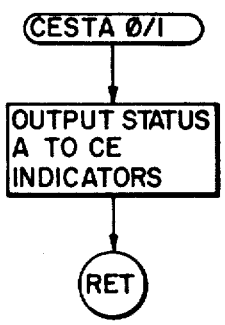
Figure 73:
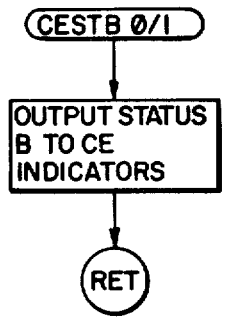
Figure 74:
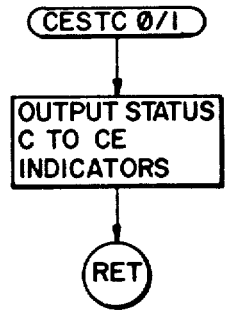
Figure 75:
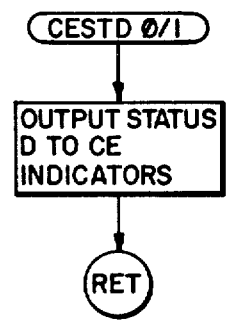

Referring first to FIG. 66, the CEIN routine depicted in FIG. 40 will be described. Thus, the routine CEIN (CE BOX interface) will be executed by the processor only when the command processor vector register in RAM is loaded with the initial address for the CEIN routine when the main CMDPRCS routine is serviced. The first address of CEIN will be the initialization address supplied from ports 904 and 906.

In accordance with the CEIN routine, the processor first resets the sequencer 900, and then sequences it past the CE BOX address (i.e., ports 904 and 906). The processor next looks to see whether a debounce register in RAM is reset. If no, the program returns to the routine in ROMS 502 that initiated the CMDPRCS routine. If yes, the processor looks to see whether the last CE BOX track address input (stored in registers in RAMS 504) equals the new CE BOX track address input. If not, the processor sets the last CE BOX register equal in value to the new CE BOX address, then sets the debounce register to 25 ms, then sets the unit to be serviced flag to unit 0 and then returns to the routine that initiated CMDPRS.

If the last CE BOX address is equal to the new CE BOX address, then the processor looks to see whether the unit to be serviced is unit 0. If not, it looks to see whether the WAIT/EXECUTE switch is set to WAIT or EXECUTE. If yes, it sets the last command register in RAM to the value of the current command (from port 908), then sets the current command register equal to the new CE BOX address input, and then looks to see if the WAIT/EXECUTE switch is at WAIT or EXECUTE. If it is on WAIT, the processor outputs the respective mode port byte in RAM to the CE BOX indicator lights 936 and then the program returns. If it is on EXECUTE, the processor looks to see whether the 4-bit command code is a status command. If no, the processor outputs the respective mode port byte to the indicator lights 936. If yes, or after the latter operation if no, the processor determines which unit is to be command serviced. Following this, the processor looks to see whether that unit has been selected. If not, the program returns. If yes, the program executes the DECMD routine shown in FIG. 42.

Referring to FIGS. 42 and 67, if the decoded CE BOX command is head select, then the CEHS0/1 routine is executed, which includes reading the HEAD byte and then executing a HDOK0/1 routine.

Referring to FIGS. 42 and 68, if the decoded CE BOX command is an alternating seek (CEASK0/1), then the processor looks to see if it is all right to seek. If no, the program returns. If yes, the processor reads the first track address and then looks to see whether it defines a track location equal to the current track locations. If yes, it sets the new cylinder register in RAM to a value equal to the first track address and then executes a CYLOK0/1 routine. If the first track address is not equal to the current track address, then the processor reads the second track address, then sets the new cylinder register in RAM to the second track address, and then executes the CYLOK0/1 routine.

Referring to FIG. 42, if the decoded command from the CE BOX is random seek, the CERSK0/1 routine of FIG. 69 will be executed. In accordance with that routine, the processor will look to see if it is all right to seek. If no, the program will return. If yes, the processor will execute a RANDOM sub-routine and then fetch a random number from RAM, swap bytes, get in range and then set the new cylinder register in RAM to the value of the random number. The processor will then execute the CYLOK0/1 routine.

If the decoded CE BOX command is a one-track forward seek, then the ONETFS0/1 routine of FIG. 70 will be executed, wherein the processor looks to see whether it is all right to seek. If no, the program returns. If yes, the new cylinder register is set to the value of the current track location plus one. This is followed by executing the SDSCK0/1 routine. If the decoded CE BOX command is a one-track reverse seek, then the ONETRS0/1 routine (FIG. 71) is executed. This routine is identical to ONETFS0/1.

Referring to FIGS. 42 and 72-75, if the decoded command from the CE BOX is a status command, then the respective routine for the particular status byte requested will be executed, as shown. These routines include CESTA0/1, CESTB0/1, CESTC0/1 and CESTD0/1. In each of these routines, the processor outputs the STATUS byte to the indicator lights 936 through the port 938.

Figure 76:
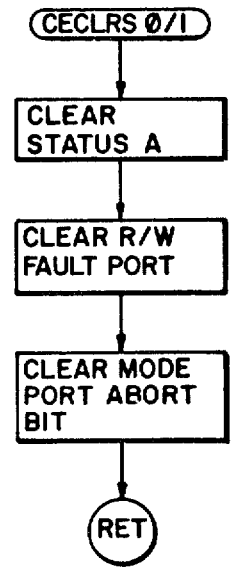

If the decoded CE BOX command is a status clear command, then the CECLRS0/1 routine of FIG. 76 will be executed. In accordance with that routine, the processor resets the STATUS A byte, then resets the READ/WRITE status port 826 (FIG. 14) and then clears the respective mode port and ABORT flag. The program then returns.

Although the invention has been described with respect to a presently preferred embodiment, it will be appreciated by those skilled in the art that various modifications, substitutions, etc. may be made without departing from the spirit and scope of the invention as defined in and by the following claims.

What is claimed is:

1. A disk drive comprising:
   a housing having a door through which a cartridge including a recording disk therein may be inserted;
   a spindle drive assembly mounted in said housing and responsive to a first set of instructions for rotating the recording disk of a disk cartridge loaded into said housing through said door and onto said spindle drive assembly;
   an actuator mounted in said housing and capable of controlled reciprocal movements relative to the axis of rotation of said spindle drive assembly;
   a head carriage assembly mounted in said housing to said actuator and including at least one electromagnetic read/write head thereon for reading data from and writing data onto tracks of the recording disk of a cartridge loaded onto said spindle drive assembly;
   servo control apparatus mounted in said housing and responsive to a second set of instructions for controlling the speed and direction of the reciprocal movements of said actuator;
   read/write apparatus mounted in said housing and responsive to a third set of instructions for controlling the reading and writing of data by said electromagnetic head; and
   programmed data processing means mounted in said housing and connected to said spindle drive assembly, said servo control apparatus and said read/write apparatus for generating said first, second and third sets of instructions under program control.

2. The disk drive of claim 1, wherein said programmed data processing means comprises a microprocessor.

3. The disk drive of claim 2, wherein said programed data processing means further comprises:
   read-only memory means have stored therein the program instructions for controlling said disk drive; and
   a first bus coupled between said microprocessor and said read-only-memory means for applying address signals from said microprocessor to said read-only-memory means.

4. The disk drive of claim 3, further comprising a second bus coupled to said data processing means, said servo control apparatus and said read/write apparatus.

5. The disk drive of claim 4, wherein said programmed data processing means further includes a bidirectional bus driver for coupling data to and from said second bus and said microprocessor.

6. The disk drive of claim 5, wherein said programmed data processing means further comprises a third bus coupled between said read-only-memory means and said second bus for applying program instructions for said microprocessor from said read-only-memory means onto said second bus.

7. The disk drive of claim 6, wherein said programmed data processing means further comprises:
random-access-memory capable of storing therein said first set of instructions for said spindle drive assembly and being coupled to said first bus in order for said first set of instructions to be accessed by said address signals; and
a fourth bus coupled between said random-access-memory means and said second bus for applying said first set of instructions onto said second bus.

8. The disk drive of claim 7, wherein said programmed data processing means further comprises:
a first port coupled to said second bus for loading said first set of instructions therein; and
means for applying said first set of instructions from said first port to said first spindle drive assembly.

9. The disk drive of claim 7, wherein said random-access-means is further capable of storing some instructions of said second set therein, said some instructions of said second set being applied to said servo control apparatus from said random-access-memory means under program control via said fourth and second busses.

10. The disk drive of claim 9, wherein said programmed data processing means further comprises:
an address decoder coupled to said first bus for decoding an address signal on said first bus, said address decoder capable of generating other instructions of said second set of instructions in response to the address signals supplied thereto; and
means for coupling said other instructions of said second set of instructions to said servo control apparatus.

11. The disk drive of claim 7, wherein said random-access-memory means is further capable of storing some instructions of said third set of instructions therein, said some instructions of said third set being applied to said read/write apparatus from said random-access-memory means under program control via said fourth and second busses.

12. The disk drive of claim 11, wherein said programmed data processing means further comprises:
an address decoder coupled to said first bus for decoding an address signal on said first bus, said address decoder capable of generating other instructions of said third set of instructions in response to the address signals supplied thereto; and
means for coupling said other instructions of said third set of instructions to said read/write apparatus.

13. A disk drive comprising:
a housing having a door through which a cartridge including a recording disk therein may be inserted;
a spindle drive assembly mounted in said housing and responsive to a first set of instructions for rotating the recording disk of a disk cartridge loaded into said housing through said door and onto said spindle drive assembly;
at least one recording disk permanently mounted in said housing to said spindle drive assembly for rotation therewith;
an actuator mounted in said housing and having first and second portions each capable of independent controlled reciprocal movements relative to the axis of rotation of said spindle drive assembly;
a first head carriage assembly mounted in said housing to the first portion of said actuator and including a first electromagnetic read/write head thereon for reading from and writing data onto tracks of the recording disk of a cartridge loaded onto said spindle drive assembly;
a second head carriage assembly mounted in said housing to the second portion of said actuator and including a second electromagnetic read/write head thereon for reading from and writing data onto tracks of said at least one recording disk;
a first servo control apparatus mounted in said housing and responsive to a second set of instructions for controlling the speed and direction of the reciprocal movements of the first portion of said actuator;
a second servo control apparatus mounted in said housing and responsive to a third set of instructions for controlling the speed and direction of the reciprocal movements of the second portion of said actuator;
read/write apparatus mounted in said housing and responsive to a fourth set of instructions for controlling the reading and writing of data by said first and second electromagnetic heads; and
programmed data processing means mounted in said housing and connected to said spindle drive assembly, said first servo control apparatus, said second servo control apparatus, and said read/write apparatus for generating said first, second, third and fourth sets of instructions under program control.

14. The disk drive of claim 13, wherein said at least one recording disk permanently mounted to said spindle drive assembly has track-following servo data prerecorded on at least one track thereof, said disk drive further comprising:
tracking apparatus mounted in said housing and responsive to a sample of said track-following servo data read by said second electromagnetic read/write head for generating a tracking control signal representative of the error between the actual position of said head over a track and the center of such track; and
means for coupling said tracking control signal to said second servo control apparatus.

15. The disk drive of claim 14, wherein said programmed data processing means includes means for varying the value of said tracking control signal in accordance with a desired offset for said second electromagnetic read/write head relative to the center of a track.

16. The disk drive of claim 13, wherein said first and second head carriage assemblies each include at least two electromagnetic read/write heads thereon, and wherein some instructions of said fourth set generated by said programmed data processing means defines a head that is to be selected for reading or writing, said read/write apparatus including means responsive to said some instructions of said fourth set for selecting one of the heads for reading or writing.

17. The disk drive of claim 16, wherein other instructions of said fourth set of instructions define a magnitude of write current that is to be employed by a selected head during a write operation, said read/write apparatus further including means responsive to said other instructions of said fourth set for controlling the amount of write current applied to a head selected for writing.

18. A disk drive comprising:
a housing;
a spindle drive assembly mounted in said housing and responsive to a first set of instructions for rotating a recording disk loaded on said spindle drive assembly;
an actuator mounted in said housing and capable of controlled reciprocal movements relative to the axis of rotation or said spindle drive assembly;
a head carriage assembly mounted in said housing to said actuator and including at least one electromagnetic read/write head thereon for reading data from and writing data onto tracks of a recording disk loaded on said spindle drive assembly;
servo control apparatus mounted in said housing and responsive to a second set of instructions for controlling the speed and direction of the reciprocal movements of said actuator;
read/write apparatus mounted in said housing and responsive to a third set of instructions for controlling the reading and writing of data by said electromagnetic head; and
programmed data processing means mounted in said housing and connected to said spindle drive assembly, said servo control apparatus and said read/write apparatus for generating said first, second and third sets of instructions under program control.

* * * * *